(12) United States Patent
Li et al.

(10) Patent No.: US 10,333,390 B2
(45) Date of Patent: *Jun. 25, 2019

(54) SYSTEMS AND METHODS FOR PROVIDING VECTOR CONTROL OF A GRID CONNECTED CONVERTER WITH A RESONANT CIRCUIT GRID FILTER

(71) Applicant: The Board of Trustees of the University of Alabama, Tuscaloosa, AL (US)

(72) Inventors: Shuhui Li, Northport, AL (US); Ishan Jaithwa, Fridley, MN (US); Xingang Fu, Tuscaloosa, AL (US); Raed Suftah, Makkah (SA)

(73) Assignee: THE BOARD OF TRUSTEES OF THE UNIVERSITY OF ALABAMA, Tuscaloosa, AL (US)

(*) Notice: Subject to any disclaimer, the term of this patent is extended or adjusted under 35 U.S.C. 154(b) by 94 days.

This patent is subject to a terminal disclaimer.

(21) Appl. No.: 15/149,560

(22) Filed: May 9, 2016

(65) Prior Publication Data

US 2016/0329714 A1 Nov. 10, 2016

Related U.S. Application Data

(60) Provisional application No. 62/158,790, filed on May 8, 2015.

(51) Int. Cl.
*H02M 1/42* (2007.01)
*H02M 7/44* (2006.01)
(Continued)

(52) U.S. Cl.
CPC .............. *H02M 1/42* (2013.01); *H02J 3/01* (2013.01); *H02J 3/381* (2013.01); *H02M 1/126* (2013.01);
(Continued)

(58) Field of Classification Search
None
See application file for complete search history.

(56) References Cited

U.S. PATENT DOCUMENTS 5,365,158 A * 11/1994 Tanaka .................... H02P 21/09
318/806
5,396,415 A * 3/1995 Konar .................. G05B 13/027
700/42
(Continued)

FOREIGN PATENT DOCUMENTS

WO 2008137836 11/2008

OTHER PUBLICATIONS

"Artificial Neural Networks for Control of a Grid-Connected Rectifier/Inverter Under Disturbance, Dynamic and Power Converter Switching Conditions", Li et al., published IEEE Apr. 2014.*
(Continued)

*Primary Examiner* — James G Norman
(74) *Attorney, Agent, or Firm* — Meunier Carlin & Curfman LLC

(57) ABSTRACT

An example system for controlling a grid-connected energy source using a neural network is described herein. The example system can include a grid-connected converter ("GCC") operably coupled between an electrical grid and an energy source, a n-order grid filter (e.g., where n is an integer greater than or equal to 2) operably coupled between the electrical grid and the GCC, and a nested-loop controller. The nested-loop controller can have inner and outer control loops and can be operably coupled to the GCC. A d-axis loop can control real power, and a q-axis loop can control reactive power. Additionally, the inner control loop can include a neural network that is configured to optimize dq-control voltages for controlling the GCC. The neural network can
(Continued)

account for circuit dynamics of the n-order grid filter while optimizing the dq-control voltages.

18 Claims, 41 Drawing Sheets

(51) Int. Cl.
   *H02M 1/12* (2006.01)
   *H02M 7/537* (2006.01)
   *H02J 3/01* (2006.01)
   *H02J 3/38* (2006.01)
(52) U.S. Cl.
   CPC .............. *H02M 7/44* (2013.01); *H02M 7/537* (2013.01); *H02J 3/383* (2013.01); *H02J 3/386* (2013.01); *H02J 3/387* (2013.01); *Y02B 70/1441* (2013.01); *Y02E 10/563* (2013.01); *Y02E 10/763* (2013.01); *Y02E 40/40* (2013.01)

(56) References Cited

U.S. PATENT DOCUMENTS

| | | | |
|---|---|---|---|
| 6,442,535 | B1 | 8/2002 | Yifan |
| 6,532,454 | B1 | 3/2003 | Werbos |
| 6,710,574 | B2 | 3/2004 | Davis et al. |
| 6,922,036 | B1 | 7/2005 | Ehsani et al. |
| 7,243,006 | B2 | 7/2007 | Richards |
| 8,030,791 | B2 | 10/2011 | Lang et al. |
| 8,577,508 | B2 | 11/2013 | Li et al. |
| 9,379,546 | B2* | 6/2016 | Li ........................... H02J 3/00 |
| 2003/0218444 | A1 | 11/2003 | Marcinkiewicz et al. |
| 2005/0184689 | A1 | 8/2005 | Maslov et al. |
| 2008/0315811 | A1 | 12/2008 | Hudson et al. |
| 2011/0089693 | A1 | 4/2011 | Nasiri |
| 2012/0056602 | A1 | 3/2012 | Li et al. |
| 2012/0112551 | A1 | 5/2012 | Li et al. |
| 2014/0362617 | A1 | 12/2014 | Li |

OTHER PUBLICATIONS

"Active Damping-Based Control for Grid-Connected LCL-Filtered Inverter With Injected Grid Current Feedback Only", Xu et al., published Mar. 2014.*
"Artificial Neural Networks for Control of a Grid-Connected Rectifier/Inverter Under Disturbance, Dynamic and Power Converter Switching Conditions", Li et al., published IEEE Apr. 2014 (Provided by applicant) (Year: 2014).*
OPAL-RT website, available: http://www.opal-rt.com/ (accessed Jan. 9, 2018).
Alepuz, et al., "Control strategies based on symmetrical components for grid-connected converters under voltage dips," IEEE Trans. Ind. Electronics. vol. 56, No. 6, Jul. 2009, pp. 2162-2173.
AlSharidah, "An Active Method for Implementing the Unintentional Islanding Test in Distributed Generation Systems", Ph.D. thesis, Faculty of Graduate Studies, The University of British Columbia, Vancouver, Canada, Dec. 2012.
Bahrani, et al. "High-order vector control of grid-connected voltage-source converters with LCL-filters," IEEE Trans. Ind. Electron., vol. 61, No. 6, pp. 2767-2775, Jun. 2014.
Bahrani, et al. "Multivariable-PI-based dq current control of voltage source converters with superior axis decoupling capability," IEEE Trans. Ind. Electron., vol. 58, No. 7, pp. 3016-3026, Jul. 2011.
Bahrani, et al., "Decoupled dq-current control of grid-tied voltage source converters using nonparametric models," IEEE Trans. Ind. Electron., vol. 60, No. 4, pp. 1356-1366, Apr. 2013.
Bahrani, et al., "Vector control of single-phase voltage-source converters based on fictive-axis emulation," IEEE Transactions on Industry Applications, vol. 47, No. 2, pp. 831-840, Mar./Apr. 2011.
Balakrishnan, et al., "Adaptive-critic-based neural networks for aircraft optimal control," Journal of Guidance, Control, and Dynamics, vol. 19, No. 4, pp. 893-898, Jul./Aug. 1996.

Bao, et al., "Step-by-step controller design for LCL-type grid-connected inverter with capacitor-current-feedback active-damping," IEEE Trans. Power Electron., vol. 29, No. 3, pp. 1239-1253, Mar. 2014.
Belhadj, et al., "Investigation of Different Methods to Control a Small Variable-Speed Wind Turbine With PMSM Drives," Journal of Energy Resources Technology, Transactions of the ASME, vol. 129, Sep. 2007, pp. 200-213.
Bierhoff, et al., "Active damping for three-phase PWM rectifiers with high-order line-side filters," IEEE Trans. Ind. Electron., vol. 56, No. 2, pp. 371-379, Feb. 2009.
Blasko, et al., "A novel control to actively damp resonance in input LC filter of a three-phase voltage source converter," IEEE Transactions on Industry Applications, vol. 33, No. 2, pp. 542-550 Mar./Apr. 1997.
Carrasco, et al., "Power-Electronic Systems for the Grid Integration of Renewable Energy Sources: A Survey," IEEE Trans. Ind. Electron., vol. 53, No. 4, pp. 1002-1016, Aug. 2006.
Castilla, et al., "Linear Current Control Scheme With Series Resonant Harmonic Compensator for Single-Phase Grid-Connected Photovoltaic Inverters," IEEE Trans. Ind. Electronics, vol. 55, No. 7, Jul. 2008, pp. 2724-2733.
Castilla, et al., "Control design guidelines for single-phase grid-connected photovoltaic inverters with damped resonant harmonic compensators," IEEE Transactions on Industrial Electronics, vol. 56, No. 11, pp. 4492-4501, Nov. 2009.
Czarnecki, "Instantaneous reactive power p-q theory and power properties of three-phase systems," IEEE Transactions on Power Delivery, vol. 21, No. 1, pp. 362-367, Jan. 2006.
Czarnecki, "Comparison of instantaneous reactive power p-q theory with theory of the current's physical components," Electrical Engineering, vol. 85, No. 1, pp. 21-28, Jan. 2003.
Dai, et al., "Power flow control of a single distributed generation unit," IEEE Trans. Power Electron., vol. 23, No. 1, pp. 343-352, Jan. 2008.
Dannehl, et al., "Investigation of active damping approaches for PI-based current control of grid-connected pulse width modulation converters with LCL filters," IEEE Trans. Ind. Appl., vol. 46, No. 4, pp. 1509-1517, Jul./Aug. 2010.
Dannehl, et al., "Filter-based active damping of voltage source converters with LCL filter," IEEE Trans. Ind. Electron., vol. 58, No. 8, pp. 3623-3633, Aug. 2011.
Dannehl, et al., "Limitations of voltage-oriented PI current control of grid-connected PWM rectifiers with LCL filters," IEEE Transactions on Industrial Electronics, vol. 56, No. 2, pp. 380-388, Feb. 2009.
Dannehl, et al., "PWM rectifier with LCL-filter using different current control structures," in Proc. European Conf. on Power Electron. and Applicat., Aalborg, Denmark, Sep. 2007.
Dasgupta, et al., "Single-phase inverter control techniques for interfacing renewable energy sources with microgrid-part I: Parallel-connected inverter topology with active and reactive power flow control along with grid current shaping," IEEE Transactions on Power Electronics, vol. 26, No. 3, pp. 717-731, Mar. 2011.
Dasgupta, et al., "Single-phase inverter control techniques for interfacing renewable energy sources with microgrid—part II: Series-connected inverter topology to mitigate voltage-related problems along with active power flow control," IEEE Transactions on Power Electronics, vol. 26, No. 3, pp. 732-746, Mar. 2011.
dSPACE DS1103 PPC Controller Board website, available:https://www.dspace.com/en/pub/home/support/pli/elas/elads1103.cfm (accessed Jan. 9, 2018).
El-Habrouk, et al., "Active power filters: A review," IEEE Proc. Electric Power Applications, vol. 147, issue 5, pp. 403-413, 2000.
Festo Didactic website, available: https://www.labvolt.com/ (accessed Jan. 9, 2018).
Figueres, et al., "Sensitivity Study of the Dynamics of Three-Phase Photovoltaic Inverters With an LCL Grid Filter," IEEE Trans. Ind. Electronics, vol. 56, No. 3, Mar. 2009, pp. 706-717.
Fu, et al., "Training recurrent neural networks with the Levenberg-Marquardt algorithm for optimal control of a grid-connected converter," IEEE Trans. Neural Netw. Learn. Syst, vol. 26, No. 9, Sep. 2015.

(56) References Cited

OTHER PUBLICATIONS

Gagnon, "Wind Farm—DFIG Detailed Model," The MathWork, Jan. 2009.

Hagan, et al., "Training feedforward networks with the marquardt algorithm," IEEE Transactions on Neural Networks, vol. 5, No. 6, pp. 989-993, Nov. 1994.

Hanif, et al., "Two degrees of freedom active damping technique for LCL filter-based grid connected pv systems," IEEE Trans. Ind. Electron., vol. 61, No. 6, pp. 2795-2803, Jun. 2014.

Houari, et al., "Large signal stability analysis and stabilization of converters connected to grid through LCL filters," IEEE Trans. Ind. Electron., vol. 61, No. 12, pp. 6507-6516, Dec. 2014.

IEEE Recommended Practices and Requirements for Harmonic Control in Electric Power Systems, IEEE Standards 519-1992, 1992.

Jalili, et al., "Design of LCL filters of active-front-end two-level voltage-source converters," IEEE Transactions on Industrial Electronics, vol. 56, No. 5, pp. 1674-1689, May 2009.

Karanayil, et al., "Performance Evaluation of Three-Phase Grid-Connected Photovoltaic Inverters Using Electrolytic or Polypropylene Film Capacitors," IEEE Trans. Sustain. Energy. vol. 5, No. 4, pp. 1297-1306, Oct. 2014.

Khadkikar, et al., "Generalised single-phase p-q theory for active power filtering: simulation and DSP-based experimental investigation," IET Power Electronics, vol. 2, No. 1, pp. 67-78, Jan. 2009.

Kjaer, et al, "A review of single-phase grid-connected inverters for photovoltaic modules," IEEE Transactions on Industry Applications, vol. 41, No. 5, pp. 1292-1306, Sep./Oct. 2005.

Lettl, et al., "Comparison of different filter types for grid connected inverter," Progress in Electromagnetics Research Symposium Proc., Marrakesh, Morocco, Mar. 20-23, 2011, pp. 1426-1429.

Levenberg, "A method for the solution of certain non-linear problems in least squares," Quarterly Journal of Applied Mathmatics, vol. II, No. 2, pp. 164-168, 1994.

Li, et al., "Artificial neural networks for control of a grid-connected rectifier/inverter under disturbance, dynamic and power converter switching conditions," IEEE Transactions on Neural Networks and Learning Systems, vol. 25, No. 4, pp. 738-750, Apr. 2014.

Li, et al., "Control of DFIG Wind Turbine with Direct-Current Vector Control Configuration," IEEE Trans. Sustain. Energy, vol. 3, No. 1, pp. 1-11, Jan. 2012.

Li, et al., "Control of HVDC light systems using conventional and direct current vector control approaches," IEEE Trans. on Power Electron., vol. 25, No. 12, pp. 3106-3118, Dec. 2010.

Li, et al., "Direct-current vector control of three-phase grid-connected rectifier-inverter," Electric Power Systems Research, vol. 81, No. 2, pp. 357-366, Feb. 2011.

Li, et al., "Vector control of a grid-connected rectifier/inverter using an artificial neural network," in Proc. IEEE World Congress on Computational Intelligence, Brisbane, Australia, Jun. 2012.

Liserre, et al., "Design and control of an LCL-filter based three-phase active rectifier," IEEE Transactions on Industrial Applications, vol. 41, No. 5, pp. 1281-1291, Oct. 2005.

Liserre, et al., "Genetic algorithm-based design of the active damping for an LCL-filter three-phase active rectifier," IEEE Trans. Power Electron., vol. 19, No. 1, pp. 76-86, Jan. 2004.

Liu, et. al., "A novel design and optimization method of an LCL filter for a shunt active power filter," IEEE Trans. Ind. Electron., vol. 61, No. 8, pp. 4000-4010, Aug. 2014.

Luo, et al., "Fuzzy—PI-based direct-output-voltage control strategy for the statcom used in utility distribution systems," IEEE Trans. Ind. Electron., vol. 56, No. 7, pp. 2401-2411, Jul. 2009.

Marei, et al., "A Coordinated Voltage and Frequency Control of Inverter Based Distributed Generation and Distributed Energy Storage System for Autonomous Microgrids," Electric Power Components and Systems, vol. 41, Issue 4, Feb. 2013, pp. 383-400.

Marquardt, "An algorithm for least-squares estimation of nonlinear parameters," Journal of the Society for Industrial and Applied Mathematics, vol. 11, No. 2, pp. 431-441, Jun. 1963.

Moreno, et al., "A robust predictive current control for three-phase grid-connected inverters," IEEE Transactions on Industrial Electronics, vol. 56, No. 6, pp. 1993-2004, Jun. 2009.

Mullane, et al., "Wind-turbine fault ride-through enhancement," IEEE Trans. Power Syst., vol. 20, No. 4, pp. 1929-1937, Nov. 2005.

Pan, et al., "Capacitor-current-feedback active damping with reduced computation delay for improving robustness of LCL-type grid-connected inverter," IEEE Trans. Power Electron., vol. 29, No. 7, pp. 3414-3427, Jul. 2014.

Pena, et al., "Doubly fed induction generator using back-to-back PWM converters and its application to variable speed wind-energy generation," IEE Proc.—Electr. Power Appl., vol. 143, No. 3, May 1996, pp. 231-241.

Pena-Alzola, et al., "A self-commissioning notch filter for active damping in a three-phase LCL-filter-based grid-tie converter," IEEE Trans. Power Electron., vol. 29, No. 12, pp. 6754-6761, Dec. 2014.

Pena-Alzola, et al., "Analysis of the passive damping losses in LCL-filter-based grid converters," IEEE Trans. Power Electron., vol. 28, No. 6, pp. 2642-2646, Jun. 2013.

Pogaku, et al., "Modeling, analysis and testing of autonomous operation of an inverter-based microgrid," IEEE Trans. Power Electron., vol. 22, No. 2, pp. 613-625, Mar. 2007.

Prokhorov, et al., "Adaptive critic designs," IEEE Transactions on Neural Networks, pp. 997-1007, Sep. 1997.

Rabelo, et al., "Reactive Power Control Design in Doubly Fed Induction Generators for Wind Turbines," IEEE Transactions on Industrial Electronics, vol. 56, No. 10, Oct. 2009, pp. 4154-4162.

Rocabert, et al., "Intelligent connection agent for three-phase grid-connected microgrids," IEEE Transactions on Power Electronics, vol. 26, No. 10, pp. 2993-3005, Oct. 2011.

Rockhill, et al., "Grid filter design for a multi-megawatt medium-voltage voltage source inverter," IEEE Trans. Ind. Electron., vol. 58, No. 4, Apr. 2011.

Roshan, et al., "A d-q frame controller for a full-bridge single phase inverter used in small distributed power generation systems," in Proc. IEEE Applied Power Electronics Conference, Anaheim, CA, USA, Mar. 2007, pp. 641-647.

RT-LAB 10.4 User Guide, Opal-RT Technologies Inc., RT-Lab, Montreal, QC, Canada, 2010.

Saitou, et al., "Generalized theory of instantaneous active and reactive powers in single-phase circuits based on hilbert transform," in Proc. Power Electronics Specialists Conference (PESC), Cairns, Queensland, Australia, Jun. 2002, pp. 1419-1424.

Senturk, et al., "Power capability investigation based on electro-thermal models of press-pack IGBT three-level NPC and ANPC VSCs for multimegawatt wind turbines," IEEE Trans. Power Electron., vol. 27, No. 7, pp. 3195-3206, Jul. 2012.

Teodorescu, et al., "Proportional-resonant controllers and filters for grid-connected voltage-source converters," IEE Proc.—Electr. Power Appl., vol. 153, No. 5, pp. 750-762, Sep. 2006.

Venayagamoorthy, et al., "Comparison of heuristic dynamic programming and dual heuristic programming adaptive critics for neurocontrol of a turbogenerator," IEEE Transactions on Neural Networks, vol. 13, No. 3, pp. 764-773, May 2002.

Wang, et al., "Adaptive dynamic programming: An introduction," IEEE Computational Intelligence Magazine, vol. 4, No. 2, pp. 39-47, May 2009.

Wang, et al., "Short-Time Overloading Capability and Distributed Generation Applications of Solid Oxide Fuel Cells," IEEE Trans. Energy Convers., vol. 22, No. 4, Dec. 2007, pp. 898-906.

Wu, et al., "A new design method for the passive damped LCL and LLCL filter-based single-phase grid-tied inverter," IEEE Trans. Ind. Electron., vol. 60, No. 10, pp. 4339-4350, Oct. 2013.

Wu, et al., "A new LCL-filter with in-series parallel resonant circuit for single-phase grid-tied inverter," IEEE Transactions on Industrial Electronics, vol. 61, No. 9, pp. 4640-4644, Sep. 2014.

Wu, et al., "A robust passive damping method for LLCL filter based grid-tied inverters to minimize the effect of grid harmonic voltages," IEEE Trans. Power Electron., vol. 29, No. 7, Jul. 2014.

Wu, et al., "Digital current control of a voltage source converter with active damping of LCL resonance," IEEE Trans. Power Electron., vol. 21, No. 5, pp. 1364-1373, Sep. 2006.

(56) References Cited

OTHER PUBLICATIONS

Xiong, et al., "Modeling and Transient Behavior Analysis of an Inverter-based Microgrid," Electric Power Components and Systems, vol. 40, Issue 1, Nov. 2011, pp. 112-130.
Xu, et al., "Active damping-based control for grid-connected LCL-filtered inverter with injected grid current feedback only," IEEE Trans. Ind. Electron., vol. 61, No. 9, pp. 4746-4758, Sep. 2014.
Yang, et al., "Impedance shaping of the grid-connected inverter with LCL filter to improve its adaptability to the weak grid condition," IEEE Trans. Power Electron., vol. 29, No. 11, pp. 5795-5805, Nov. 2014.
Zhang, et al., "A grid simulator with control of single-phase power converters in d-q rotating frame," in Proc. IEEE Power Electronics Specialists Conference, Cairns, Queensland, Australia, Jun. 2002, pp. 1431-1436.
Zhang, et al., "Optimal Microgrid Control and Power Flow Study with Different Bidding Policies by Using PowerWorld Simulator," IEEE Trans. Sustain Energy, vol. 5, Issue 1, pp. 282-292, Jan. 2014.
"Induction motor (ACMOT4166) data sheet form Motorsolver LLC", [Online]. Available: http://motorsolver.com/wp/wp-content/uploads/2015/03/4-DYNO-IM-SPECS-small.pdf.
Barnard, "Temporal-Difference Methods and Markov Models," IEEE Transactions on Systems, Man, and Cybernetics, vol. 23, No. 2, 1993, pp. 357-365.
Ben-Brahim, et al., "Identification of induction motor speed using neural networks", Proc. Power Convers. Conf., Yokohama, Japan, 1993, pp. 689-694.
Bishop, "Neural Networks for Pattern Recognition," Oxford University Press, 1995, 495 pages.
Chan, "The State of the Art of Electric and Hybrid Vehicles," Proceedings of the IEEE, vol. 90, No. 2, 2002, pp. 247-279.
Fairbank, et al., "An Adaptive Recurrent Neural-Network Controller using a Stabilization Matrix and Predictive Inputs to Solve the Tracking Problem under Disturbances," Neural Networks, vol. 49, 2013, 35 pages.
Fairbank, et al., "The Divergence of Reinforcement Learning Algorithms with Value-Iteration and Function Approximation," Proceedings of the IEEE International Joint Conference on Neural Networks (IJCNN'12), IEEE Press, 2012, pp. 3070-3077.
Feldkamp, et al., "A Signal Processing Framework Based on Dynamic Neural Networks with Application to Problems in Adaptation, Filtering, and Classification," Proceedings of the IEEE, vol. 86, No. 11, 1998, pp. 2259-2277.
Glanzmann "FACTS Flexible Alternating Current Transmission Systems", 2005, 31 pages.
Hochreiter, et al., "Long Short-Term Memory," Neural Computation, vol. 9, No. 8, 1997, pp. 1735-1780.
Kenne, et al., "An Online Simplified Rotor Resistance Estimator for Induction Motors", IEEE Trans. Control Syst. Technol., vol. 18, No. 5, 2010, pp. 1188-1194.
Kirk, "Optimal Control Theory: An Introduction," Chapters 1-3, Prentice-Hall, Englewood Cliffs, NJ, 1970, 471 pages.
Li, et al., "Analysis of decoupled d-q vector control in DFIG back-to-back PWM converter", IEEE Power Eng. Soc. Gen. Meeting, 2007, pp. 1-7.
Li, et al., "Conventional and Novel Control Designs for Direct Driven PMSG Wind Turbines," Electric Power System Research, vol. 80, Issue 3, 2010, pp. 328-338.
Li, et al., "Nested-Loop Neural Network Vector Control of Permanent Magnet Synchronous Motors," The 2013 International Joint Conference on Neural Network, Dallas, Texas, 2013, 1 page.
Li, et al., "The Comparison of Control Strategies for the Interior PMSM Drive used in the Electric Vehicle," The 25th World Battery, Hybrid and Fuel Cell Electric Vehicle Symposium & Exhibition, Shenzhen, China, 2010, 6 pages.
Malfait, "Audible noise and losses in variable speed induction motor drives with IGBT inverters-influence of the squirrel cage design and the switching frequency", Proc. IEEE Ind. Appl. Soc. Annu. Meeting, Denver, CO, USA, 1994, pp. 693-700.
Marino, et al., "On-line stator and rotor resistance estimation for induction motors", IEEE Trans. Control Syst. Technol., vol. 8, No. 3, 2009, pp. 570-579.
Park, et al., "New External Neuro-Controller for Series Capacitive Reactance Compensator in a Power Network," IEEE Transactions on Power Systems, vol. 19, No. 3, 2004, pp. 1462-1472.
Peng, et al., "Speed control of induction motor using neural network sliding mode controller", Proc. Int. Cont. Electr. Inf. Control Eng., Wuhan, China, 2011, pp. 6125-6129.
Qiao, et al., "Coordinated Reactive Power Control of a Large Wind Farm and a STATCOM Using Heuristic Dynamic Programming," IEEE Transactions on Energy Conversion, vol. 24, No. 2, 2009, pp. 493-503.
Qiao, et al., "Fault-Tolerant Optimal Neurocontrol for a Static Synchronous Series Compensator Connected to a Power Network," IEEE Transactions on Industry Applications, vol. 44, No. 1, 2008, pp. 74-84.
Qiao, et al., "Optimal Wide-Area Monitoring and Nonlinear Adaptive Coordinating Neurocontrol of a Power System with Wind Power Integration and Multiple FACTS Devices," Neural Networks, vol. 21, No. 2, 2008, pp. 466-475.
Qiao, et al., "Real-Time Implementation of a STATCOM on a Wind Farm Equipped with Doubly Fed Induction Generators," IEEE Transactions on Industry Applications, vol. 45, No. 1, 2009, pp. 98-107.
Prokhorov, et al., "Adaptive Behavior with Fixed Weights in RNNs: An Overview," Proceedings of the 2002 International Joint Conference on Neural Networks, (IJCNN'02), vol. 3, IEEE Press, 2002, pp. 2018-2022.
Restrepo, et al., "ANN based current control of a VSI fed AC machine using line coordinates", Proc. 5th IEEE Int. Caracas Conf. Devices Circuits Syst, 2004, pp. 225-229.
Restrepo, et al., "Induction machine current loop neurocontroller employing a Lyapunov based training algorithm", Proc. IEEE Power Eng. Soc. Gen. Meeting, Tampa, FL, USA, 2003, pp. 1-8.
Riedmiller, et al., "A Direct Adaptive Method for Faster Backpropagation Learning: The RPROP Algorithm," Proceedings of the IEEE International Conference on Neural Networks, San Francisco, CA, 1993, pp. 586-591.
Sarangapani, et al., "Neural-Network-Based State Feedback of a Nonlinear Discrete-Time System in Nonstrict Feedback Form", IEEE Trans on Neural Networks vol. 9, No. 12, 2008, pp. 2073-2087.
Venayagamoorthy, et al., "Implementation of Adaptive Critic-Based Neurocontrollers for Turbogenerators in a Multimachine Power System," IEEE Transactions on Neural Networks, vol. 14, No. 5, 2003, pp. 1047-1064.
Wang, et al., "Short-Time Overloading Capability and Distributed Generation Applications of Solid Oxide Fuel Cells," IEEE Transactions on Energy Conversion, vol. 22, No. 4, 2007, pp. 898-906.
Werbos, "Backpropagation Through Time: What it Does and How to Do it," Proceedings of the IEEE, vol. 78, No. 10, 1990, pp. 1550-1560.
Werbos, "Backwards Differentiation in AD and Neural Nets: Past Links and New Opportunities," Automatic Differentiation: Applications, Theory and Implementations, Bucker, H., et al., Lecture Notes in Computational Science and Engineering, Springer, 2006, 15 pages.
Werbos, et al., "Neural Networks, System Identification, and Control in the Chemical Process Industries," Handbook of Intelligence Control, Chapter 10, Section 10.6.1-10.6.2, White, Sofge, eds., New York, Van Nostrant Reinhold, New York, 1992, pp. 283-356, vvww.werbos.corn.
Werbos, "Stable Adaptive Control Using New Critic Designs," eprintarXiv:adap-org/9810001, Sections 77-78, 1998.
Werbos, "Approximate Dynamic Programming for Real-Time Control and Neural Modeling," Handbook of Intelligent Control, Chapter 13, White, Sofge, eds., New York, Van Nostrand Reinhold, 1992, pp. 493-525.
Xu, et al., "Dynamic Modeling and Control of DFIG-Based Wind Turbines Under Unbalanced Network Conditions," IEEE Transactions on Power Systems, vol. 22, No. 1, 2007, pp. 314-323.

(56) References Cited

OTHER PUBLICATIONS

International Search Report and Written Opinion, dated Nov. 6, 2014, in International Application No. PCT/US2014/049724.

* cited by examiner

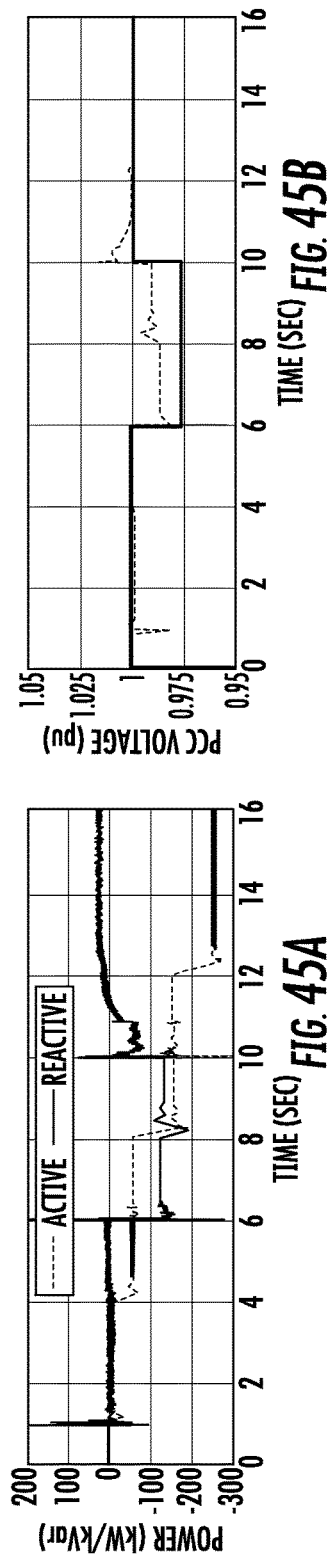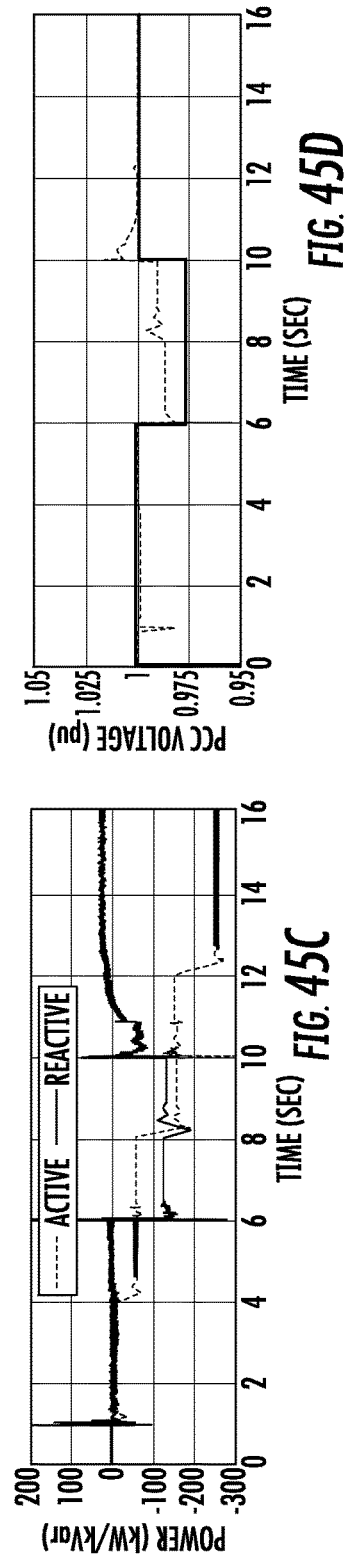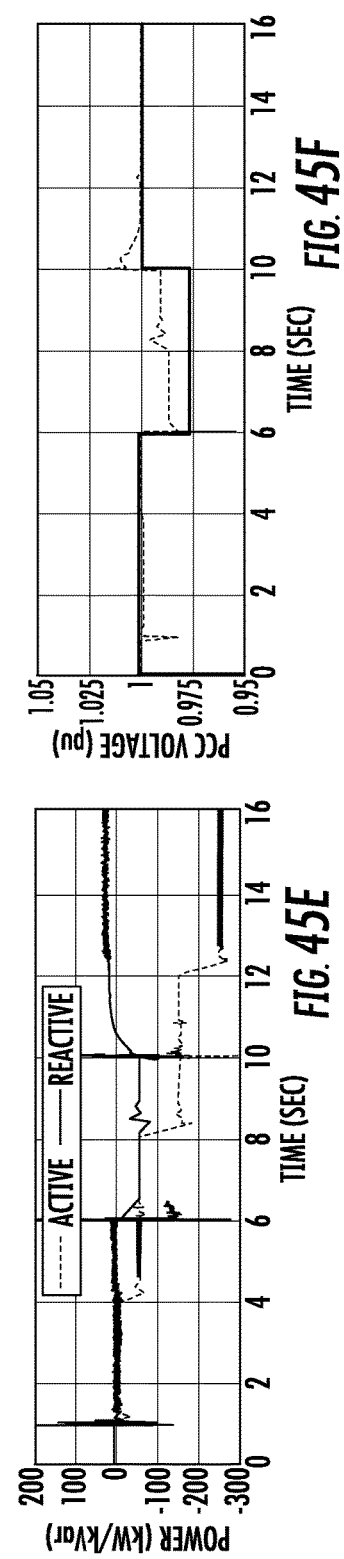

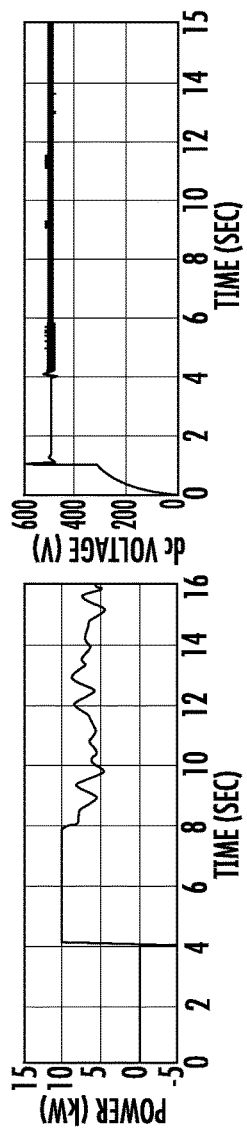
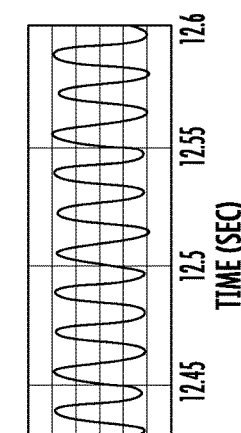
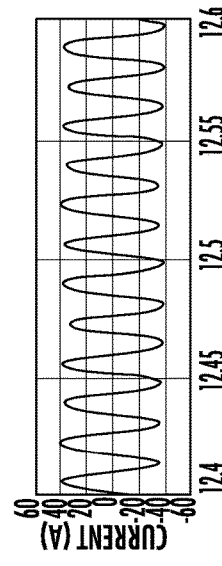
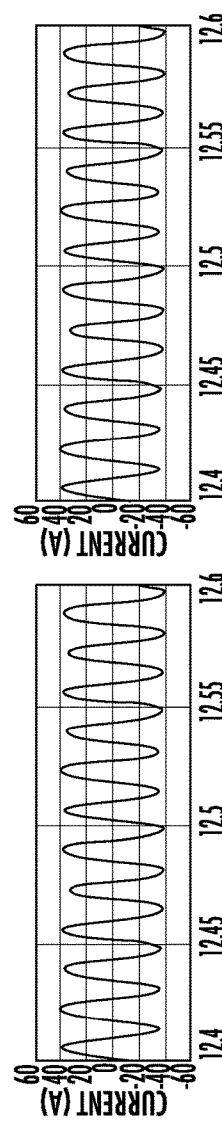

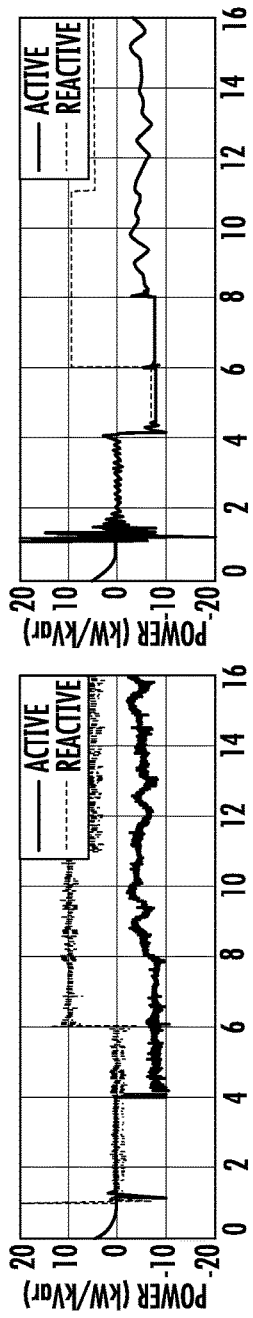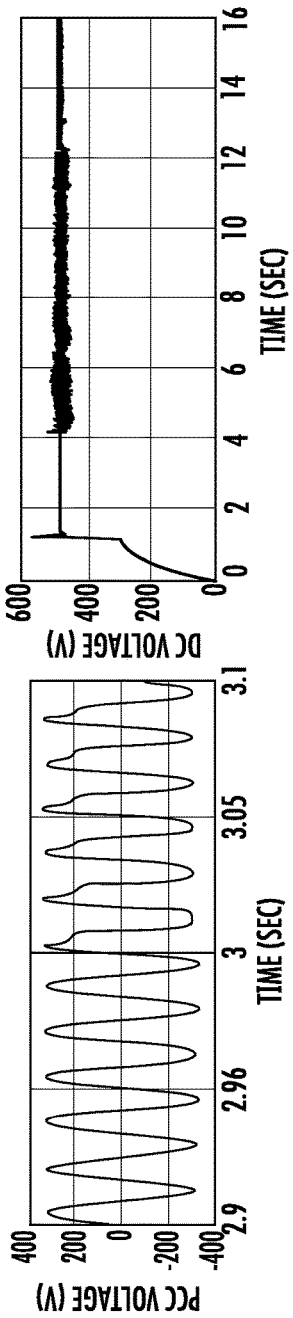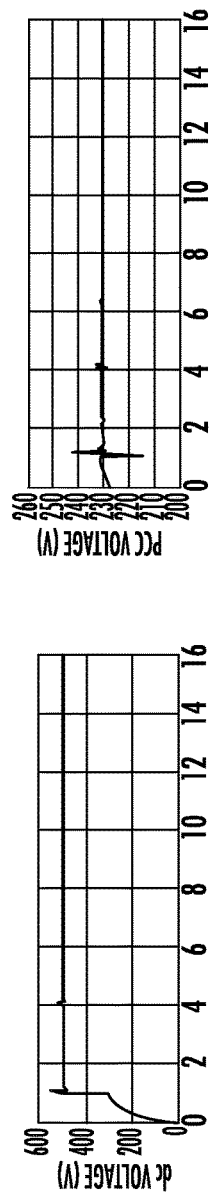
FIG. 55A  FIG. 55B  FIG. 56A  FIG. 56B  FIG. 57A  FIG. 57B

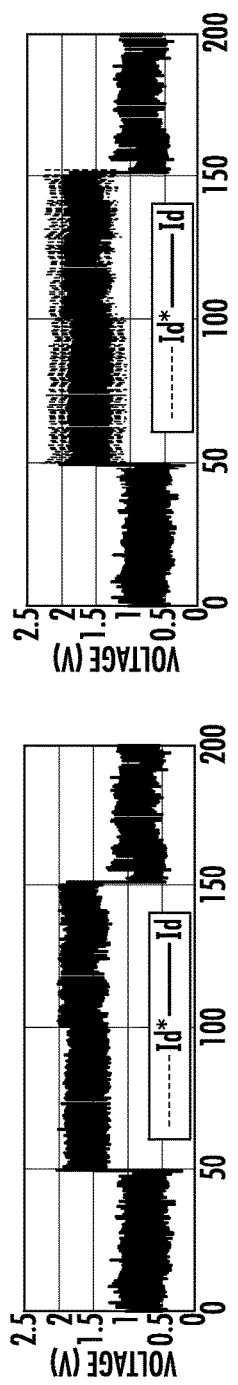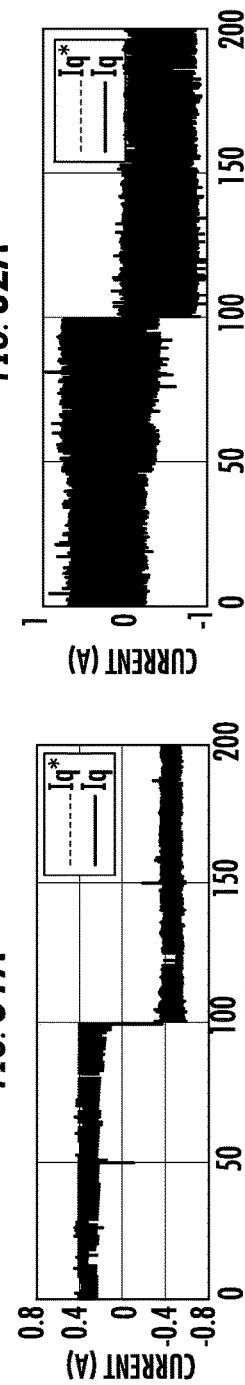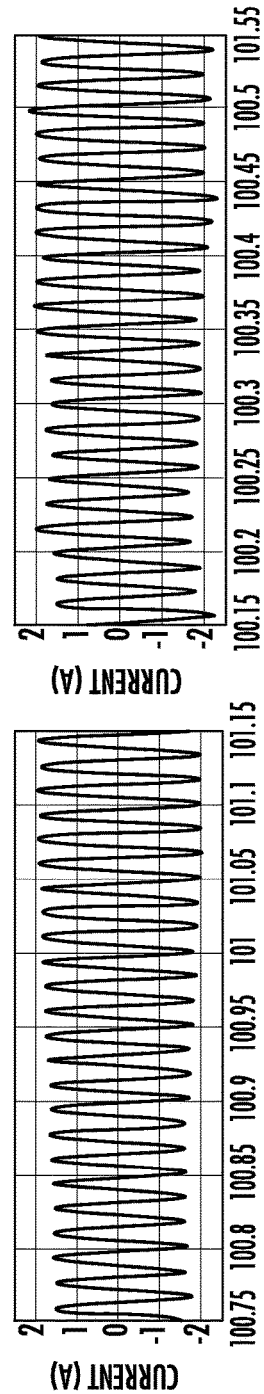
FIG. 61A  FIG. 61B  FIG. 61C
FIG. 62A  FIG. 62B  FIG. 62C

SYSTEMS AND METHODS FOR PROVIDING VECTOR CONTROL OF A GRID CONNECTED CONVERTER WITH A RESONANT CIRCUIT GRID FILTER

CROSS-REFERENCE TO RELATED APPLICATIONS

This application claims the benefit of U.S. Provisional Patent Application No. 62/158,790, filed on May 8, 2015, entitled "SYSTEMS AND METHODS FOR PROVIDING VECTOR CONTROL OF A GRID CONNECTED CONVERTER WITH A RESONANT CIRCUIT GRID FILTER," the disclosure of which is expressly incorporated herein by reference in its entirety.

BACKGROUND

With the growing use of renewable power sources in distributed generation, grid connected converters ("GCCs") are playing an increasingly important role as the interface between renewable energy sources and the utility grid. Filters, such as L-, LC-, or LCL filters, are used to attenuate the switching harmonics generated by GCCs. In many applications, LCL-filters are preferred in high-power GCC systems (e.g., systems with a power rating greater than 1 MW) due to their lower cost and superior harmonic attenuation capability as compared to L-filters.

However, a GCC incorporating an LCL-filter is a third-order system, which could cause instability problems and therefore make the control of the GCC difficult. Unlike a GCC incorporating an L-filter (also referred to as an "L-GCC" herein), very few vector control strategies for an LCL-based GCC (also referred to as an "LCL-GCC" herein) have been reported because of the difficulty to decouple the d- and q-axis control loops. One conventional vector control technique is to neglect the capacitor dynamics, thereby simplifying the vector control problem to that of a first-order L-GCC system. However, this results in imprecise description of the LCL-GCC system and potential oscillatory and/or unstable dynamic behavior if the LCL-filter or the GCC is not properly damped.

Conventional damping strategies for vector control of an LCL-GCC mainly fall into two categories: 1) Passive Damping ("PD"), and 2) Active Damping ("AD"). PD modifies the filter structure with the addition of passive elements such as resistors. AD modifies the controller parameters or the controller structure either by cutting the resonance peak and/or by adding a phase lead around the resonance frequency range. However, neither of these damping strategies solves the decoupling problem of an LCL-GCC system.

SUMMARY

An example system for controlling a grid-connected energy source using a neural network is described herein. The example system can include a grid-connected converter ("GCC") operably coupled between an electrical grid and an energy source, a n-order grid filter (e.g., where n is an integer greater than or equal to 2) operably coupled between the electrical grid and the GCC, and a nested-loop controller. The nested-loop controller can have inner and outer control loops and can be operably coupled to the GCC. A d-axis loop can control real power, and a q-axis loop can control reactive power. Additionally, the inner control loop can include a neural network that is configured to optimize dq-control voltages for controlling the GCC. The neural network can account for circuit dynamics (e.g., resonant circuit dynamics) of the n-order grid filter while optimizing the dq-control voltages.

Optionally, the neural network can be configured to implement a dynamic programming ("DP") algorithm. For example, the DP algorithm can include a cost function associated with a discrete-time system model, where the discrete-time system model includes parameters for one or more inductors and capacitors of the n-order grid filter. Alternatively or additionally, the neural network can optionally be configured to determine an optimal trajectory of the dq-control voltages that minimizes the cost function associated with the discrete-time system model.

Alternatively or additionally, the neural network can optionally be trained using a Levenberg-Marquardt ("LM") algorithm. In addition, the neural network can optionally be trained using a forward accumulation through time ("FATT") algorithm in conjunction with the LM algorithm.

Optionally, the neural network can include a preprocessing stage configured to regulate input signals to the neural network within a predetermined range.

Optionally, the neural network can include a multi-layer perceptron including a plurality of input nodes, a plurality of hidden layer nodes and a plurality of output nodes. For example, the neural network can be a multi-layer feed forward neural network having one or more hidden layers, each of the hidden layers comprising m nodes, wherein m is an integer.

Alternatively or additionally, each respective node of the neural network can optionally be configured to implement a sigmode function.

Alternatively or additionally, the neural network can optionally be further configured to receive a plurality of input signals including dq-current error signals and respective integrals of the dq-current error signals. The dq-current error signals can be differences between d-axis and q-axis currents and d-axis and q-axis reference currents, respectively. The neural network can be configured to optimize the dq-control voltages based on the input signals.

Alternatively or additionally, the n-order grid filter can optionally be a 2nd or 3rd order grid filter.

Alternatively or additionally, the system does not include a passive or active damping control structure.

Alternatively or additionally, the outer control loop can optionally include at least one proportional-integral ("PI") controller.

Alternatively or additionally, the GCC can optionally be a three-phase GCC.

Alternatively or additionally, the GCC can optionally be a single-phase GCC, and an imaginary orthogonal circuit can be generated based on a real circuit. The real circuit can include the single-phase GCC, the n-order grid filter, the energy grid and the energy source. The imaginary orthogonal circuit can incorporate a $\pi/2$ phase shift relative to the real circuit. Additionally, an amplitude of the imaginary orthogonal circuit can be approximately equal to an amplitude of the real circuit.

Alternatively or additionally, the GCC can optionally be a pulse-width modulated ("PWM") converter.

Alternatively or additionally, the energy source can optionally be a solar cell or array, a battery, a fuel cell, a wind turbine generator, a micro-turbine generator, a static synchronous compensator ("STATCOM") or a high-voltage DC transmission system.

An example system for controlling a grid-connected energy source using a direct current control technique is described herein. The example system can include a GCC operably coupled between an electrical grid and an energy source, a n-order grid filter (e.g., where n is an integer greater than or equal to 2) operably coupled between the electrical grid and the GCC, and a nested-loop controller. The nested loop controller can have inner and outer control loops and can be coupled to the GCC. A d-axis loop can control real power, and a q-axis loop can control reactive Additionally, the nested-loop controller can be configured to determine dq-current error signals, adjust dq-tuning currents based on the dq-current error signals, and convert the dq-tuning currents to dq-control voltages for controlling the GCC. The dq-current error signals can be differences between d-axis and q-axis currents and d-axis and q-axis reference currents, respectively. In addition, the conversion can account for resonant circuit dynamics (e.g., resonant circuit dynamics) of the n-order grid filter.

Optionally, converting the dq-tuning currents to the dq-control voltages can include balancing dq-currents and voltages across the n-order grid filter.

Alternatively or additionally, adjusting the dq-tuning currents can optionally include minimizing a root-mean-square ("RMS") error of the dq-current error signals using an adaptive control strategy.

Optionally, the adaptive control strategy can include prioritizing real power control while meeting reactive power demand as much as possible. For example, the adaptive control strategy can optionally further include determining if an amplitude of either of the dq-reference currents exceeds a rated current of the GCC, and if the amplitude of either of the dq-reference currents exceeds the rated current, maintaining the d-axis reference current and adjusting the q-axis reference current. Alternatively or additionally, the adaptive control strategy can optionally further include determining if an absolute value of either of the dq-control voltages exceeds a saturation limit of the GCC, and if the absolute value of either of the dq-control voltages exceeds the saturation limit, adjusting a d-axis control voltage and maintaining a q-axis control voltage.

Alternatively or additionally, the n-order grid filter can optionally be a 2nd or 3rd order grid filter.

Alternatively or additionally, the system does not include a passive or active damping control structure.

Alternatively or additionally, the inner and outer control loops can optionally include at least one proportional-integral ("PI") controller.

Alternatively or additionally, the GCC can optionally be a three-phase GCC.

Alternatively or additionally, the GCC can optionally be a single-phase GCC, and an imaginary orthogonal circuit can be generated based on a real circuit. The real circuit can include the single-phase GCC, the n-order grid filter, the energy grid and the energy source. The imaginary orthogonal circuit can incorporate a π/2 phase shift relative to the real circuit. Additionally, an amplitude of the imaginary orthogonal circuit can be approximately equal to an amplitude of the real circuit.

Alternatively or additionally, the GCC can optionally be a pulse-width modulated ("PWM") converter.

Alternatively or additionally, the energy source can optionally be a solar cell or array, a battery, a fuel cell, a wind turbine generator, a micro-turbine generator, a static synchronous compensator ("STATCOM") or a high-voltage DC transmission system.

It should be understood that the above-described subject matter may also be implemented as a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 27(a) is a graph illustrating d-q currents using conventional vector control. FIG. 27(b) is a graph illustrating d-q currents using NN vector control. FIG. 27(c) is a graph illustrating single-phase current using conventional vector control. FIG. 27(d) is a graph illustrating single-phase current using NN vector control.

FIG. 28(a) is a graph illustrating d-q currents using conventional vector control. FIG. 28(b) is a graph illustrating d-q currents using NN vector control.

FIG. 29(a) is a graph illustrating d-q currents using conventional vector control. FIG. 29(b) is a graph illustrating d-q currents using NN vector control. FIG. 29(c) is a graph illustrating single-phase current using conventional vector control. FIG. 29(d) is a graph illustrating single-phase current using NN vector control.

FIG. 30(a) is a graph illustrating d-q currents using conventional vector control. FIG. 30(b) is a graph illustrating d-q currents using NN vector control. FIG. 30(c) is a graph illustrating single-phase current using conventional vector control. FIG. 30(d) is a graph illustrating single-phase current using NN vector control.

FIG. 43(a) is a graph illustrating active and reactive power at $PCC_1$. FIG. 43(b) is a graph illustrating active and reactive power at $PCC_2$. FIG. 43(c) is a graph illustrating DC-link voltage. FIG. 43(d) is a graph illustrating three-phase current at $PCC_1$.

FIG. 44(a) is a graph illustrating DC-link voltage for an LC-filter GCC. FIG. 44(b) is a graph illustrating three-phase current at $PCC_1$ for an LC-filter GCC. FIG. 44(c) is a graph illustrating DC-link voltage for an LCL-filter GCC. FIG. 44(d) is a graph illustrating three-phase current at $PCC_1$ for an LCL-filter GCC.

FIGS. 45(a)-45(f) are graphs illustrating performance evaluation of grid voltage support control for the three-phase L-GCC, LC-GCC and LCL-GCC systems. FIG. 45(a) is a graph illustrating active and reactive power at $PCC_1$ for an L-filter. FIG. 45(b) is a graph illustrating bus voltage at $PCC_1$ for an L-filter. FIG. 45(c) is a graph illustrating active and reactive power at $PCC_1$ for an LC-filter. FIG. 45(d) is a graph illustrating bus voltage at $PCC_1$ for an LC-filter. FIG. 45(e) is a graph illustrating active and reactive power at $PCC_1$ for an LCL-filter. FIG. 45(f) is a graph illustrating bus voltage at $PCC_1$ for an LCL-filter.

FIGS. 53(a)-53(d) are graphs illustrating performance for a single-phase L-GCC system. FIG. 53(a) is a graph illustrating PV array output power. FIG. 53(b) is a graph illustrating active and reactive power at PCC. FIG. 53(c) is a graph illustrating DC-link voltage. FIG. 53(d) is a graph illustrating PCC current.

FIGS. 54(a)-54(b) are graphs illustrating PCC current for a single-phase LC-GCC system (FIG. 54(a)) and a single-phase LCL-GCC system (FIG. 54(b)), respectively.

FIGS. 55(a)-55(b) are graphs illustrating PCC power comparison for variation of grid filter parameters in L-filter GCC. FIG. 55(a) is a graph illustrating a 50% reduction. FIG. 55(b) is a graph illustrating a 50% increase.

FIGS. 56(a)-56(b) are graphs illustrating an evaluation of DCC vector control under a distorted PCC voltage condition for L-filter GCC. FIG. 56(a) is a graph illustrating PCC voltage. FIG. 56(b) is a graph illustrating DC-link voltage.

FIGS. 57(a)-57(c) are graphs illustrating performance under normal operating condition for the single-phase LCL-filter GCC. FIG. 57(a) is a graph illustrating DC-link voltage. FIG. 57(b) is a graph illustrating PCC RMS voltage. FIG. 57(c) is a graph illustrating PCC power.

FIG. 58(a) is a graph illustrating DC-link voltage. FIG. 58(b) is a graph illustrating PCC RMS voltage. FIG. 58(c) is a graph illustrating PCC power.

FIG. 60(a) is a graph illustrating DC-link voltage. FIG. 60(b) is a graph illustrating d-axis reference and actual currents at PCC. FIG. 60(c) is a graph illustrating q-axis reference and actual currents at PCC. FIG. 60(d) is a graph illustrating PCC current.

FIGS. 61(a)-61(c) are graphs illustrating the hardware test evaluation for a single-phase LC-filter GCC. FIG. 61(a) is a graph illustrating d-axis reference and actual currents at PCC. FIG. 61(b) is a graph illustrating q-axis reference and actual currents at PCC. FIG. 61(c) is a graph illustrating PCC current.

FIGS. 62(a)-62(c) are graphs illustrating the hardware test evaluation for a single-phase L-filter GCC. FIG. 62(a) is a graph illustrating d-axis reference and actual currents at PCC. FIG. 62(b) is a graph illustrating q-axis reference and actual currents at PCC. FIG. 62(c) is a graph illustrating PCC current.

DETAILED DESCRIPTION

Figure 1:
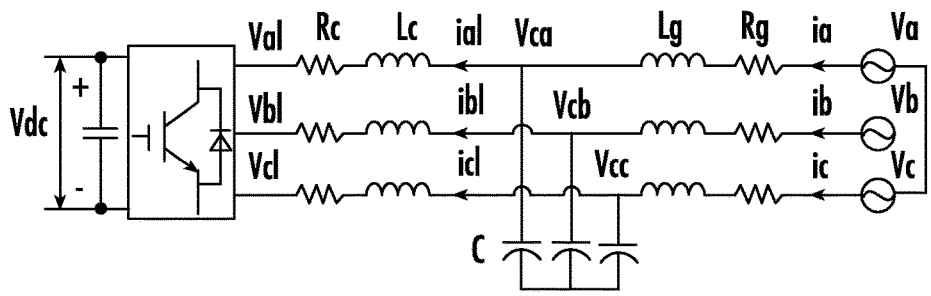
FIG. 1 is a schematic diagram of an LCL-filter-based GCC (LCL-GCC).

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for providing vector control of a GCC with a resonant circuit grid filter (e.g., an L-, LC, or LCL-filter), it will become evident to those skilled in the art that the implementations are not limited thereto.

Vector Control Using a Neural Network

In recent years, research has been conducted in the area of dynamic programming ("DP") for optimal control of nonlinear systems. Adaptive critic designs ("ACD") constitute a class of approximate dynamic programming ("ADP") methods that use incremental optimization techniques combined with parametric structures that approximate the optimal cost and cost and the control of a system. Both Heuristic Dynamic Programming ("HDP") and Dual Heuristic Heuristic Programming ("DHP") have been used to control a turbogenerator. Additionally, an ADP-based RNN controller has been trained and used to control an L-GCC system, which demonstrated excellent performance compared to a conventional vector controller.

As described herein, systems and method for providing vector control of a GCC incorporating an LC-filter (also referred to as an "LC-GCC" herein) or an LCL-GCC using an ADP-based recurrent neural network ("RNN") are provided. The RNN-based vector control techniques described herein for an LC-GCC or LCL-GCC can overcome the decoupling difficulty and resonant problems, as well as implement optimal vector control for an LC-GCC or LCL-GCC system using an RNN. For example, the techniques describe herein include: 1) an approach to implement optimal vector control for LC-GCC or LCL-GCC systems by using RNNs that can overcome the decoupling difficulty and damping resonant phenomenon properly, 2) a mechanism to train the RNN controller by using a LM+FATT algorithm, 3) investigation and comparison of the RNN vector controller with conventional PD- and AD-based vector controllers under dynamic, variable and power converter switching conditions, and 4) hardware validation and comparison in unbalanced and distorted system conditions.

Vector Control Methods

LCL-Filter-Based Grid-Connected Converter and its State Space Model

FIG. 1 shows the schematic of an LCL-filter-based GCC (LCL-GCC), in which a DC-link capacitor is on the left, a three-phase voltage source, representing the voltage at the Point of Common Coupling (PCC) of the ac system, is on the right, and the LCL filter is in the middle.

In the d-q frame, the state space model for the LCL-GCC system is expressed by (1), $$\frac{d}{dt} \begin{bmatrix} i_d \\ i_q \\ i_{d1} \\ i_{q1} \\ v_{cd} \\ v_{cq} \end{bmatrix} = \begin{bmatrix} -\frac{R_g}{L_g} & \omega_s & 0 & 0 & -\frac{1}{L_g} & 0 \\ -\omega_s & -\frac{R_g}{L_g} & 0 & 0 & 0 & -\frac{1}{L_g} \\ 0 & 0 & -\frac{R_c}{L_c} & \omega_s & \frac{1}{L_c} & 0 \\ 0 & 0 & -\omega_s & -\frac{R_c}{L_c} & 0 & \frac{1}{L_c} \\ \frac{1}{C} & 0 & -\frac{1}{C} & 0 & 0 & \omega_s \\ 0 & \frac{1}{C} & 0 & -\frac{1}{C} & -\omega_s & 0 \end{bmatrix} \quad (1)$$

$$\begin{bmatrix} i_d \\ i_q \\ i_{d1} \\ i_{q1} \\ v_{cd} \\ v_{cq} \end{bmatrix} + \begin{bmatrix} \frac{1}{L_g} & 0 & 0 & 0 & 0 & 0 \\ 0 & \frac{1}{L_g} & 0 & 0 & 0 & 0 \\ 0 & 0 & -\frac{1}{L_c} & 0 & 0 & 0 \\ 0 & 0 & 0 & -\frac{1}{L_c} & 0 & 0 \\ 0 & 0 & 0 & 0 & 0 & 0 \\ 0 & 0 & 0 & 0 & 0 & 0 \end{bmatrix} \begin{bmatrix} v_d \\ v_q \\ v_{d1} \\ v_{q1} \\ 0 \\ 0 \end{bmatrix}$$

where $\omega_s$ is the angular frequency of the grid voltage and all the other symbols in (1) are consistent with those indicated in FIG. 1, e.g., ia, ib, ic↔id, iq; ia1, ib1, ic1↔id1, iq1; vca, vcb, vcc↔vcd, vcq; va, vb, vc↔vd, vq; and va1, vb1, vc1↔vd1, vq1.

For implementation of the RNN based digital controller, the continuous state space model (1) needs to be transferred into the equivalent discrete model (2) through either a zero-order or first-order hold discrete equivalent mechanism:

$$\vec{i}_{dqs}(k+1) = A\vec{i}_{dqs}(k) + B\vec{u}_{dqs}(k) \quad (2)$$

in which, $\vec{i}_{dqs}$ and $\vec{u}_{dqs}$ represent [id; iq; id1; iq1; vcd; vcq]' and [vd; vq; vd1; vq1; 0; 0]', respectively; A stands for system matrix and B is the input matrix.

Note that in (1) and (2), vd1 and vq1 are control actions from current controller, while id and iq are the grid currents that need to be controlled.

Decoupled Vector Control

An obstacle to using the vector control is the difficulty to decouple an LCL-GCC system, which is almost impossible according to (1). To overcome this challenge, a mechanism to neglect the capacitance of an LCL filter has been proposed, and therefore a decoupled vector control strategy has been developed for an LCL-GCC based on the simplified L-GCC system. Neglecting the capacitance C, the state space model of the LCL-GCC system (1) is simplified as (3):

$$\frac{d}{dt}\begin{bmatrix} i_d \\ i_q \end{bmatrix} = -\begin{bmatrix} \frac{R_g+R_c}{L_g+L_c} & -\omega_s \\ \omega_s & \frac{R_g+R_c}{L_g+L_c} \end{bmatrix}\begin{bmatrix} i_d \\ i_q \end{bmatrix} - \frac{1}{L_g+L_c}\begin{bmatrix} v_{d1} - v_d \\ v_{q1} - v_q \end{bmatrix} \quad (3)$$

By rewriting (3), the simplified L-GCC system is expressed as:

$$v_{d1} = \underbrace{-(R_g + R_c)i_d + (L_g + L_c)\frac{di_d}{dt}}_{v'_d} + \omega_s(L_g + L_c)i_q + v_d \quad (4)$$

$$v_{q1} = \underbrace{-(R_g + R_c)i_q + (L_g + L_c)\frac{di_q}{dt}}_{v'_q} - \omega_s(L_g + L_c)i_d \quad (5)$$

in which, those items denoted as vd' and vq' are treated as the state equations between the input voltages and output currents for the d- and q-axis current loops and the other terms are regarded as compensation items. Therefore, the corresponding transfer function 1=[(Rg+Rc)+(Lg+Lc)s] is used to design the current-loop controller.

Figure 2:
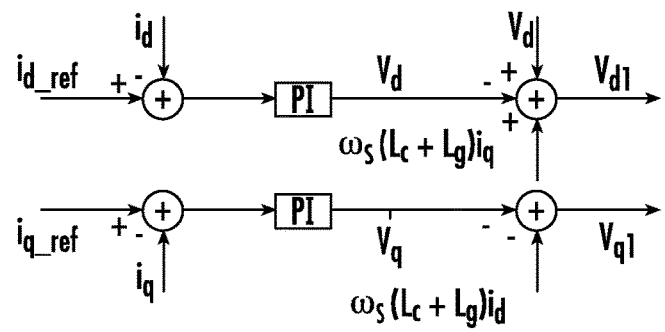
FIG. 2 is a block diagram illustrating an example decoupled vector control strategy for an LCL-GCC.

Then, the vector control strategy for the LCL-GCC system, developed according to (4) and (5) is shown by FIG. 2, which is basically the same as the conventional vector control approach for a L-GCC system. The control signals vd1 and vq1 consist of vd' and vq' signals from two PI controllers and their associated compensation terms.

Passive and Active Damping

For the vector control method shown in FIG. 2, the LCL filter could cause possible instability of the current-loop controller due to the zero impedance of the filter at its resonance frequency. The resonance frequency can be calculated using (6).

$$f_r = \frac{1}{2\pi}\sqrt{\frac{L_g + L_c}{L_g L_c C}} \quad (6)$$

Because of the resonance phenomenon, a proper damping strategy has to be employed in developing a vector control technique for an LCL-GCC system, such as by using either a passive or active damping method.

Figure 3A:
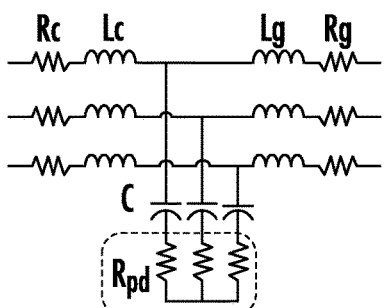
FIG. 3(a) is a diagram illustrating a passive damping mechanism.
Figure 3B:
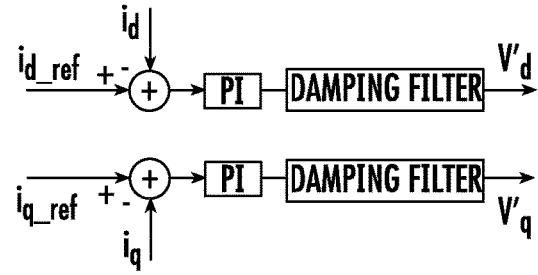
FIG. 3(b) is a diagram illustrating an active damping mechanism.

An example PD method is to connect a resistor in series with the LCL capacitor as shown in FIG. 3a. An example AD method is to add a low-pass or notch filter to the output of the current-loop controller as shown in FIG. 3b, which is easier to implement than an AD-based multiloop vector control approach as no extra sensors are required.

However, PD methods cause a decrease of the overall system efficiency because of the associated power losses. AD methods are more sensitive to parameter uncertainties. Moreover, the possibility of controlling the potential unstable dynamics is limited by the controller bandwidth for AD methods.

Recurrent Neural Network Based Vector Control Technique

As described below, a neural network ("NN") vector controller is provided below. Due to the universal function approximation property, a NN controller can overcome the decoupling challenge associated with an LCL-GCC system (and also an LC-GCC system). In addition, the NN controller can be trained to implement the optimal control based on dynamic programming and the exact discrete state space model (2) of the LCL-GCC system. These are the advantages of the NN-based control over other conventional control methods.

RNN Based Vector Control Architecture

A recurrent neural network is a network with feedback, that is, some of its outputs are connected to its inputs. A recurrent network is potentially more powerful than a feedforward network and can exhibit temporal behavior, which is particularly important for feedback control applications. Although RNN-based vector control is described below, it should be understood that this is only provided as an example. This disclosure contemplates using other neural networks in the systems and methods described herein.

Figure 4:
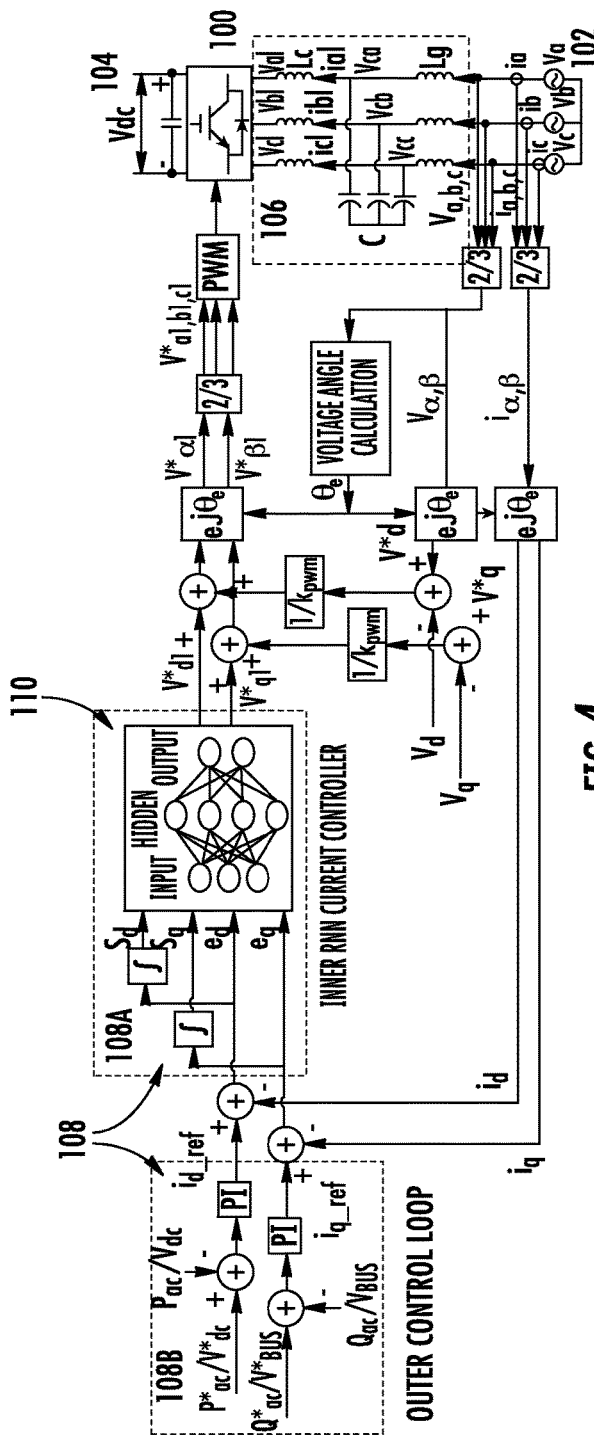
FIG. 4 is schematic diagram illustrating a system for controlling an example LCL-GCC.

Referring now to FIG. 4, a system for controlling an example LCL-GCC is described. The system can include a GCC 100 operably coupled between an electrical grid 102 and an energy source 104. The GCC can optionally be a pulse-width modulated ("PWM") converter. The energy source can optionally be a solar cell or array, a battery, a fuel cell, a wind turbine generator, a micro-turbine generator, a STATCOM, or a high-voltage DC transmission system. Additionally, the electrical grid can optionally be a three-phase power system as shown in FIG. 4. The system can also include a n-order grid filter 106, where n is an integer greater than or equal to 2. The n-order grid filter 106 is shown in a dotted box in FIG. 4 and can be operably coupled between the electrical grid and the GCC. The n-order grid filter in FIG. 4 is a third-order grid filter, i.e., an LCL-filter. It should be understood that the n-order grid filter can be a filter of another order such as a second-order grid filter, i.e., an LC-filter, for example. The system can also include a nested-loop controller 108. The nested-loop controller can have inner and outer control loops 108A and 108B, respectively, and can be operably coupled to the GCC as shown in FIG. 4. A d-axis loop can control real power, and a q-axis loop can control reactive power. Additionally, the inner control loop can include a neural network 110 that is configured to optimize dq-control voltages for controlling the GCC. The neural network can account for circuit dynamics (e.g., resonant circuit dynamics) of the n-order grid filter while optimizing the dq-control voltages.

The controller has a nested-loop structure, consisting of a slow outer loop and a fast inner loop (e.g., loops 108B and 108A in FIG. 4). In FIG. 4, the inner loop includes the neural network 110, which can optionally be a RNN. The neural network is configured to implement the fast inner current loop control function. The neural network can optionally be configured to receive a plurality of input signals including dq-current error signals (e.g., $e_d$ and $e_q$ in FIG. 4) and respective integrals of the dq-current error signals (e.g., $s_d$ and $s_q$ in FIG. 4). It should be understood that the neural network can optionally be configured to receive other input signals including, but not limited to, predictive dq-currents, previous dq-currents, etc. The dq-current error signals can be differences between d-axis and q-axis currents (e.g., $i_d$ and $i_q$ in FIG. 4) and d-axis and q-axis reference currents (e.g., $i_{d\_iref}$ and $i_{q\_ref}$ in FIG. 4), respectively. The neural network can be configured to optimize the dq-control voltages based on the input signals. Additionally, as shown in FIG. 4, the outer control loop can optionally include at least one PI controller. By substituting the two d-q current loop PI controllers shown in FIG. 2 with an RNN-based controller, it is possible to overcome the decoupling difficulty associated with the conventional vector control methods for an LCL-GCC system.

The feedback signals as shown in FIG. 4 act as recurrent network connections from the output of the overall current loop control system back to the input of the system. The outer control loops utilize PI controllers. In the PCC voltage oriented frame, the d-axis loop is used for active power or DC-link voltage control, and the q-axis loop is used for reactive power or grid voltage support control as shown in FIG. 4.

RNN Current Controller Structure

Figure 5:
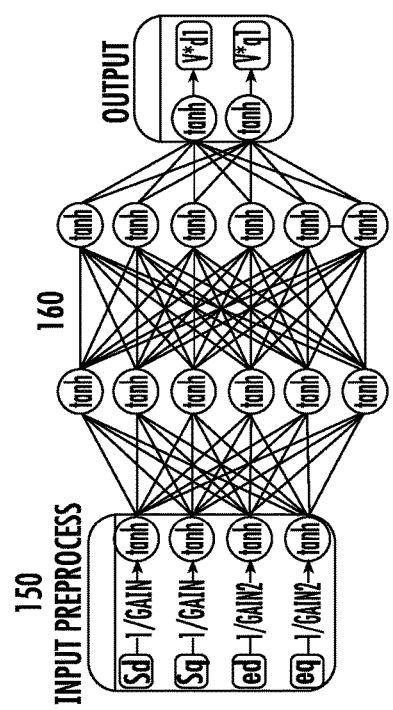
FIG. 5 is diagram of an example RNN that can be included in the inner current loop of the nested loop controller shown in FIG. 4.

FIG. 5 is diagram of an example RNN that can be included in the inner current loop of the nested loop controller shown in FIG. 4. The current-loop RNN controller as shown in FIG. 5 includes two parts: an input preprocessing stage 150 and a neural network 160. The preprocessing stage can be configured to regulate input signals to the neural network within a predetermined range, for example, to avoid input saturation as described below. Additionally, the neural network can include a multi-layer perceptron including a plurality of input nodes, one or more hidden layer nodes and a plurality of output nodes. For example, as shown in FIG. 5, the neural network can be a four-layer feed forward neural network having two hidden layers, each of the hidden layers comprising m nodes, wherein m is an integer. In FIG. 5, each hidden layer has six nodes. Each respective node of the neural network can optionally be configured to implement sigmode function (e.g., a hyperbolic tangent function). It should be understood that the neural network of FIG. 5 is only provided as an example, and that the neural network can be configured differently than as described in FIG. 5.

To avoid the input saturation, the inputs can be regulated to the range $[-1, 1]$, for example, through a preprocessing procedure. The inputs to the feed-forward neural network are $\tanh(\vec{s}_{dq}/\text{Gain})$ and $\tanh(\vec{e}_{dq}/\text{Gain2})$, where $\vec{e}_{dq}$ and $\vec{s}_{dq}$ are error terms and integrals of the error terms. $\vec{e}_{dq}$ is defined as $\vec{e}_{dq}(k) = \vec{i}_{dq}(k) - \vec{i}_{dq}\text{ref}(k)$ and $\vec{s}_{dq}(k)$ calculated by (7):

$$\vec{s}_{dq}(k) = \int_0^{kT_s} \vec{e}_{dq}(t)dt \approx T_s \sum_{j=1}^{k} \frac{\vec{e}_{dq}(j-1) + \vec{e}_{dq}(j)}{2} \quad (7)$$

in which the trapezoid formula was used to compute the integral term $\vec{s}_{dq}(k)$ and $\vec{e}_{dq}(0)$.

In FIG. 5, the feed-forward neural network contains 2 hidden layers of 6 nodes each, and 2 output nodes, with hyperbolic tangent functions at all nodes. Even though the feed-forward network in FIG. 5 does not have a feedback connection, the NN controller shown in FIG. 4 is a RNN because the feedback signal of the system acts as a recurrent network connection from the output of the NN back to the input.

Unlike some active damping methods, which require information about capacitor voltage, the NN structure described herein only needs $\vec{e}_{dq}$ and $\vec{s}_{dq}$ as network inputs. In other words, the system described herein does not include a passive or active damping control structure. This structure makes the control of LCL-GCC system (or LC-GCC system) easy to implement and very effective. Two hidden layers were chosen to yield a stronger approximation ability. The selection of the number of neurons in each hidden layer was done through trial and error tests. Six nodes in each hidden layer provided adequate results. However, as described above, the NN structure described herein is provided only as an example, and it should be understood that a NN having a different structure can be used, including a neural network having different numbers of layers, nodes, etc. The output layer outputs two d-q voltage control signals.

According to FIG. 5, the RNN current controller can be denoted as $R(e_{dq}, s_{dq}, \omega)$ which is a function of $\vec{e}_{dq}, s_{dq}$ and network weights $\omega$. $\omega$ denotes all the weights between different layers. More clearly, $R(e_{dq}, s_{dq}, \omega)$ is expressed as:

$$R(\vec{e_{dq}}, \vec{s_{dq}}, \vec{w}) = \tanh\left(\overline{w_3}\tanh\left(\overline{w_2}\tanh\left(\overline{w_1}\tanh\left(\begin{bmatrix}\frac{\vec{s_{dq}}}{Gain}\\ \frac{\vec{e_{dq}}}{Gain2}\end{bmatrix}\right)\right)\right)\right) \quad (8)$$

in which, $\vec{\omega 1}$ stands for the weights from input layer to first hidden layer, $\vec{\omega 2}$ denotes the weights from first hidden layer to the second hidden layer, and $\vec{\omega 3}$ represents the weights a) 3 from the second hidden layer to the output layer.

As the ratio of the converter output voltage $\vec{vdq1}$ to the outputs of the current loop controller $\vec{v^*dq1}$ is the gain of the pulse-width-modulation (PWM) which is denoted as kPWM, the control action $\vec{vdq1}$ is then expressed by $$\vec{v_{dq1}} = k_{PWM}\vec{v^*_{dq1}} = k_{PWM}R(\vec{e_{dq}}, \vec{s_{dq}}, \vec{w}) \quad (9)$$

To prevent the neural network controller from being affected by the GCC voltage variation, a technique is employed by introducing PCC disturbance voltage to the output of a trained neural network.

$$\vec{v_{dg1}} = k_{PWM}[R(\vec{e_{dq}}, \vec{s_{dq}}, \vec{w}) + (\vec{v_{dqn}} - \vec{v_{dq}})/k_{PWM}] \quad (10)$$

where $\vec{vdqn}$ is nominal PCC voltage and $\vec{vdq}$ is the actual PCC voltage, thus $(\vec{vdqn} - \vec{vdq})$ means the PCC disturbance voltage.

Training Recurrent Neural Network Current Controller

Optionally, the neural network can be configured to implement a DP algorithm. For example, the DP algorithm can include a cost function associated with a discrete-time system model, where the discrete-time system model includes parameters for one or more inductors and capacitors of the n-order grid filter. Alternatively or additionally, the neural network can optionally be configured to determine an optimal trajectory of the dq-control voltages that minimizes the cost function associated with the discrete-time system model. Alternatively or additionally, the neural network can optionally be trained using a LM algorithm. In addition, the neural network can optionally be trained using a FAIT algorithm in conjunction with the LM algorithm.

Training Objective: Approximate Optimal Control

Dynamic programming (DP) employs the principle of Bellman's optimality and is a very useful tool for solving optimization and optimal control problems. The typical structure of the discrete-time DP includes a discrete-time system model and a performance index or cost associated with the system.

The DP cost function associated with the LCL-GCC system is defined as:

$$C_{dq} = \sum_{k=j}^{\infty} \gamma^{k-j} U(\vec{e_{dq}}(k))$$

$$= \sum_{k=j}^{\infty} \gamma^{k-j} \sqrt{[i_d(k) - i_{d\_ref}(k)]^2 + [i_q(k) - i_{q\_ref}(k)]^2} \quad (11)$$

where, j denotes the starting point and generally j>0, $\gamma$ is a discount factor with $0<\gamma \leq 1$, and U is called local cost or utility function. The function $C_{dp}$, depending on the initial time j and the initial state $\vec{i_{dq}}(j)$, is referred to as the cost-to-go of state $\vec{i_{dq}}(j)$ of the DP problem. The objective of the training is to find an optimal trajectory of control action $\vec{v_{dq}1}$ that minimizes the DP cost $C_{dp}$ in (11). As the control action $\vec{v_{dq}1}$ completely depends on the RNN current controller, the objective actually means finding the best neural network weight $\vec{\omega}$ to approximate the optimal control.

RNN Training Algorithm: Levenberg-Marquardt+Forward Accumulation Through Time (LM+FATT)

Levenberg-Marquardt (LM) Algorithm:

The LM algorithm can be used to train an RNN because LM appears to be the fastest neural network training algorithm for a moderate number of network parameters. To implement LM training, the cost function defined in (11) needs to be rewritten in a Sum-Of-Squares form. Consider the cost function $C_{dp}$ with $\gamma=1$, $j=1$ and $k=1, \ldots, N$, then it can be written in the form:

$$C_{dq} = \sum_{k=1}^{N} U(\vec{e_{dq}}(k)) \xrightarrow{def\ V(k) = \sqrt{U(\vec{e_{dq}}(k))}} C_{dq} = \sum_{k=1}^{N} V^2(k) \quad (12)$$

The gradient can be written in a matrix product form:

$$\frac{\partial C_{dq}}{\partial \vec{w}} = \sum_{k=1}^{N} V(k) \frac{\partial V(k)}{\partial \vec{w}} = 2J_V(\vec{w})^T V \quad (13)$$

in which, the Jacobian matrix $J_V(\vec{w})$ is:

$$J_V(\vec{w}) = \begin{bmatrix} \frac{\partial V(1)}{\partial w_1} & \cdots & \frac{\partial V(1)}{\partial w_M} \\ \vdots & \ddots & \vdots \\ \frac{\partial V(N)}{\partial w_1} & \cdots & \frac{\partial V(N)}{\partial w_M} \end{bmatrix}, V = \begin{bmatrix} V(1) \\ \vdots \\ V(N) \end{bmatrix} \quad (14)$$

Therefore, the weights update by using LM for an RNN controller can be expressed as:

$$\Delta \vec{w} = -[J_V(\vec{w})^T J_V(\vec{w}) + \mu I]^{-1} J_V(\vec{w})^T V \quad (15)$$

Forward Accumulation Through Time (FATT) Algorithm:

In order to find Jacobian matrix $Jv(\omega)$, FATT is developed for an LCL-GCC system, which incorporates the procedures of unrolling the system, calculating the derivatives of the Jacobian matrix, and calculating the DP cost into one single process for each training epoch. Algorithm 1, which is shown below, describes the whole algorithm. Denote:

$$\vec{\phi}(k) = \sum_{j=1}^{k} \vec{i_{dqs}}(j) \text{ and } \frac{\partial \vec{\phi}(k)}{\partial \vec{w}} = \sum_{j=1}^{k} \frac{\partial \vec{i_{dqs}}(j)}{\partial \vec{w}}$$

in the algorithm, and lines 6-7 come from differentiating (9) and (2), respectively.

Figure 6:
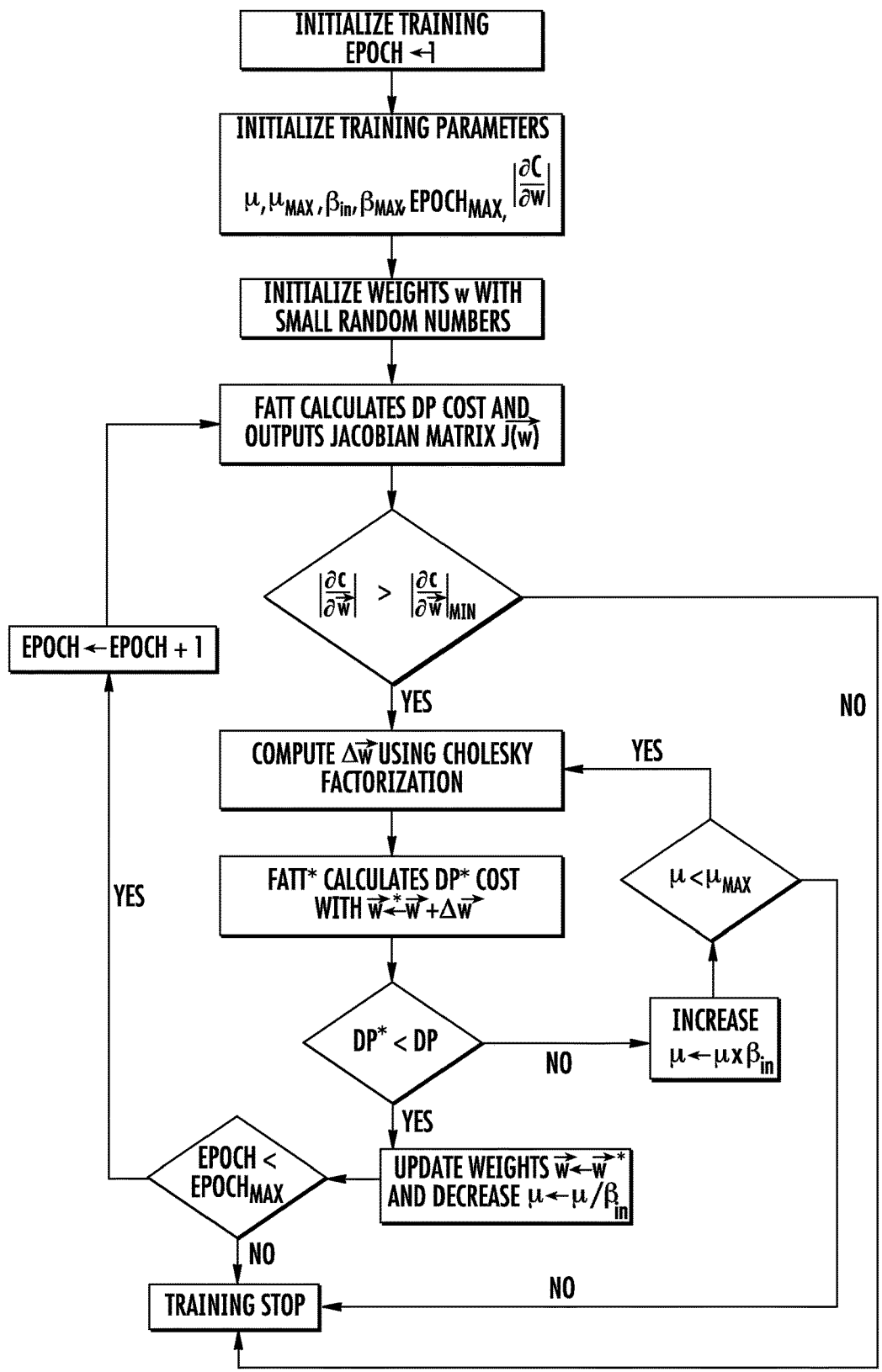
FIG. 6 is a flow chart illustrating example operations for combining the LM and FATT algorithms for training the example RNN controller.

The Combination of LM+FATT Algorithms:

FIG. 6 is a flow diagram illustrating operations for the combination of LM and FATT algorithms for training an RNN controller. The figure also demonstrates how to adjust μ dynamically to ensure that the training follows the decreasing direction of the DP cost function. The weight updates in (15) are handled by Cholesky factorization, which is roughly twice as efficient as the LU decomposition for solving systems of linear equations. FATT* in FIG. 6 refers to a modified version of Algorithm 1 that only calculates DP cost by eliminating lines 5-9 and 14-15 in Algorithm 1 to save the computation time. The following three training stopping conditions used are as follows: 1) when the training epoch reaches a maximum acceptable value Epochmax; 2) when μ is larger than μmax; and 3) when the gradient is smaller than the predefined minimum acceptable value $$\left\| \frac{\partial C_{dq}}{\partial \vec{w}} \right\|_{min}.$$

---

Algorithm 1: FATT algorithm to
calculate the Jacobian matrix and to accumulate DP cost.

1:
$$C \leftarrow 0, \vec{e}(0) \leftarrow 0, \vec{s_{dq}}(0) \leftarrow 0, \frac{\partial \vec{i_{dqs}}(0)}{\partial \vec{w}} \leftarrow 0, \frac{\partial \vec{\varphi_{dq}}(0)}{\partial \vec{w}} \leftarrow 0$$

2: {Calculate Jacobian matrix $J_V(\vec{w})$}
3: for k = 1 to N −1 do
4: $\quad \vec{v_{dq1}}(k) \leftarrow k_{PWM} R(\vec{e_{dq}}(k), \vec{s_{dq}}(k), \vec{w})$ 5:
$$\frac{\partial \vec{s_{dq}}(k)}{\partial \vec{w}} \leftarrow T_s \left( \frac{\partial \vec{\varphi_{dq}}(k)}{\partial \vec{w}} - \frac{1}{2} \frac{\partial \vec{i_{dq}}(k)}{\partial \vec{w}} \right)$$

6:
$$\frac{\partial \vec{v_{dq1}}(k)}{\partial \vec{w}} \leftarrow k_{PWM} \left( \frac{\partial R(k)}{\partial \vec{e_{dq}}(k)} \frac{\partial \vec{i_{dq}}(k)}{\partial \vec{w}} + \frac{\partial R(k)}{\partial \vec{s_{dq}}(k)} \frac{\partial \vec{s_{dq}}(k)}{\partial \vec{w}} + \frac{\partial R(k)}{\partial \vec{w}} \right)$$

7:
$$\frac{\partial \vec{i_{dqs}}(k+1)}{\partial \vec{w}} \leftarrow A \frac{\partial \vec{i_{dqs}}(k)}{\partial \vec{w}} + B \frac{\partial \vec{u_{dqs}}(k)}{\partial \vec{w}}$$

8:
$$\frac{\partial \vec{i_{dq}}(k+1)}{\partial \vec{w}} \leftarrow \text{the first two terms of } \frac{\partial \vec{i_{dqs}}(k+1)}{\partial \vec{w}}$$

9:
$$\frac{\partial \vec{\varphi_{dq}}(k+1)}{\partial \vec{w}} \leftarrow \frac{\partial \vec{\varphi_{dq}}(k)}{\partial \vec{w}} + \frac{\partial \vec{i_{dq}}(k+1)}{\partial \vec{w}}$$

10: $\vec{i_{dqs}}(k+1) \leftarrow A \vec{i_{dqs}}(k) + B \vec{u_{dqs}}(k)$
11: $\vec{e_{dq}}(k+1) \leftarrow \vec{i_{dq}}(k+1) - \vec{i_{dq\_ref}}(k+1)$ 12:
$$\vec{s_{dq}}(k+1) \leftarrow \vec{s_{dq}}(k) + \frac{T_s}{2} [\vec{e_{dq}}(k) + \vec{e_{dq}}(k+1)]$$

13: $\quad C \leftarrow C + U(\vec{e_{dq}}(k+1))$ {accumulate DP cost}

14:
$$\frac{\partial V(k+1)}{\partial \vec{w}} \leftarrow \frac{\partial V(k+1)}{\partial \vec{e_{dq}}(k+1)} \frac{\partial \vec{i_{dq}}(k+1)}{\partial \vec{w}}$$

15: the (k+1)th row of $J(\vec{w}) \leftarrow \frac{\partial V(k+1)}{\partial \vec{w}}$ 16: end for
17: {on exit, the Jacobian matrix $J(\vec{w})$ is finished for the whole trajectory}

---

Training Implementation

Figure 7:
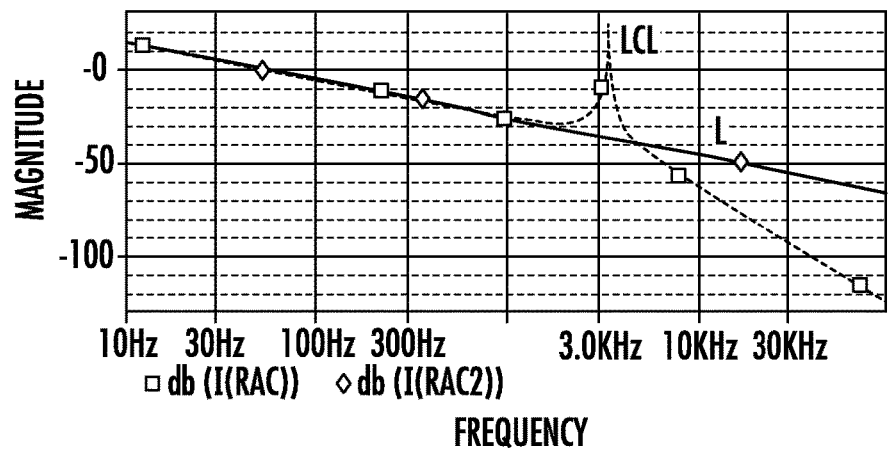
FIG. 7 is a graph illustrating the simulated frequency response of the LCL filter specified in Table I and the simulated frequency response of the simplified L filter when the impact of the LCL capacitor is neglected.

Table I below specifies the LCL-GCC system parameters. FIG. 7 gives the simulated frequency response of the LCL filter specified in Table I and the simulated frequency response of the simplified L filter when the impact of the LCL capacitor is neglected. The resonant frequency according to FIG. 7 (e.g., the peak point of the LCL-filter line) is around 3551 Hz, which is coherent with the theoretical calculation fr=3559 Hz obtained from (6).

TABLE I

| LCL-GCC SYSTEM PARAMETERS | | | |
|---|---|---|---|
| Symbol | Quantity | Value | Unit |
| $V_g$ | nominal grid voltage (rms) | 400 | V |
| f | nominal grid frequency | 60 | Hz |
| $V_{dc}$ | DC-link voltage | 700 | V |
| $L_g$ & $L_c$ | grid side & converter side inductor | 1.6 | mH |
| $R_g$ & $R_c$ | grid side & converter side resistor | 6 | mΩ |
| C | parallel capacitor | 2.2 | μF |

Besides the LM+FATT algorithm described herein, the following policies can be used when training the neural network:

1) N trajectories were used to train the RNN. N was generally chosen as 10.

2) The initial current state $\vec{i_{dq}}(0)$ for each trajectory was generated randomly.

3) The d-q reference current for each trajectory was generated randomly and was changed every 0.1 s.

4) The initial weights $\vec{\omega}$ of the RNN were generated randomly.

5) The sampling time was chosen as Ts=1 ms and the duration of each trajectory was set as 1 s.

Due to the physical constraints of the LCL-GCC system, the randomly generated d- and q-axis current values were checked and modified when necessary to make sure that their resultant magnitude does not exceed the converter rated current limit and/or the required control voltage does not exceeded the PWM saturation limit.

When using LM+FATT algorithm to train the RNN controller, the most time consuming part is the computation of the Jacobian matrix. The FATT described herein can calculate the Jacobian matrix efficiently. It takes $O(m_2 NM)$ flops to compute the Jacobian matrix $J_V(\vec{w})$ where m represents the dimension of the RNN output layer, M stands for the number of all weights, and N denotes the length of the trajectory length. For the RNN controller shown by FIG. 5, m=2, M=86, and N=1/Tx=1000. As N>>M, the trajectory length has biggest impact on the total time needed to calculate the Jacobian matrix than the total number of weights. Thus a small increase or decrease of the number of neurons does not significantly affect the computation time of the Jacobian matrix and the whole training time of the RNN controller.

Figure 8:
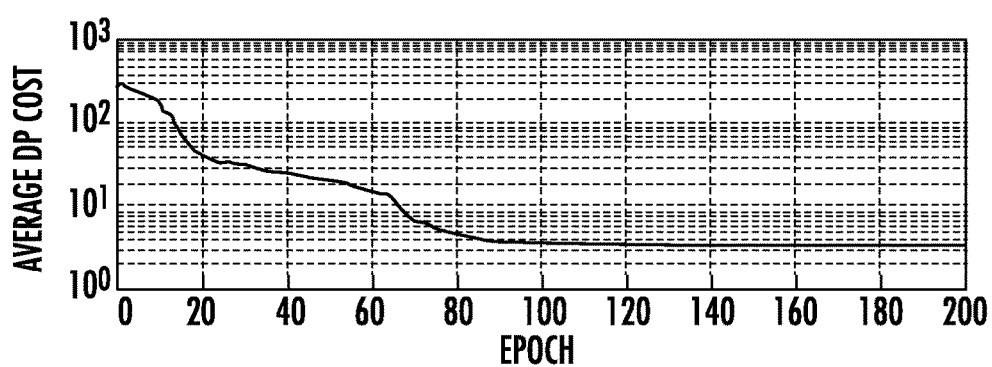
FIG. 8 is a graph illustrating the learning curve for a successful training of the example RNN controller.

FIG. 8 shows the learning curve for a successful training of the RNN controller. The average DP cost per trajectory dropped to a small value very quickly within 100 iterations and stabilized at this value, demonstrating a good convergence result of the proposed LM+FATT algorithm.

Figure 9:
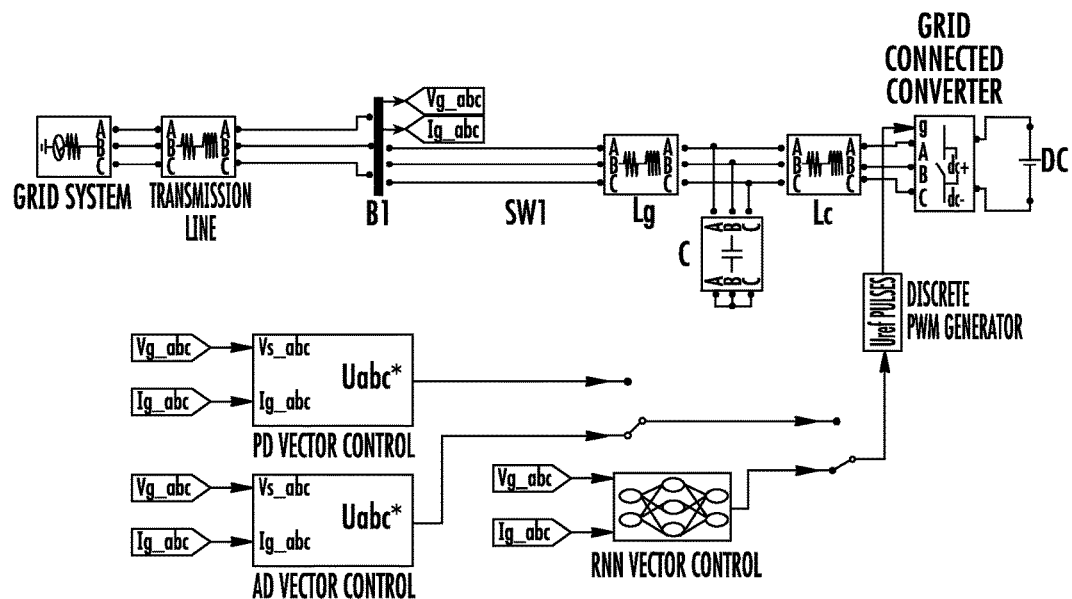
FIG. 9 is a diagram of a model of an LCL-GCC in a power converter switching environment.

To evaluate the performance of the neural network vector controller and compare it with conventional PD- and AD-systems, an LCL-GCC system was developed using SIM-POWERSYSTEMS in MATLAB of MATHWORKS, INC. of Natick, Mass. (FIG. 9), in which the GCC model is the three-phase IGBT/diodes model from the Universal Bridge block in SimPowerSystems. Based on the frequency response characteristics shown in FIG. 7, the converter switching frequency was chosen as 7000 Hz for all the three vector control methods, as for the AD vector control method, the switching frequency should be at least twice of its resonance frequency. The PCC bus is connected to the grid through a transmission line. For digital control realization, the measured instantaneous three-phase PCC voltage and grid current pass through a zero-order-hold (ZOH) block with Ts=1 ms.

Figure 10:
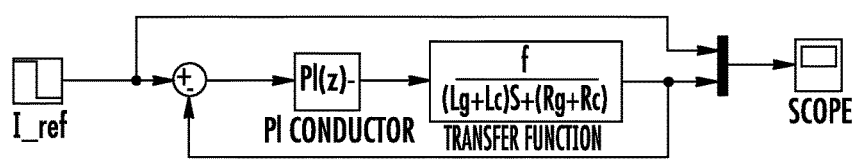
FIG. 10 is a block diagram for tuning a current-loop PI controller.

The PI parameters of the current-loop controller for the conventional vector control method were tuned by using the PID tuner function within the PID controller block in Matlab. FIG. 10 shows the closed-loop Simulink model used to tune the PI parameters. The transfer function of FIG. 10 is from (4) and (5). Phase margin was set as 60 deg and the bandwidth was chosen as 1500 rad/s, which tends to yield the best results considering the PWM saturation constraints.

For the PD vector control mechanism, the damping resistor was chosen as $R_{pd}$=5.96Ω according to (16), $$R_{pd} = \frac{1}{3}\left(\frac{1}{C\omega_r}\right) \quad (16)$$

For the AD vector control method, the cut off frequency of the low pass filter is $f_r$=3559 Hz according to (6), which should ensure appropriate filtering results. In the comparison, both the AD and PD vector controllers used the same PI parameters that were tuned based on the simplified L-GCC system.

Damping Free

Figure 11A:
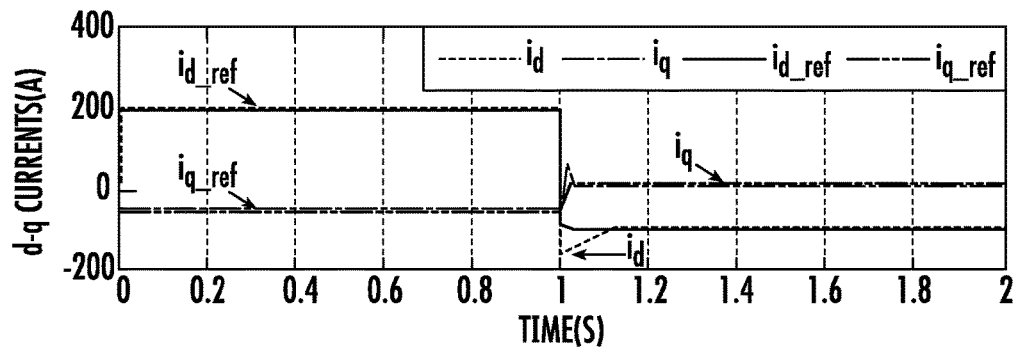
FIGS. 11(a)-11(c) are graphs illustrating d-q currents for the three control methods, i.e., PD vector control (FIG. 11(a)), AD vector control (FIG. 11(b)), and RNN vector control (FIG. 11(c)).
Figure 11B:
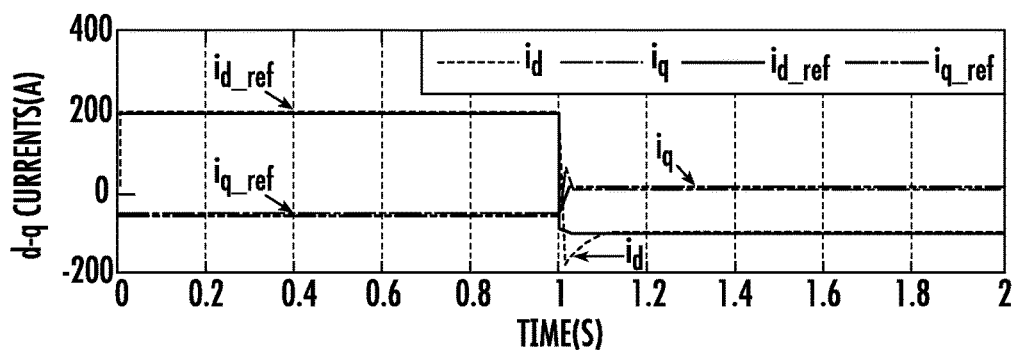
Figure 11C:
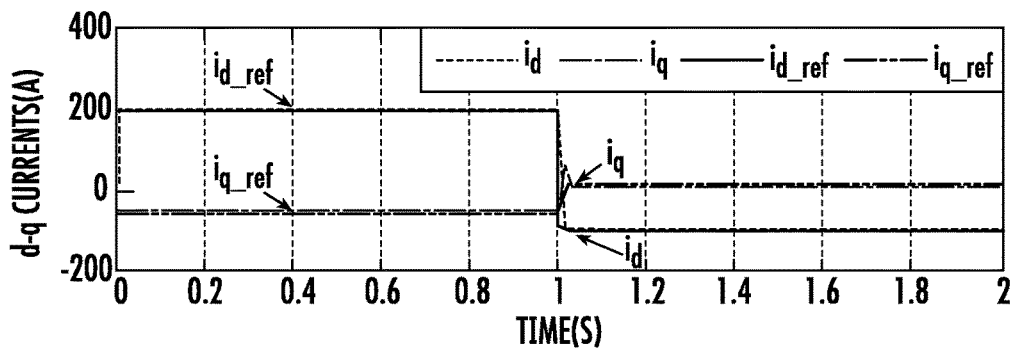
Figure 12A:
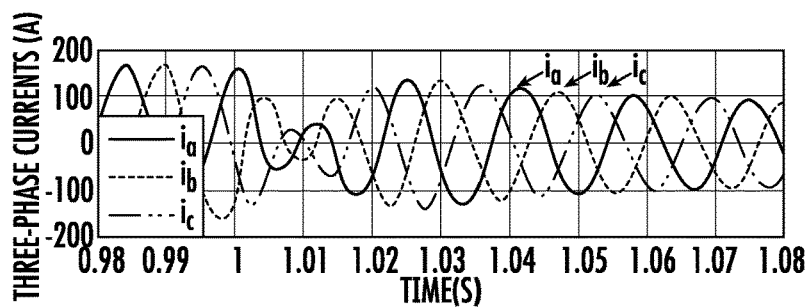
FIGS. 12(a)-12(c) are graphs illustrating the three phase currents for the three control methods, i.e., PD vector control (FIG. 12(a)), AD vector control (FIG. 12(b)), and RNN vector control (FIG. 12(c)).
Figure 12B:
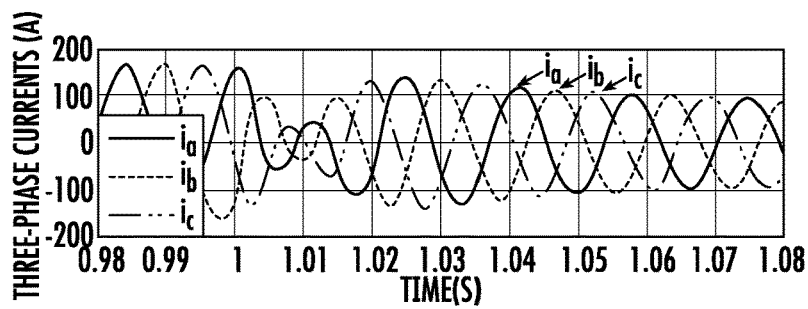
Figure 12C:
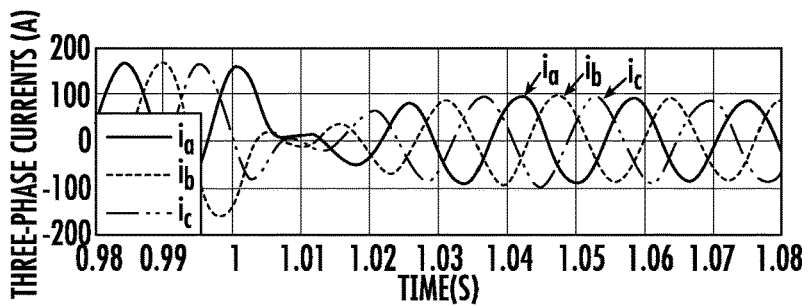

FIG. 11 compares the performance of the three control methods, i.e., PD vector control, AD vector control and RNN vector control. FIG. 12 shows the corresponding three-phase PCC currents.

Compared with PD vector control (FIG. 11a and FIG. 12a) and AD vector control (FIG. 11b and FIG. 12b), the RNN vector control (FIG. 11c and FIG. 12c) demonstrated a very good tracking ability and achieved a good compromise between a lower overshoot and a fast response speed.

Figure 13:
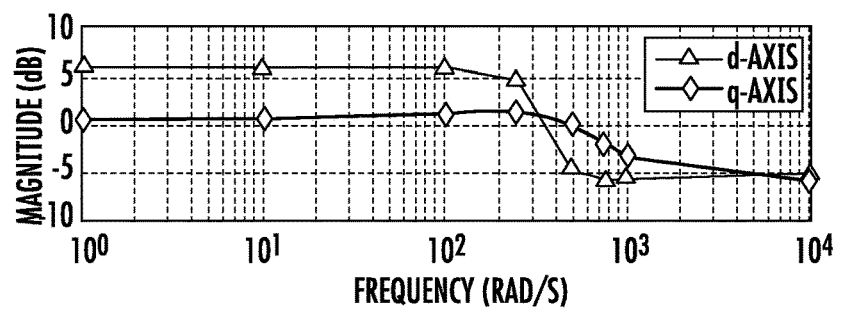
FIG. 13 is a graph illustrating the estimated frequency response of the RNN vector controller.

Additionally, the RNN based vector control is a damping free technique such as a high-order vector controller, and therefore does not need any special damping mechanisms. This is due to the fact that the RNN current controller behaves naturally as a lower pass filter as indicated by FIG. 13, which shows the estimated frequency response curves of the RNN controller for d- and q-axis input currents. The cut off frequencies for the d-axis and q-axis input currents are around 400 Hz and 700 Hz, respectively.

Robustness Analysis

Figure 14A:
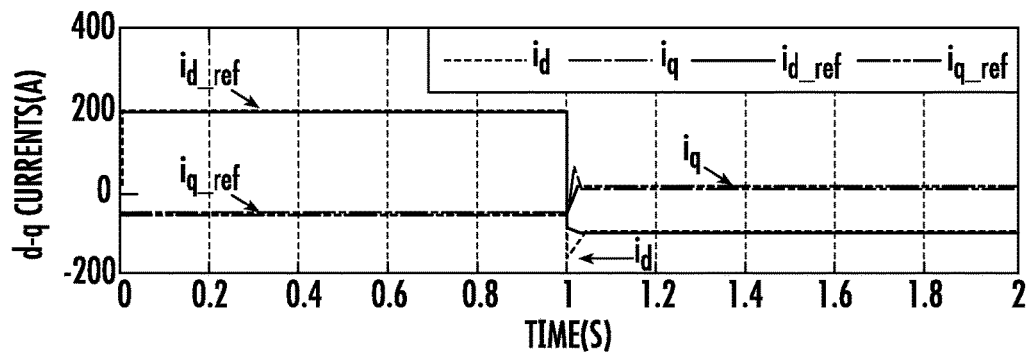
FIGS. 14(a)-14(c) are graphs illustrating the reference and actual d- and q-axis currents at the PCC for the three control methods, i.e., PD vector control (FIG. 14(a)), AD vector control (FIG. 14(b)), and RNN vector control (FIG. 14(c)).
Figure 14B:
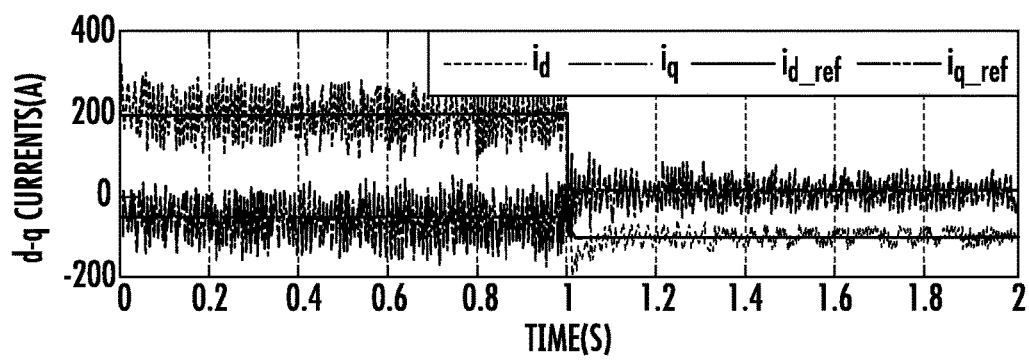
Figure 14C:
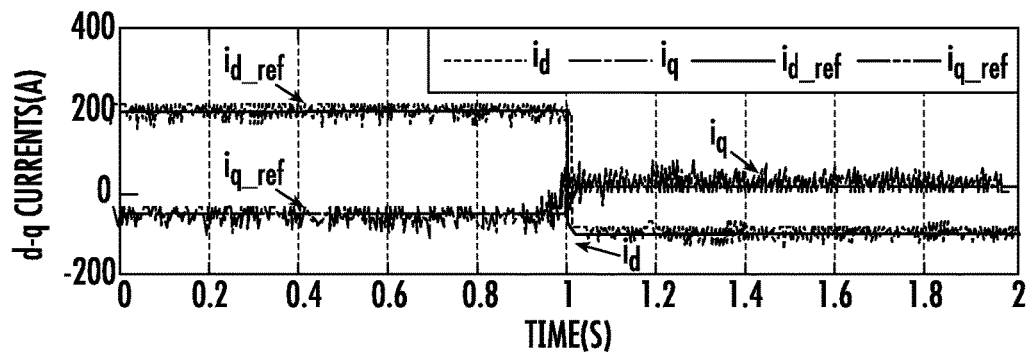
Figure 15A:
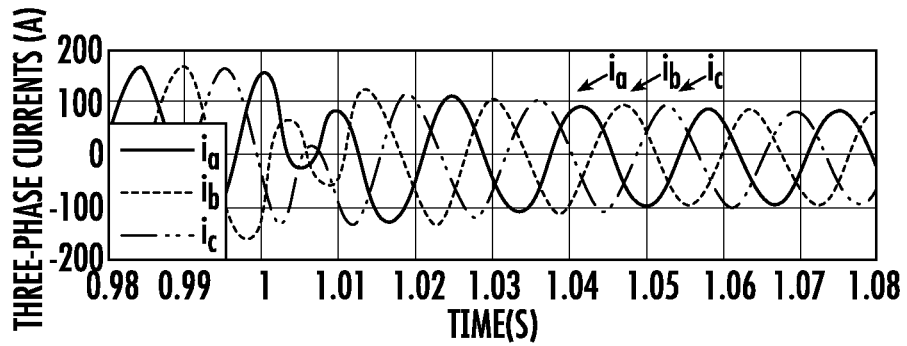
FIGS. 15(a)-15(c) are graphs illustrating the three phase currents at the PCC for the three control methods, i.e., PD vector control (FIG. 15(a)), AD vector control (FIG. 15(b)), and RNN vector control (FIG. 15(c)).
Figure 15B:
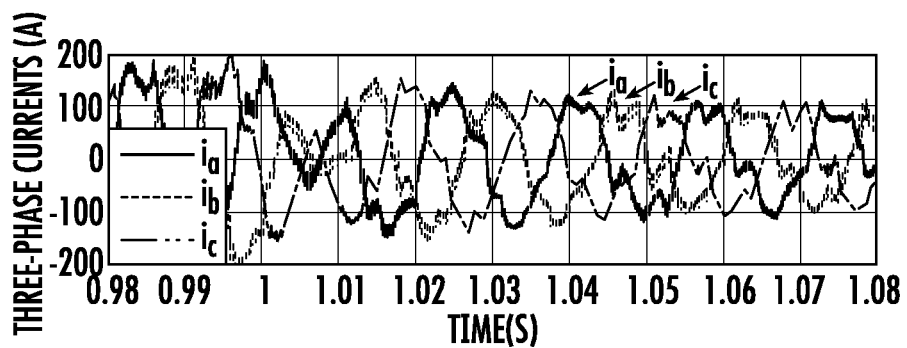
Figure 15C:
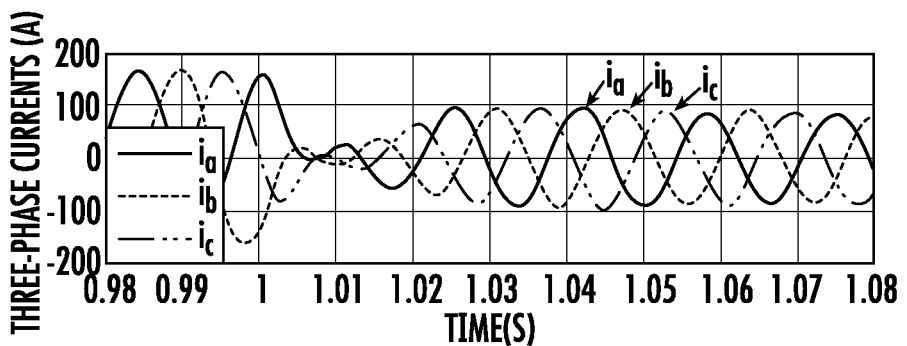

The robustness of a controller is important in a real application because the system parameters could deviate from its nominal values by a significant amount. A test was made to evaluate the three vector control methods for a new Lc value which is half of the nominal value L*c=0.5 Lc shown in Table II below. FIG. 14 gives the reference and actual d- and q-axis currents at the PCC by using the three different vector control methods for the reduced Lc value condition. FIG. 15 shows the corresponding three-phase currents at the PCC. As shown by the figures, the PD vector control approach (FIG. 14a and FIG. 15a) and RNN vector control method (FIGS. 14c and 15c) still perform very well. However, the AD vector control technique (FIG. 14b and FIG. 15b) performs extremely poorly, consistent with the prior results showing that the AD methods are more sensitive to parameter uncertainties.

In order to completely compare the robustness of the three different vector methods, more detailed analysis was made by considering the parameter variations of Lg, C and Lc of the LCL filter. Table II shows the maximum and minimum ratios of the three parameters over corresponding nominal values before losing the control stability for the three vector control methods. As shown by the table, the AD control method has the smallest stability region, as the change of parameters will cause the variation of fr and thus new damping filter should be designed to meet the performance requirement. The PD control approach has a larger stability region than that of the AD control method, as it does not use a damping filter. It should be understood that the PD control approach still work well when C=0 (Table II) as the PI controllers of the PD method are designed based on the simplified L-GCC system. The RNN vector control strategy has the widest stability region according to Table II, which demonstrates the strong robustness of the RNN vector controller.

TABLE II

STABILITY REGION COMPARISONS FOR SYSTEM PARAMETER CHANGE

| Method | Symbol | Min ratio | Max ratio |
| --- | --- | --- | --- |
| PD vector control | $L_g$ | 0.2 | 2.2 |
|  | C | 0 | 6 |
|  | $L_c$ | 0.2 | 2.2 |
| AD vector control | $L_g$ | 0.7 | 1.2 |
|  | C | 0.5 | 6 |
|  | $L_c$ | 0.7 | 1.2 |
| RNN vector control | $L_g$ | 0 | 2.4 |
|  | C | 0 | 7 |
|  | $L_c$ | 0 | 2.4 |

Table III gives a summary of PD vector control, AD vector control and RNN vector control.

TABLE III

COMPARISONS OF PD VECTOR CONTROL, AD VECTOR CONTROL AND RNN VECTOR CONTROL.

| | Method | | |
| --- | --- | --- | --- |
| Measure | PD | AD | RNN |
| Optimal control | no | no | approximate optimal control |
| Need damping | yes | yes | no |
| Damping loss | yes | no | no |
| Tolerance to variable system parameters | good | poor | excellent |

Hardware Validation

Figure 16:
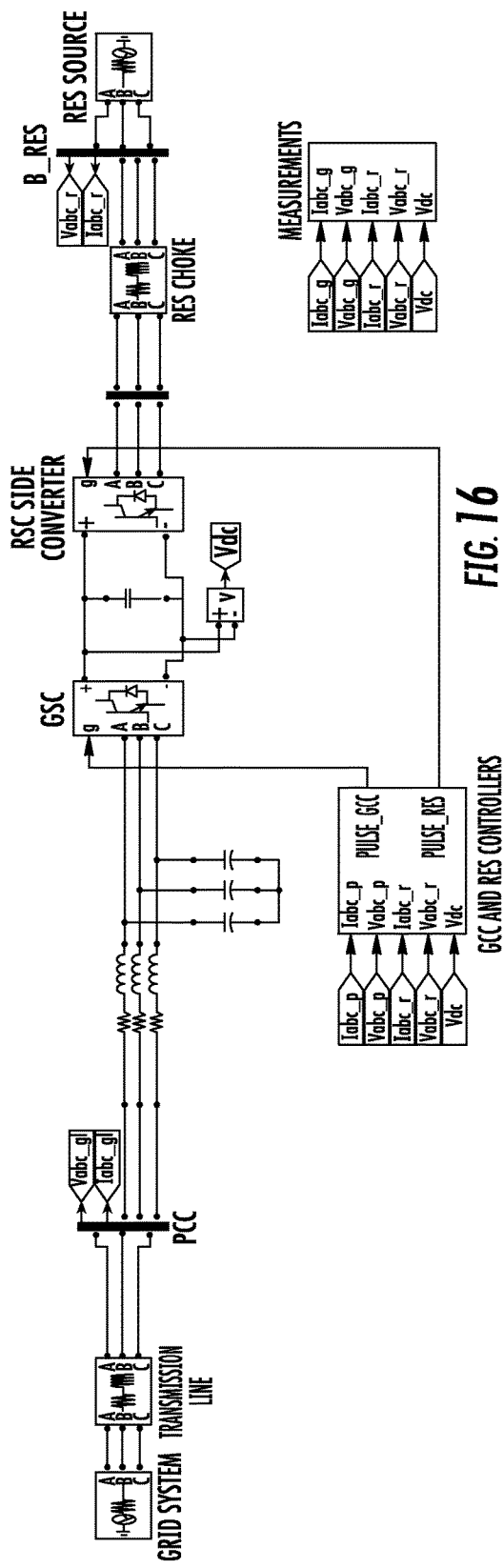
FIG. 16 is a schematic diagram of the RNN vector control in a nested-loop control condition.

A hardware laboratory test system for an LCL-GCC in an ac/dc/ac converter application (FIG. 16) was built to validate the proposed RNN vector control method. This ac/dc/ac converter configuration is very typical in grid integration of distributed energy resources. In the figure, the left-side power source represents the grid and the right-side power source represents a renewable energy source (RES) such as a wind turbine. The power transfers from the RES through the DC-link capacitor and the LCL-GCC to the grid.

Figure 17:
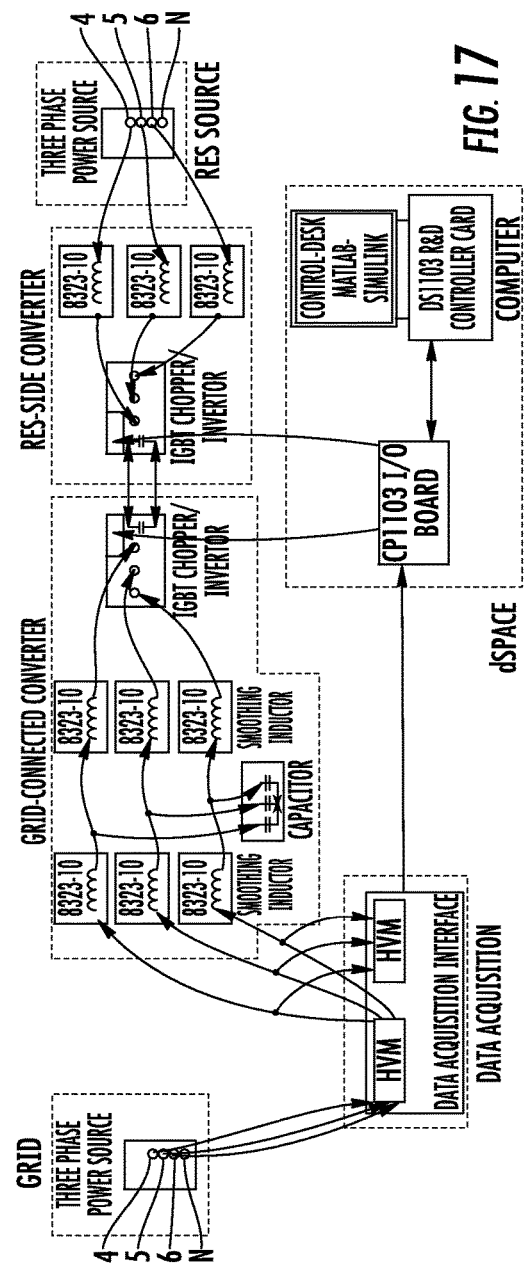
FIG. 17 is a schematic diagram of an example hardware setup.

The schematics of the hardware connections is shown by FIG. 17, in which OP8660 is the data acquisition interface from OPAL-RT. OP8660 can be integrated with LabVolt laboratory and features high voltage and current probes specifically customized for Lab-Volts Laboratory kit power ratings. The hardware test system includes the following setups:

1) An ac/dc converter is connected to an adjustable Lab-Volt three-phase power supply signifying the grid.

2) Another dc/ac converter is connected to the second LabVolt three-phase power supply representing an RES.

3) An LCL filter is built by using six LabVolt smoothing inductors and a three-phase LabVolt capacitor.

4) The ac/dc converter is controlled by a dSPACE digital control system.

5) The control system collects the DC-link voltage and three-phase currents and voltages at the PCC, and sends out control signals to the converter according to various control demands.

6) Table IV specifies all the parameters used in the tests.

Results

The DC-link voltage control is developed based on the principle of the power balance. Assume the current-loop controller is ideal, $$\frac{V_d}{V_{dc}C \cdot s}$$

represents plant transfer function of the dc-link voltage loop. The tuning for the DClink voltage PI controller is similar to that for the current-loop controller described above. Phase margin was set as 60 deg. The outer voltage loop should be slow because it takes time to charge the capacitor while the inner current loop should be fast enough. The bandwidth was chosen as 5 rad/s because any bandwidth larger than 5 rad/s failed to maintain the DC-link voltage constant in all tests using the conventional vector control. For NN vector control, due to the good current tracking ability of the NN controller, a much faster voltage-loop controller was adopted with its bandwidth selected as 10 rad/s.

For the PD vector control method, the actual damping resistor is Rpd+RCin=25. For the AD vector control method, a lower pass filter with a cut off frequency of 959 Hz was used. The RNN controller was retrained based on the parameters in Table IV. The converter switching frequency was fs=3000 Hz for all the three methods. The sampling time was Ts=1 ms for both PD and RNN vector controllers. However, it was found that this sampling time did not work well for the AD vector control method. Thus, a sampling time of Ts=0.1 ms was chosen for the AD vector controller.

TABLE IV

HARDWARE EXPERIMENT TEST SYSTEM PARAMETERS

| Symbol | Quantity | Value | Unit |
|---|---|---|---|
| $V_{dc}$ | DC-link reference voltage | 50 | V |
| $C_{dc}$ | DC-link capacitance | 3260 | μF |
| $L_g$ & $L_c$ | grid side & converter side inductor | 25 | mH |
| $R_g$ & $R_c$ | grid side & converter side resistor | 0.25 | Ω |
| C | parallel capacitor | 2.2 | μF |
| $R_{Cin}$ | internal resistance of parallel capacitor | 3 | Ω |
| $R_{pd}$ | damping resistor | 22 | Ω |

Figure 18:
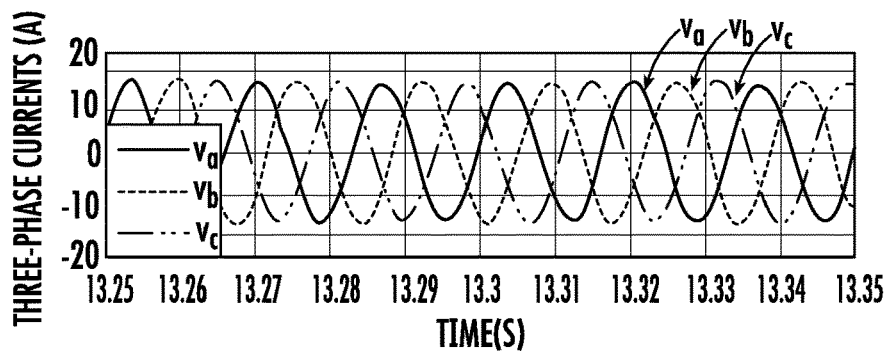
FIG. 18 is a graph illustrating distorted and unbalanced PCC voltage under laboratory conditions.

It was found that under laboratory conditions the PCC voltage was distorted and unbalanced (FIG. 18). This is due to the fact that the three-phase voltage of the ac system in the lab was not perfectly sinusoidal and the impact of the equivalent ac system impedance was significant in the low-voltage laboratory system.

The test sequence was scheduled as the following with t=0 s as the starting point for data recording. Around t=50 s, there was an increase of the active power transferred from the RES converter to the DC-link capacitor. Around t=100 s, the reactive power reference changed from generating to absorbing. Around t=150 s, there was a decrease of the active power transferred from the RES converter to the DC-link capacitor.

Figure 19A:
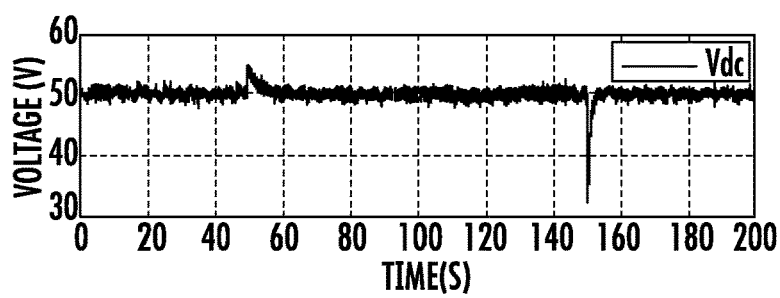
FIGS. 19(a)-19(c) are graphs illustrating the example hardware test results for PD vector control, i.e., DC-link voltage (FIG. 19(a)), PCC d-axis current waveform (FIG. 19(b)), and PCC q-axis current waveform (FIG. 19(c)).
Figure 19B:
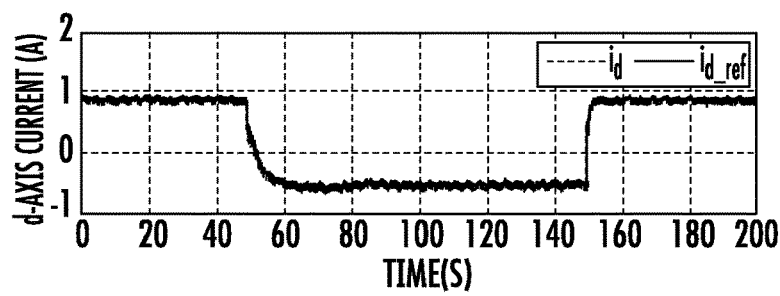
Figure 19C:
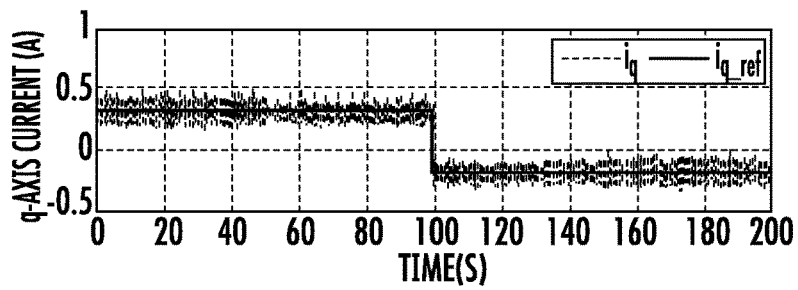
Figure 20A:
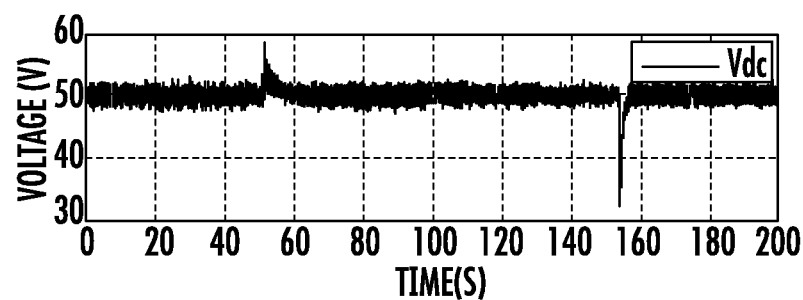
FIGS. 20(a)-20(c) are graphs illustrating the example hardware test results for AD vector control, i.e., DC-link voltage (FIG. 20(a)), PCC d-axis current waveform (FIG. 20(b)), and PCC q-axis current waveform (FIG. 20(c)).
Figure 20B:
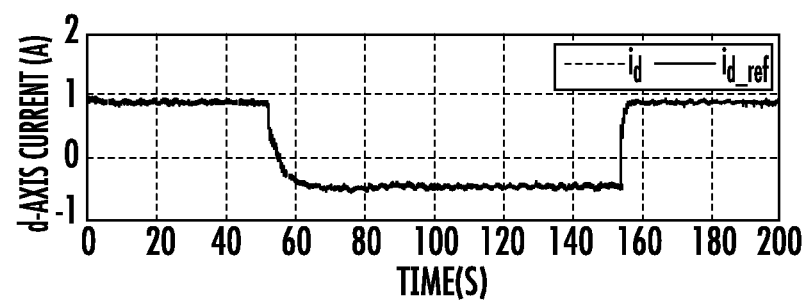
Figure 20C:
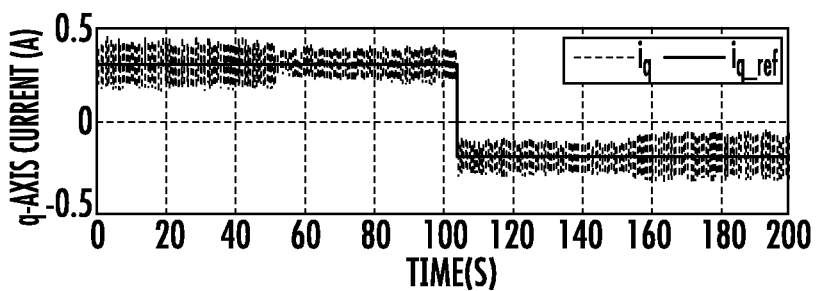
Figure 21A:
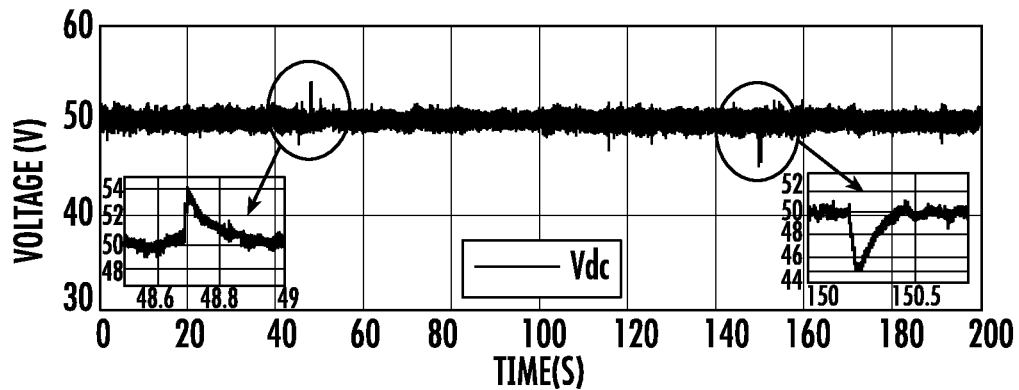
FIGS. 21(a)-21(c) are graphs illustrating the example hardware test results for RNN vector control, i.e., DC-link voltage (FIG. 21(a)), PCC d-axis current waveform (FIG. 21(b)), and PCC q-axis current waveform (FIG. 21(c)).
Figure 21B:
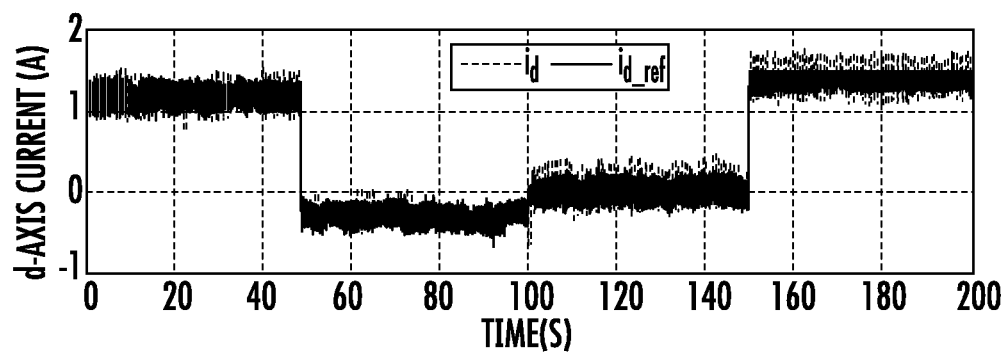

Hardware test results of the PD, AD and RNN vector control methods are shown by FIGS. 19, 20 and 21, respectively. For PD and AD vector controllers, the gains of the outer-loop PI controller must be very small to be able to maintain the DC-link voltage constant. As a result, the oscillation of the dc-link voltage using the PD and AD vector controllers (FIGS. 19a and 20a) is much higher than that using the RNN vector controller (FIG. 21a).

Figure 21C:
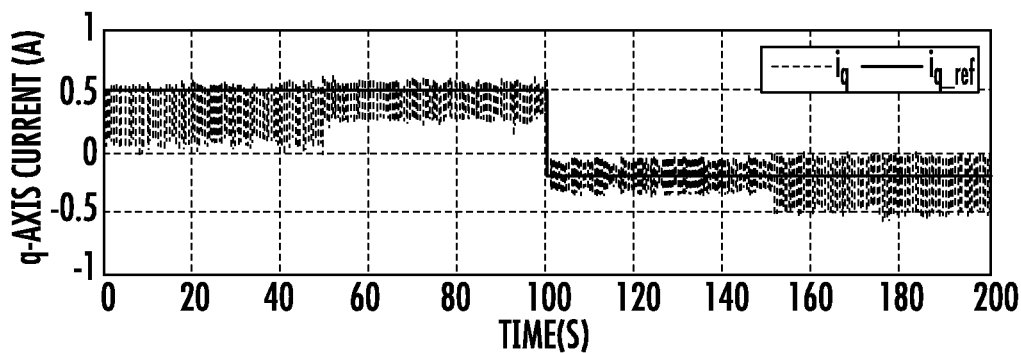

At the beginning, a generating reactive power reference was specified. For a high generating reactive power demand ($i_{q\ ref}$=0.5 A) that may cause the converter to operate over the PWM saturation limit, the RNN controller could still regulate the actual q-axis current $i_q$ as close as possible to the reference value $i_{q\ ref}$ without losing the system stability (FIG. 21c). However, both the PD and AD controller could not handle this situation. The $i_{q\ ref}$ must have a smaller value ($i_{q\ ref}$<0.3 A) to prevent the converter from exceeding the PWM saturation limit (FIGS. 19c and 20c). Otherwise, the whole system will be in a malfunction state.

The relatively high oscillation associated with the NN controller (FIG. 21b and FIG. 21c) is caused by the rapid reference current changes generated by a fast voltage-loop controller. However, for the reference current generated by the same fast voltage-loop controller, both PD and AD controllers were unable to follow the reference in tests.

Table V shows a comparison analysis of hardware test using PD vector control, AD vector control and RNN vector control.

TABLE V

HARDWARE EXPERIMENT COMPARISONS OF PD VECTOR CONTROL, AD VECTOR CONTROL AND RNN VECTOR CONTROL.

| | Method | | |
|---|---|---|---|
| Measure | PD | AD | RNN |
| Sampling time | 1 ms | 0.1 ms | 1 ms |
| Combination with fast outer voltage loop | no | no | yes |
| Tolerance to PWM saturation constraint | bad | bad | excellent |

As described above, techniques for implementing the optimal control of an LCL-GCC system by using an RNN vector control method and how to train the network by an LM+FATT algorithm are provided. The described RNN vector controller was compared with conventional PD and AD vector controllers through both simulation and hardware tests. Different from conventional vector control methods, the proposed RNN vector control technique does not need any special damping policies and has a wider stability region to tolerate system parameter changes than PD and AD vector control methods. Hardware tests demonstrated that the RNN vector control can be combined with relatively faster outer loop controllers to provide better performance. Under PWM saturation conditions, the RNN vector control could still maintain stable performance while the conventional PD and AD methods failed. All these advantages make it efficient and reliable to implement the proposed RNN vector control method into real-life LCL-GCC control applications.

Also described herein is a NN vector control method for optimal vector control of a single-phase GCC with an L, LC or LCL filters. For example, the following are described: 1) an approach to implement optimal vector control for the single-phase GCC by using an artificial neural network, 2) a mechanism to train the NN controller by using a novel Levenberg-Marquardt (LM) algorithm, 3) investigation and comparison of the NN vector controller with conventional vector controllers under dynamic, variable and power converter switching conditions, and 4) hardware validation and comparison in unbalanced and distorted system conditions.

Conventional Vector Control

Single-Phase GCC

Figure 22:
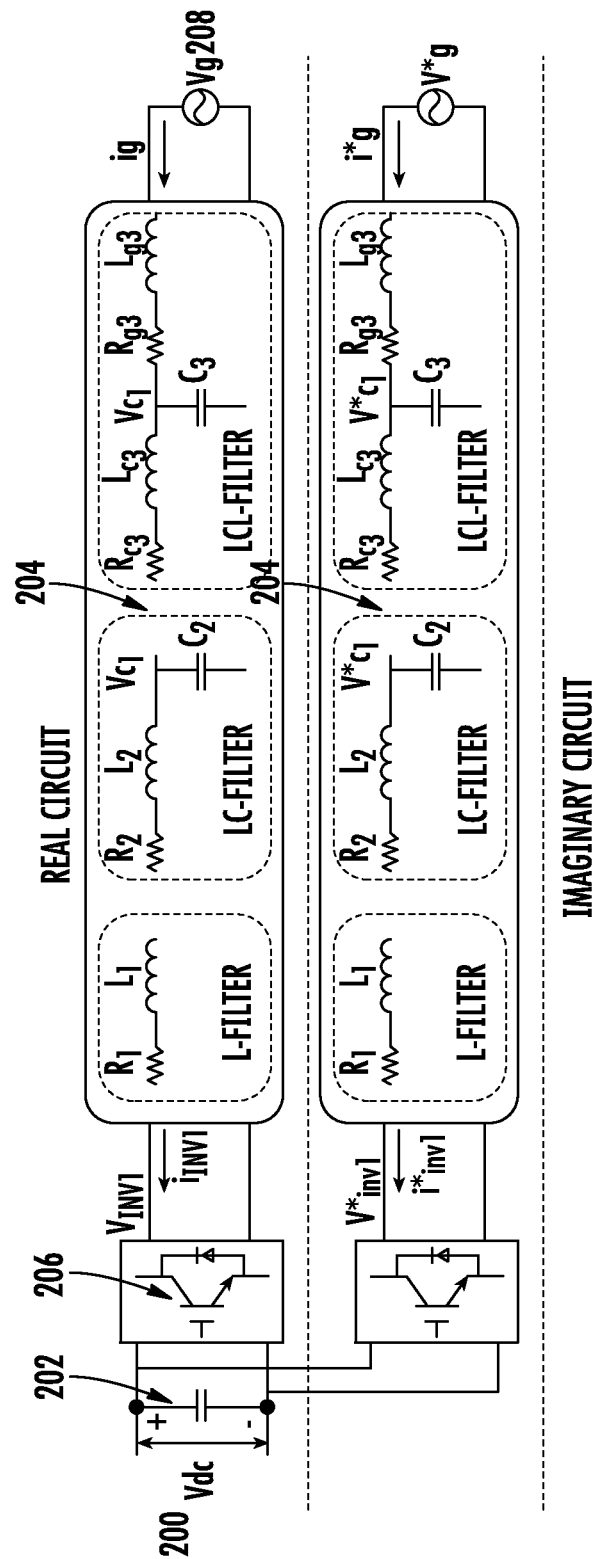
FIG. 22 is a schematic diagram of a single-phase GCC.

Referring now to FIG. 22, a diagram of a single-phase GCC is described. The "real circuit" is shown in the top-half of the figure, and the "imaginary circuit" is shown in the bottom-half of the figure. In FIG. 22, an energy source 200, a dc-link capacitor 202, an output filter 204 (e.g., n-order grid filter), GCC 206, and a single-phase voltage source 208 (e.g., energy grid), representing the voltage at the Point of Common Coupling (PCC) of the ac system, are shown. The output filter is used to reduce the harmonics to the utility grid. Three basic types of filters include: L filter, LC filter and LCL filter, which are all shown separately in FIG. 22. Similar to the three-phase system described above, the energy source can optionally be a solar cell or array, a battery, a fuel cell, a wind turbine generator, a micro-turbine generator, a STATCOM, or a high-voltage DC transmission system.

Imaginary Circuit

To implement d-q vector control, an imaginary orthogonal circuit is generated/created based on the real circuit of the GCC. The imaginary circuit can be generated/created using a differentiation technique (e.g., computing derivatives) or a delay technique. Using the delay technique, the ac voltage or current of the imaginary circuit should have exactly the same amplitude as that of the real circuit but $-90°$ phase shift. The imaginary circuit can be generated/created using a computing device, for example. The real and imaginary circuits constitute the $\alpha$-$\beta$ frame of the GCC system, which can be transferred into the d-q frame through (17):

$$T = \begin{bmatrix} \cos(\omega t) & \sin(\omega t) \\ -\sin(\omega t) & \cos(\omega t) \end{bmatrix} \quad (17)$$

Mathematical Model in d-q Frame

In the d-q frame, the mathematics model (or system equation) of an L-filter based single-phase GCC is (18):

$$\frac{d}{dt}\begin{bmatrix} i_d \\ i_q \end{bmatrix} = -\begin{bmatrix} \frac{R_1}{L_1} & -\omega_s \\ \omega_s & \frac{R_1}{L_1} \end{bmatrix}\begin{bmatrix} i_d \\ i_q \end{bmatrix} - \frac{1}{L_1}\begin{bmatrix} v_{d1}-v_d \\ v_{q1}-v_q \end{bmatrix} \quad (18)$$

For an LC-filter based GCC, the system equations are represented by (19) and (20).

$$\frac{d}{dt}\begin{bmatrix} i_{d1} \\ i_{q1} \end{bmatrix} = -\begin{bmatrix} \frac{R_2}{L_2} & -\omega_s \\ \omega_s & \frac{R_2}{L_2} \end{bmatrix}\begin{bmatrix} i_{d1} \\ i_{q1} \end{bmatrix} - \frac{1}{L_2}\begin{bmatrix} v_{d1}-v_d \\ v_{q1}-v_q \end{bmatrix} \quad (19)$$

$$\begin{bmatrix} i_d \\ i_q \end{bmatrix} = \begin{bmatrix} i_{d1} \\ i_{q1} \end{bmatrix} + \begin{bmatrix} 0 & -C_2\omega_s \\ C_2\omega_s & 0 \end{bmatrix}\begin{bmatrix} v_d \\ v_q \end{bmatrix} \quad (20)$$

And, (21) describes the system equation of an LCL-filter based GCC.

$$\frac{d}{dt}\begin{bmatrix} i_d \\ i_q \\ i_{d1} \\ i_{q1} \\ v_{cd} \\ v_{cq} \end{bmatrix} = \begin{bmatrix} -\frac{R_{g3}}{L_{g3}} & \omega_s & 0 & 0 & -\frac{1}{L_{g3}} & 0 \\ -\omega_s & -\frac{R_{g3}}{L_{g3}} & 0 & 0 & 0 & -\frac{1}{L_{g3}} \\ 0 & 0 & -\frac{R_{c3}}{L_{c3}} & \omega_s & \frac{1}{L_{c3}} & 0 \\ 0 & 0 & -\omega_s & -\frac{R_{c3}}{L_{c3}} & 0 & \frac{1}{L_{c3}} \\ \frac{1}{C_3} & 0 & -\frac{1}{C_3} & 0 & 0 & \omega_s \\ 0 & \frac{1}{C_3} & 0 & -\frac{1}{C_3} & -\omega_s & 0 \end{bmatrix}\begin{bmatrix} i_d \\ i_q \\ i_{d1} \\ i_{q1} \\ v_{cd} \\ v_{cq} \end{bmatrix} + \begin{bmatrix} \frac{1}{L_{g3}} & 0 & 0 & 0 & 0 & 0 \\ 0 & \frac{1}{L_{g3}} & 0 & 0 & 0 & 0 \\ 0 & 0 & -\frac{1}{L_{c3}} & 0 & 0 & 0 \\ 0 & 0 & 0 & -\frac{1}{L_{c3}} & 0 & 0 \\ 0 & 0 & 0 & 0 & 0 & 0 \\ 0 & 0 & 0 & 0 & 0 & 0 \end{bmatrix}\begin{bmatrix} v_d \\ v_q \\ v_{d1} \\ v_{q1} \\ 0 \\ 0 \end{bmatrix} \quad (21)$$

In Eqs. (18)-(21), $\omega_s$ is the angular frequency of the grid voltage, all other symbols are consistent with those shown in FIG. 22. The corresponding relationships of all the variables between d-q domain and the single-phase circuit domain are shown below.

$i_g, i^*_g \leftrightarrow i_d, i_q, i_{inv1}, i^*_{inv1} \leftrightarrow i_{d1}, i_{q1}, v_g, v^*_g \leftrightarrow v_d, v_q, v_{in1},$
$v^*_{inv1} \leftrightarrow v_{d1}, v_{q1}$, and $v_{c3}, v^*_{c3} \leftrightarrow v_{cd}, v_{cq}$ Training Implementation A neural network vector control technique is described above with regard to a three-phase system. This disclosure contemplates that the neural network controller described above can be used in single-phase systems. As shown below, the neural network controller can be used to more effectively control single-phase L-GCC, LC-GCC, and LCL-GCC systems as compared to conventional vector control techniques.

Figure 23:
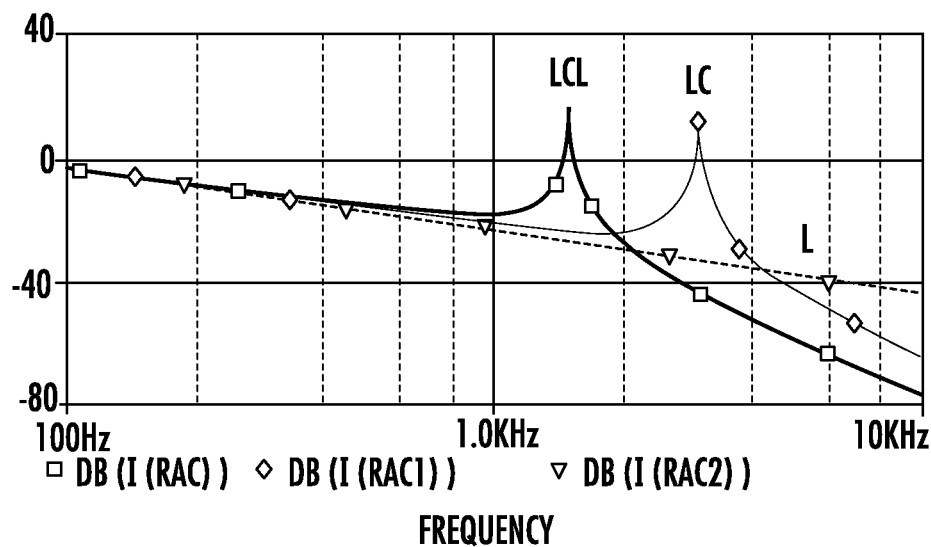
FIG. 23 is a graph illustrating the frequency response of three different filters (i.e., L-, LC-, LCL-filters) corresponding to harmonic currents injected into the grid.

Table VI specifies the parameters of single-phase GCC systems. The capacitor values were selected as 20 µF to provide better attenuation results. FIG. 23 compares the frequency response of three different filters corresponding to harmonic currents injected into the grid, in which the peaks stand for resonant frequencies.

TABLE VI

SINGLE-PHASE GCC SYSTEM PARAMETERS

| Symbol | Quantity | Value | Unit |
|---|---|---|---|
| $V_g$ | nominal grid voltage (rms) | 230 | V |
| f | nominal grid frequency | 50 | Hz |
| $V_{dc}$ | DC-link voltage | 500 | V |
| $L_1$ | L-filter inductor | 2.14 | mH |
| $R_1$ | L-filter resistor | 0.19 | Ω |
| $L_2$ | LC-filter inductor | 2.14 | mH |
| $R_2$ | LC-filter resistor | 0.19 | Ω |
| $C_2$ | LC-filter parallel capacitor | 20 | µF |
| $L_{c3}$ | LCL-filter converter side inductor | 1.07 | mH |

TABLE VI-continued

SINGLE-PHASE GCC SYSTEM PARAMETERS

| Symbol | Quantity | Value | Unit |
|---|---|---|---|
| $R_{c3}$ | LCL-filter converter side resistor | 0.095 | Ω |
| $C_3$ | LCL-filter parallel capacitor | 20 | μF |
| $L_{g3}$ | LCL-filter grid side inductor | 1.07 | mH |
| $R_{g3}$ | LCL-filter grid side resistor | 0.095 | Ω |

Figure 24:
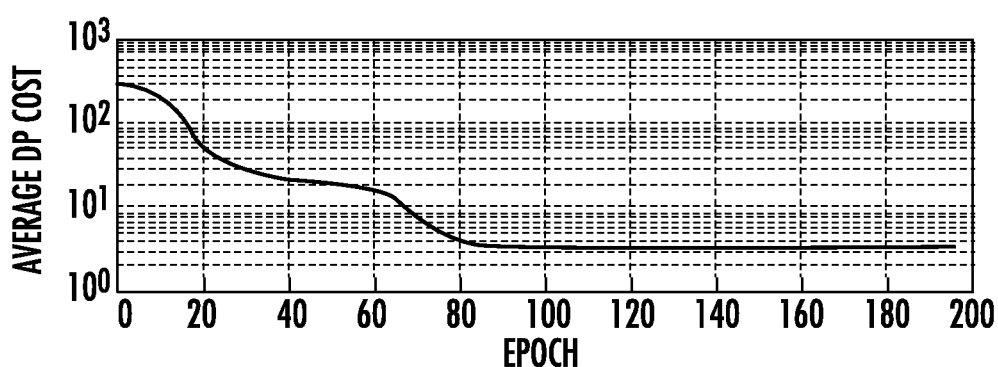
FIG. 24 is a graph illustrating the learning curve for a successful training of the NN vector controller used in a single-phase system.

FIG. 24 shows the learning curve for a successful training of the NN controller. The average DP cost per trajectory drops to a small value very quickly within 100 iterations and is stabilized at this value, demonstrating a good convergence result of the LM training algorithm.

Performance Evaluation

Figure 25:
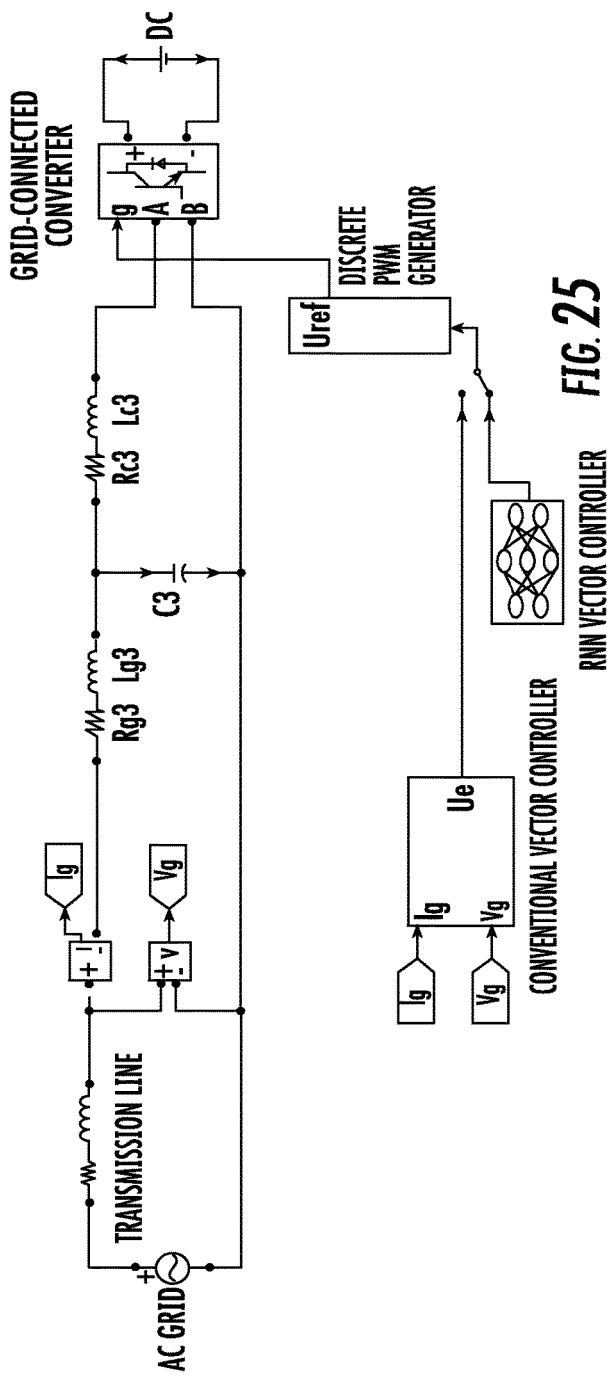
FIG. 25 is a diagram of a model of a single-phase GCC with an LCL-grid filter.

To evaluate the performance of the neural network vector controller and to compare it with conventional vector controllers, integrated transient simulation systems of the single-phase GCC systems for all the three filter schemes were developed by using SIMPOWERSYSTEMS of MATLAB of MATH WORKS, INC. of Natick, Mass. FIG. 25 shows an example of an LCL-filter based single-phase GCC simulink model. For digital control realization, the measured instantaneous single-phase PCC voltage and grid current pass through a zero-order-hold (ZOH) block.

Figure 26:
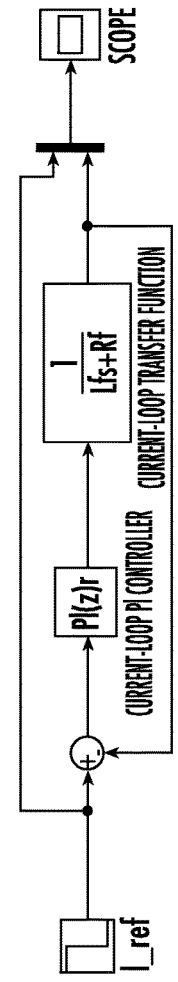
FIG. 26 is a block diagram for tuning a current-loop PI controller.

The PI parameters of the current-loop controller for the conventional vector control method was tuned by PID tuner function within the PID controller block in Matlab. FIG. 26 shows the closed-loop simulink model used to tune the PI parameters. The transfer function in FIG. 26 is based on the conventional vector control strategy. Phase margin was set as 60 deg and the bandwidth was chosen as 1500 rad/s, which tends to yield the best results considering the PWM saturation constraints. The same PI parameters were used for control of all three filters.

If not specified, Ts=0.1 ms was used in all simulations. Switch frequency fs=6000 Hz was used according to the frequency response plot shown in FIG. 23.

L-Filter Based GCC

Figure 27A:
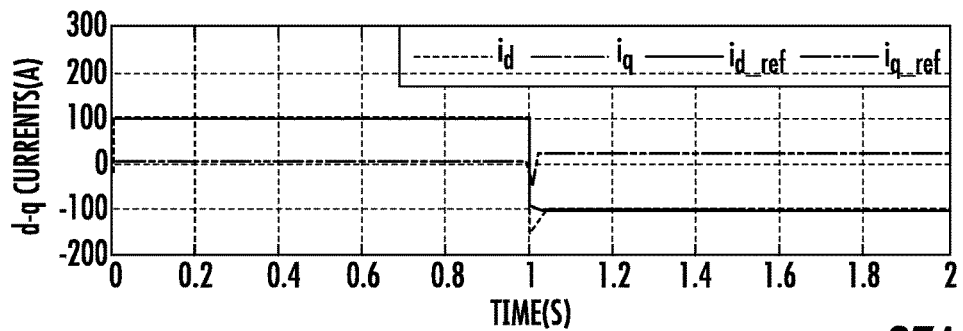
FIGS. 27(a)-27(d) are graphs illustrating d-q currents and single-phase currents in an L-GCC system using conventional vector control and NN vector control with an imaginary circuit created using a delay method.
Figure 27B:
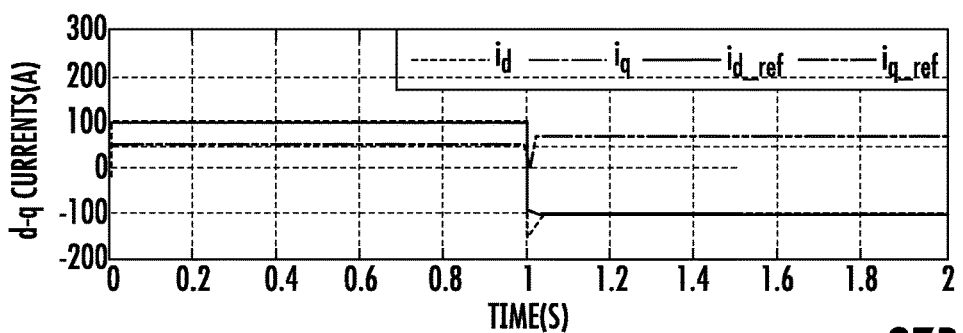
Figure 27C:
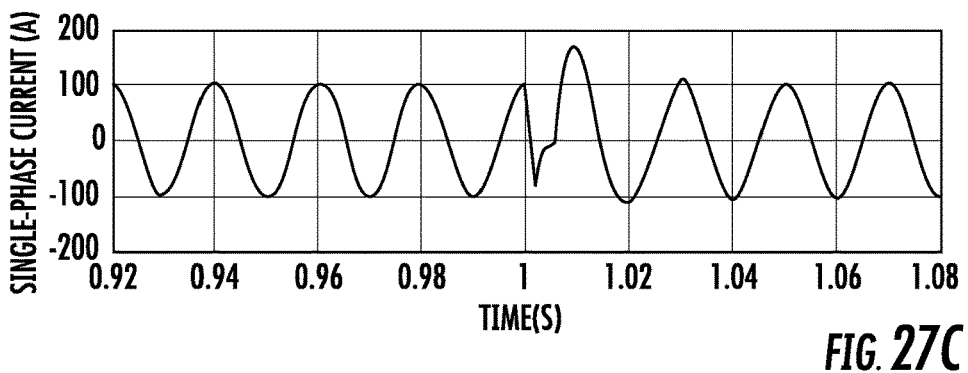
Figure 27D:
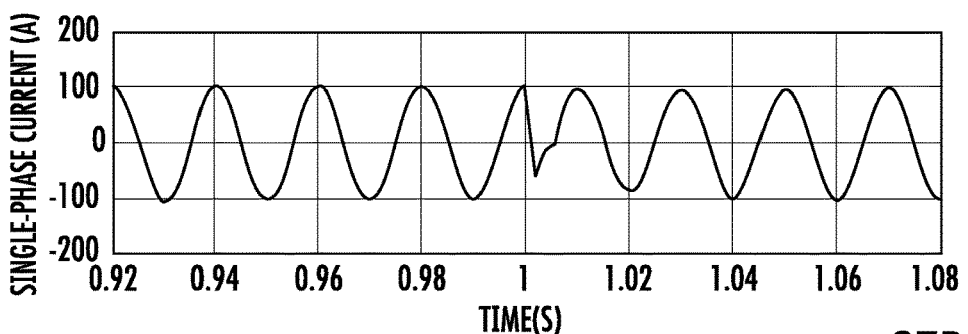

With the imaginary circuit created by using the delay method, both conventional and NN vector control approaches showed similar performance in FIGS. 27a and 27b. However, lower overshoot was observed from the corresponding single-phase PCC current at t=1 s under the NN vector control (FIG. 27d) compared to the conventional vector control (FIG. 27c).

Figure 28A:
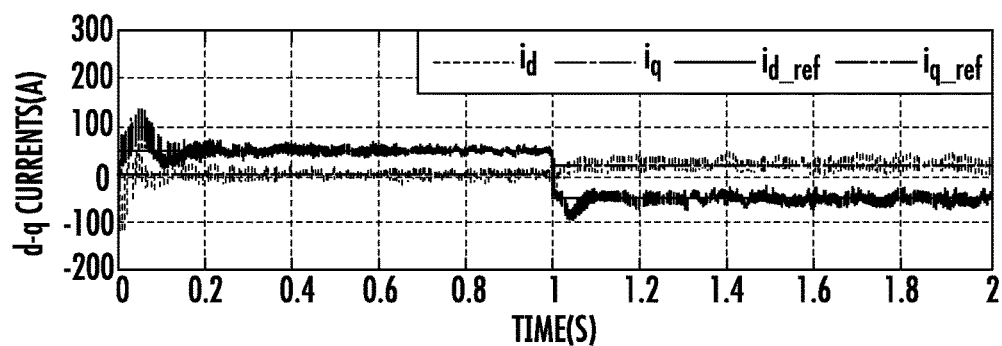
FIGS. 28(a)-28(b) are graphs illustrating d-q currents in an L-GCC system using conventional vector control and NN vector control with an imaginary circuit created using a differentiation method.
Figure 28B:
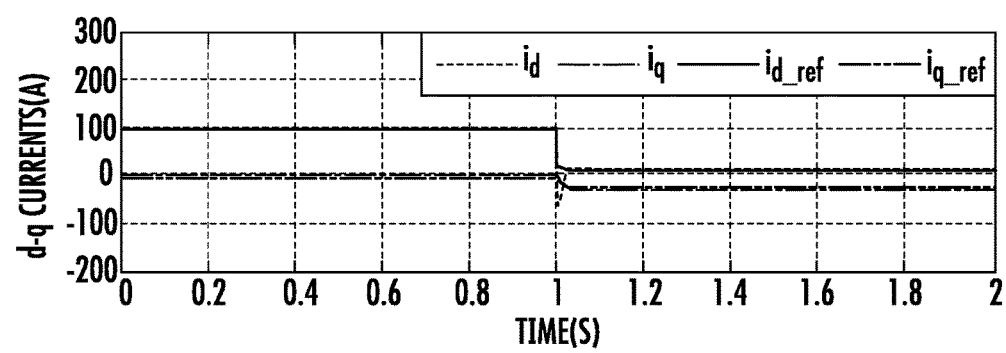

With the imaginary circuit created by using the differentiation method, the conventional vector control demonstrated a poor performance in FIG. 28a: very large oscillations. This is due to the fact that the grid oscillations could cause inaccuracy of the imaginary circuit created by using the differentiation method. However, the NN vector control still performed very well in FIG. 28b: less oscillations and lower overshoot.

LC-Filter Based GCC

Figure 29A:
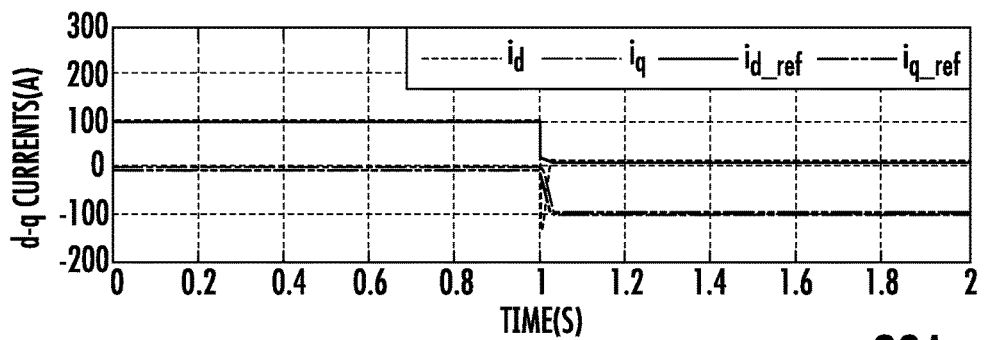
FIGS. 29(a)-29(d) are graphs illustrating d-q currents (FIGS. 29(a)-29(b)) and single-phase currents (FIGS. 29(c)-29(d)) in an LC-GCC system using conventional vector control and NN vector control with an imaginary circuit created using a delay method.
Figure 29B:
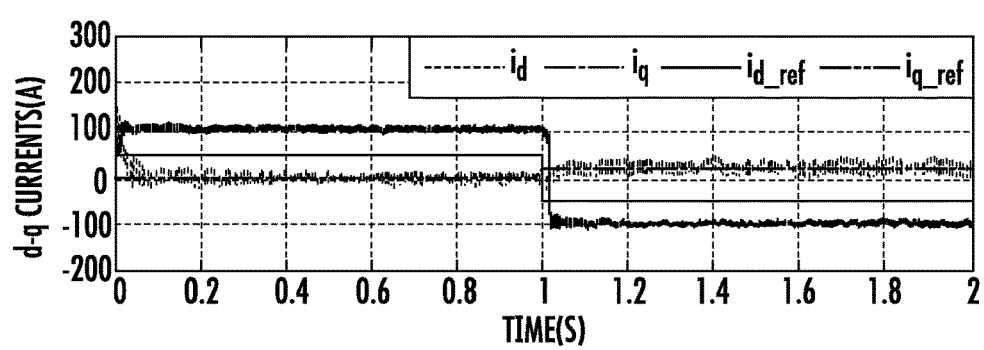
Figure 29C:
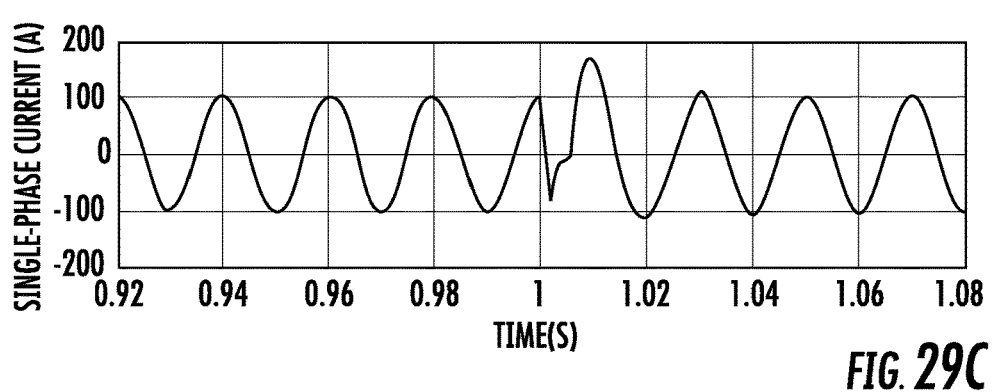
Figure 29D:
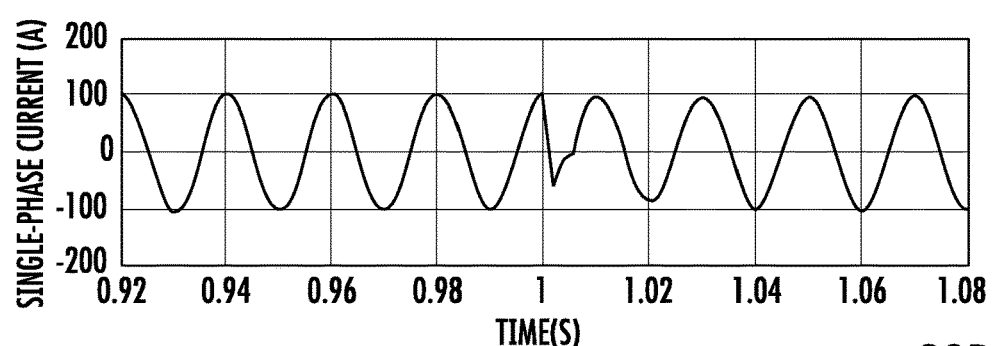

Compared with conventional vector control FIGS. 29a and 29c for LC-filter based GCC, the NN vector control showed good tracking ability (FIGS. 29b and 29d) as expected such as lower overshoot and faster response speed. The NN vector control seems to be able to combine fast response speed and low overshoot together and provide good performance to approximate optimal control.

LCL-Filter Based GCC

To overcome resonance phenomenon of the LCL filter, passive damping method was adopted in developing conventional vector control. The resonance frequency can be calculated as (22).

$$f_r = \frac{1}{2\pi}\sqrt{\frac{L_g + L_c}{L_g L_c C}} \quad (22)$$

Thus a series resistor was chosen as Rpd=7.71Ω according to (23):

$$R_{pd} = \frac{1}{3}\left(\frac{1}{C\omega_r}\right) = \frac{1}{3}\left(\frac{1}{C2\pi f_r}\right) \quad (23)$$

Figure 30A:
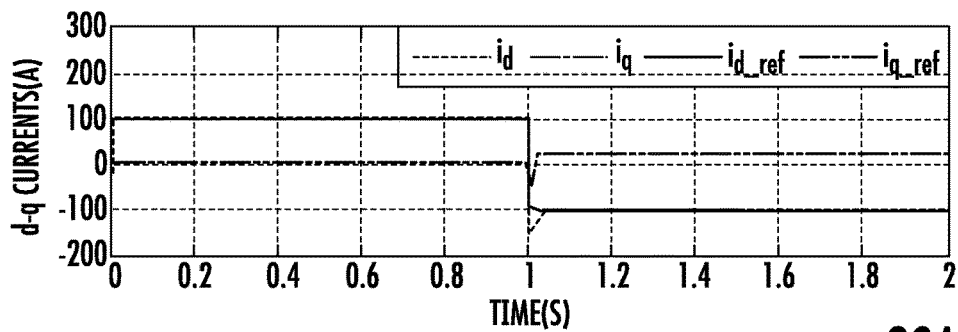
FIGS. 30(a)-30(d) are graphs illustrating d-q currents and single-phase currents in an LCL-GCC system using conventional vector control and NN vector control with an imaginary circuit created using a delay method.
Figure 30B:
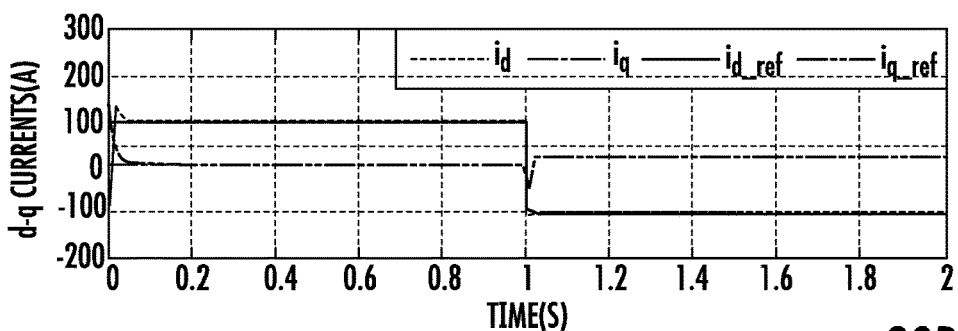
Figure 30C:
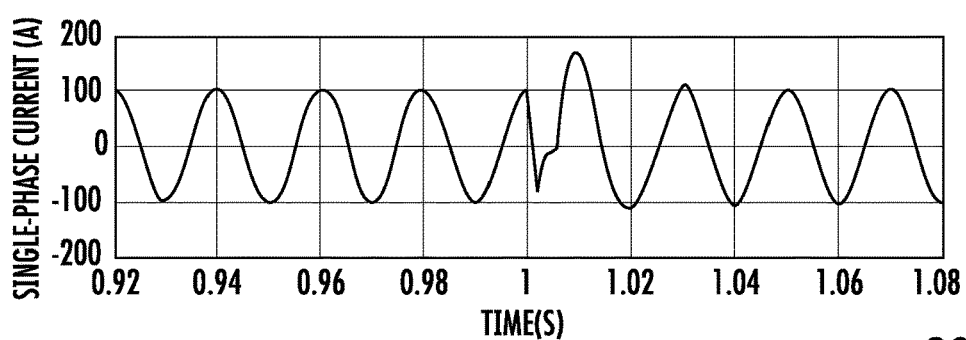
Figure 30D:
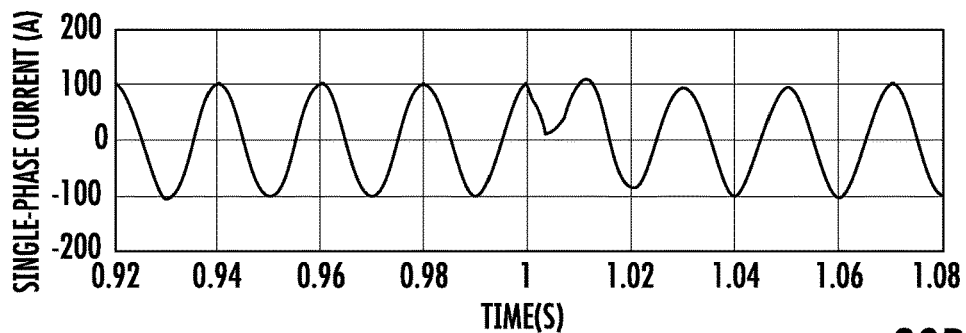

Compared to the conventional vector control, the NN vector control is a damping free technique, i.e., it does not need any special damping policies. FIGS. 29b and 30d demonstrated that the NN vector control still performed better than conventional vector control for the LCL filter based GCC under no damping condition.

Another feature is that the sampling rate for the NN vector control is Ts=1 ms while for conventional vector control it has to be 0.1 ms to assure the stable operation of the controller.

Hardware Validation

Figure 31:
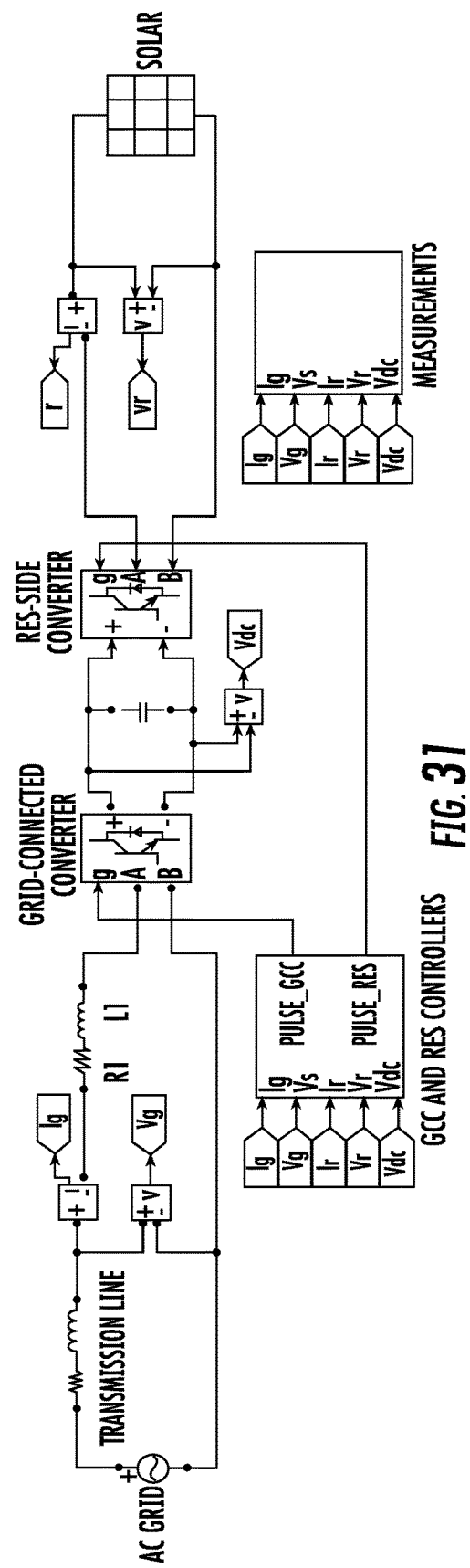
FIG. 31 is a schematic diagram of an example hardware setup.

A hardware laboratory test system for a single-phase GCC in an ac/dc/dc converter application was built to validate the NN vector control method for signal-phase systems as described herein. This converter configuration can be used in solar photovoltaic systems. FIG. 31 demonstrated an example of ac/dc/dc converter with an L filter, in which, the left-side power source represents the grid and the right-side represents a renewable energy source (RES) such as a solar panel or array.

The hardware test system took the following setups: 1) an ac/dc converter was connected to an adjustable Lab-Volt single-phase power supply signifying the grid, 2) an do/dc converter was connected to an adjustable Lab-Volt single-phase power supply representing an RES, 3) all filters were built by using LabVolt smoothing inductors and LabVolt capacitors, 4) the ac/dc converter was controlled by a dSPACE digital control system, 5) the control system collected the DC-link voltage and single-phase currents and voltages at the PCC, and sends out control signals to the converter according to various control demands.

The sampling time Ts=0.1 ms was used for all hardware tests. For the conventional vector control method, the actual damping resistor for the LCL filter is Rpd+RCin=25Ω. Table VII specifies all the parameters used in the tests. The NN controller was retrained based on the parameters in Table VII.

The DC-link voltage control is developed based on the principle of the power balance, the tuning for the DC-link voltage PI controller is similar to that for the current-loop controller described above. Phase margin was set as 60 deg. The bandwidth was chosen as 4 rad/s because any bandwidth larger than 4 rad/s failed to maintain the DC-link voltage constant in all tests using the conventional vector control. For NN vector control, due to the good current tracking ability of the NN controller, a relatively faster voltage-loop controller was adopted with its bandwidth selected as 8 rad/s.

Results

The test sequence was scheduled as the following with t=0 s as the starting point for data recording. Around t=40 s, there was an increase of the generating reactive demand which corresponds to an increase of the q-axis current.

Around t=100 s, the reactive power reference changes from generating to absorbing which corresponds to a decrease of the q-axis current.

TABLE VII

HARDWARE EXPERIMENT TEST SYSTEM PARAMETERS

| Symbol | Quantity | Value | Unit |
|---|---|---|---|
| $V_g$ | nominal grid voltage (rms) | 20 | V |
| f | nominal grid frequency | 60 | Hz |
| $V_{dc}$ | DC-link reference voltage | 50 | V |
| $C_{dc}$ | DC-link capacitance | 3260 | μF |
| $L_1$ | L-filter inductor | 25 | mH |
| $R_1$ | L-filter resistor | 0.25 | Ω |
| $L_2$ | LC-filter inductor | 25 | mH |
| $R_2$ | LC-filter resistor | 0.25 | Ω |
| $C_2$ | LC-filter parallel capacitor | 2.2 | μF |
| $R_{Cin2}$ | LC-filter capacitor internal resistance | 3 | Ω |
| $L_{c3}$ | LCL-filter converter-side inductor | 12.5 | mH |
| $R_{c3}$ | LCL-filter converter-side resistor | 0.125 | Ω |
| $C_3$ | LCL-filter parallel capacitor | 2.2 | μF |
| $R_{Cin3}$ | LCL-filter capacitor internal resistance | 3 | Ω |
| $L_{g3}$ | LCL-filter grid-side inductor | 12.5 | mH |
| $R_{g3}$ | LCL-filter grid-side resistor | 0.125 | Ω |
| $R_{pd}$ | damping resistor for LCL filter | 22 | Ω |

Around t=120 s, there was a random change of the active power transferred from the RES converter to the DC-link capacitor representing the power generated from the solar panels. Around t=220 s, the random change of the active power was ended.

FIG. 32 shows the test results of the ac/dc/dc converter with an L filter under the conventional vector control and FIG. 33 shows the corresponding results under the NN vector control. Whenever there was a change in iq ref (FIG. 32c), an obvious voltage overshoot was seen from the dc-link voltage waveform under the conventional vector control (FIG. 32a). However, when using the NN vector control, no overshoot was observed (FIG. 33a) even for a larger variation of iq ref (FIG. 33c). In fact, under iq ref=−0.7 A condition, the NN vector control can still maintain dc-link voltage, while the conventional vector control failed in this iq ref reference current.

Figure 32A:
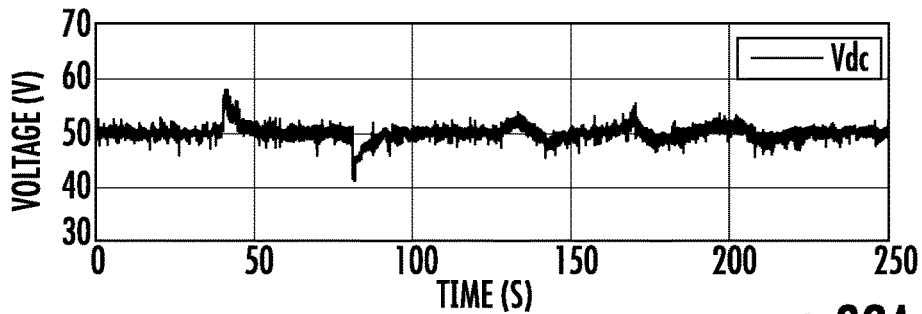
FIGS. 32(a)-32(d) are graphs illustrating an example of single-phase ac/dc/dc converter test with an L filter using conventional vector control techniques, i.e., DC-link voltage (FIG. 32(a)), PCC d-axis current waveform (FIG. 32(b)), PCC q-axis current waveform (FIG. 32(c)), and single-phase current waveform (FIG. 32(d)).
Figure 32B:
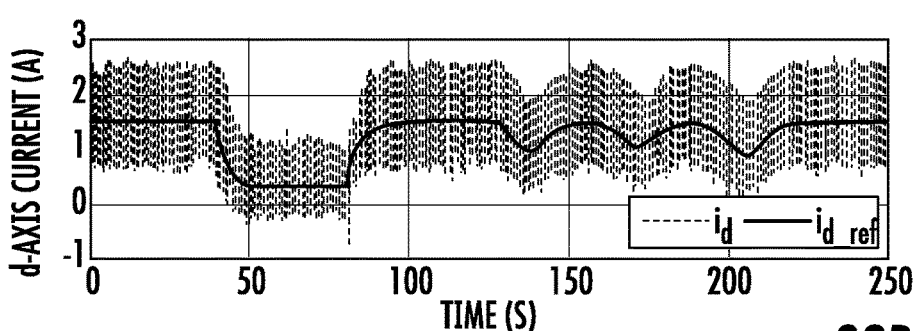
Figure 32C:
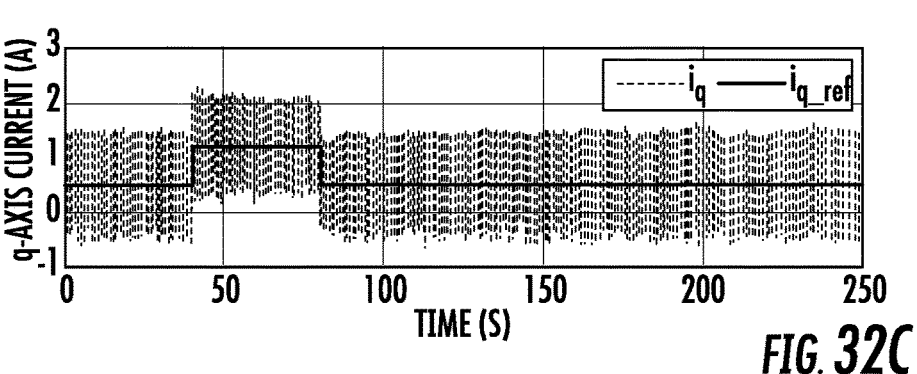
Figure 33A:
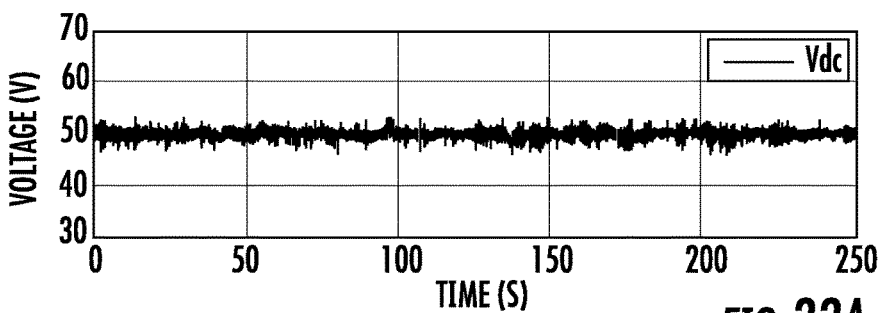
FIGS. 33(a)-33(d) are graphs illustrating an example of single-phase ac/dc/dc converter test with an L filter using NN vector control techniques, i.e., DC-link voltage (FIG. 33(a)), PCC d-axis current waveform (FIG. 33(b)), PCC q-axis current waveform (FIG. 33(c)), and single-phase current waveform (FIG. 33(d)).
Figure 33B:
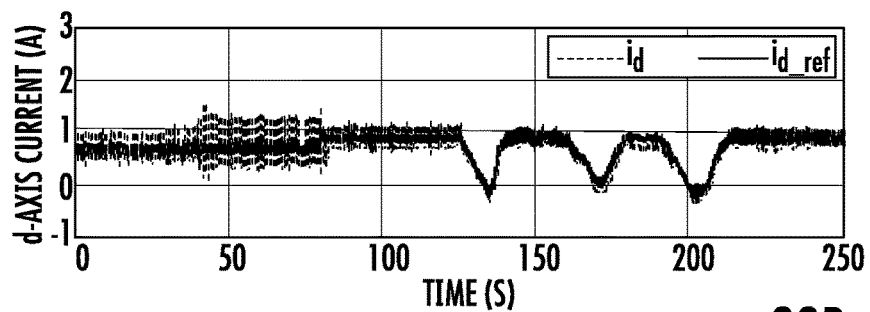
Figure 33C:
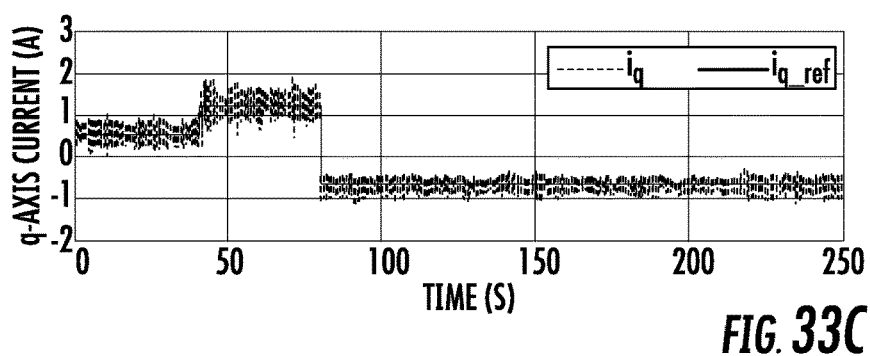
Figure 33D:
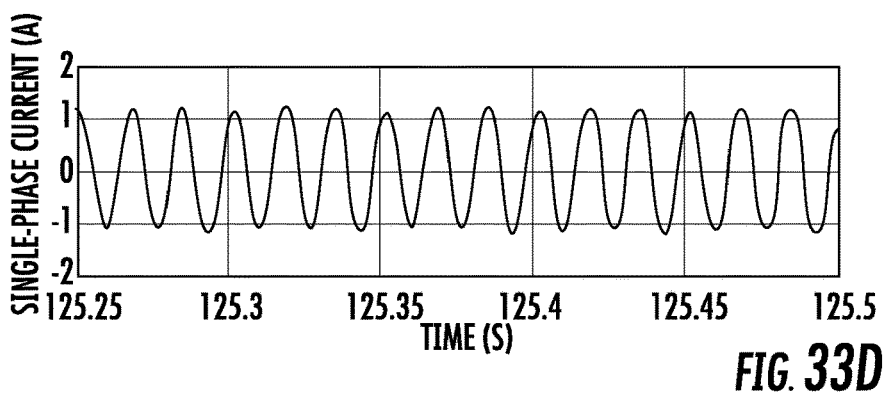
Figure 34A:
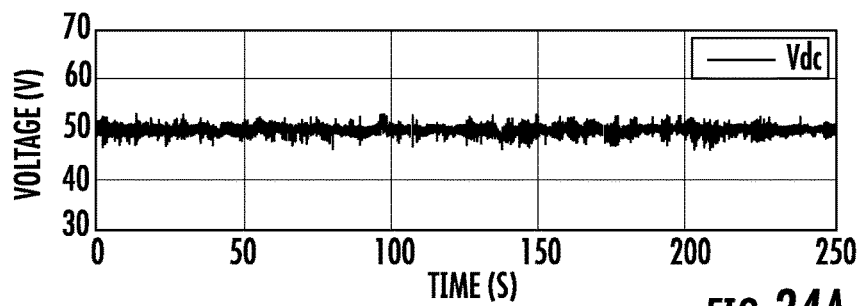
FIGS. 34(a)-34(d) are graphs illustrating an example of single-phase ac/dc/dc converter test with an LC filter using NN vector control techniques, i.e., DC-link voltage (FIG. 34(a)), PCC d-axis current waveform (FIG. 34(b)), PCC q-axis current waveform (FIG. 34(c)), and single-phase current waveform (FIG. 34(d)).
Figure 34B:
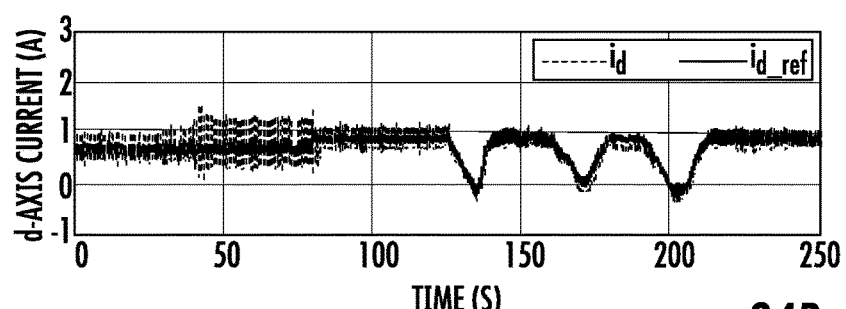
Figure 34C:
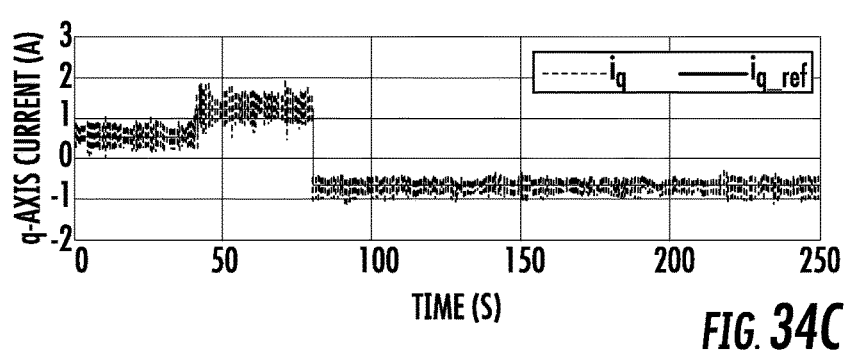
Figure 34D:
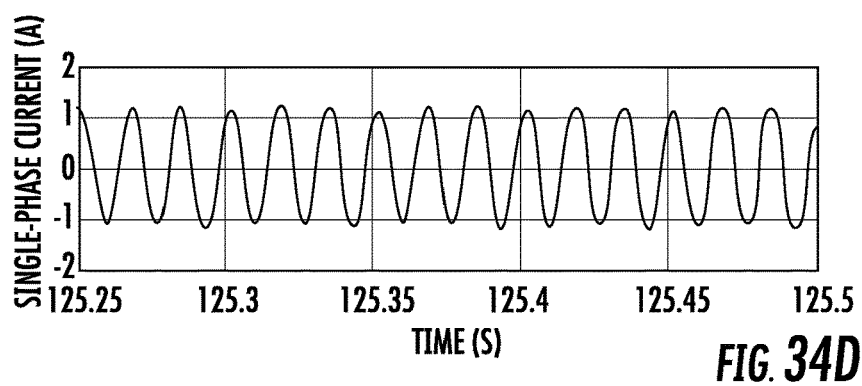
Figure 35A:
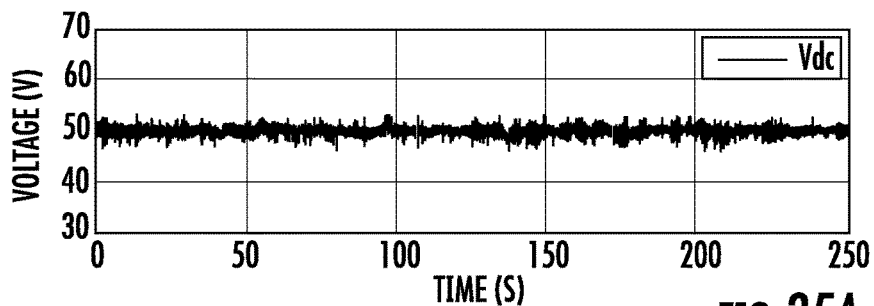
FIGS. 35(a)-35(d) are graphs illustrating an example of single-phase ac/dc/dc converter test with an LCL filter using NN vector control techniques, i.e., DC-link voltage (FIG. 35(a)), PCC d-axis current waveform (FIG. 35(b)), PCC q-axis current waveform (FIG. 35(c)), and single-phase current waveform (FIG. 35(d)).
Figure 35B:
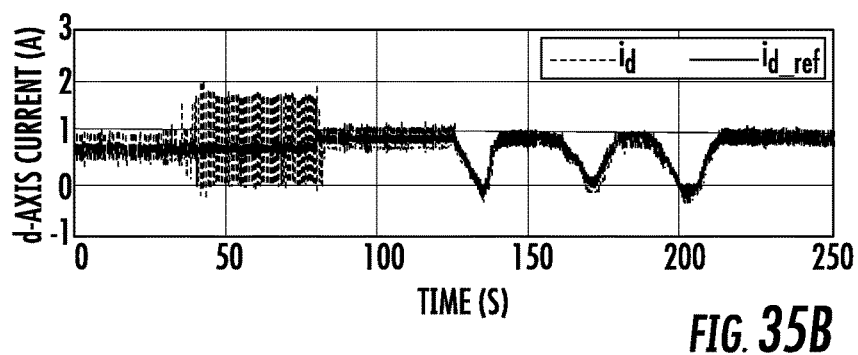
Figure 35C:
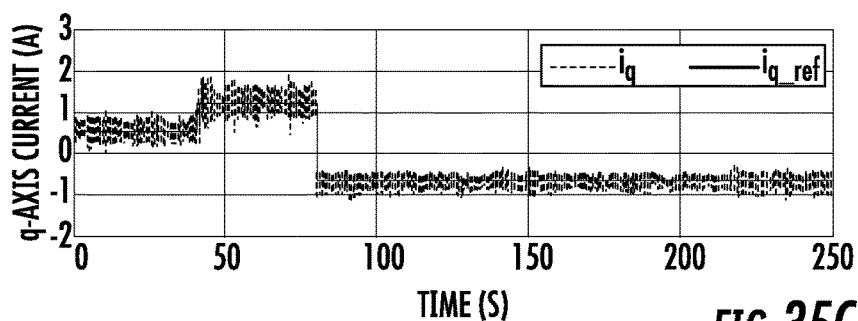
Figure 35D:
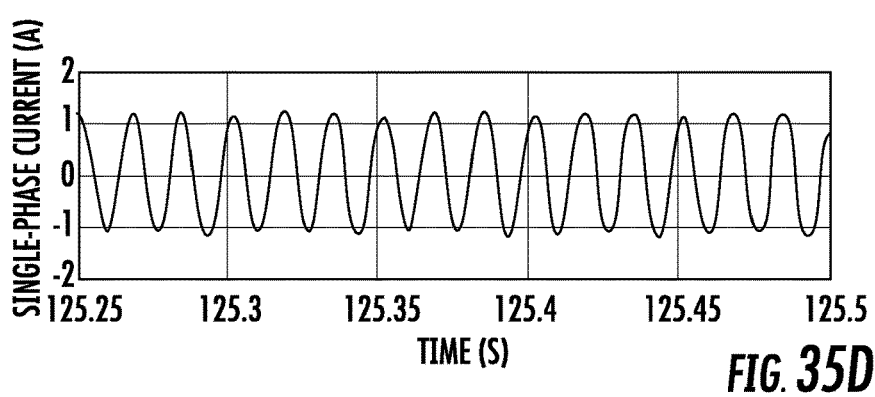

During the random changing period as shown by FIG. 32b, the dc-link voltage showed large oscillations using the conventional vector control (FIG. 32a). However, the NN vector control can still maintain the dc-link voltage at the reference voltage very well (FIG. 33b and FIG. 33a).

Figure 32D:
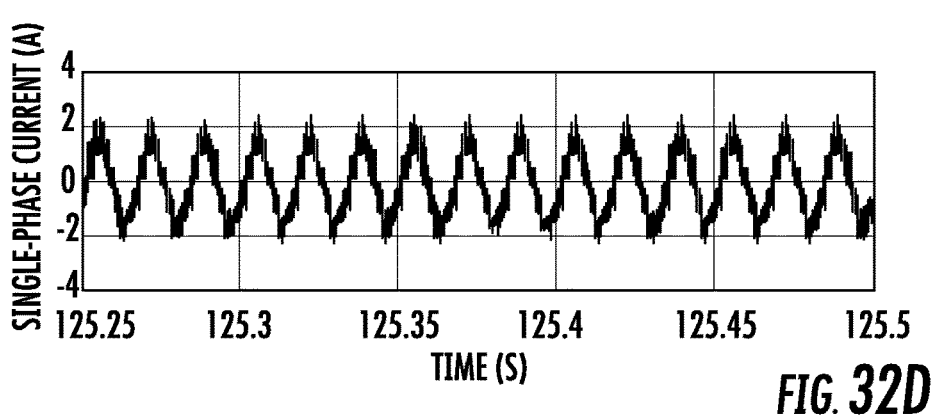

The current waveform further demonstrated the advantage of the NN vector control. The single-phase current showed much less oscillations under the NN vector control (FIG. 33d) than under the conventional vector control (FIG. 32d).

Note that the NN vector control results (FIG. 33) were obtained under a low switching frequency fs=1980 Hz, while the conventional vector control results (FIG. 32) were obtained under a switch frequency fs=3000 Hz. It was discovered that the distortion was even worse for the conventional vector control if the switching frequency is 1980 Hz.

FIG. 34 and FIG. 35 demonstrate the test results of the ac/dc/dc converter with an LC filter and an LCL filter, respectively, using the NN vector control method. The system with the LC filter showed less oscillations in the dc-link voltage and much improved power quality (FIG. 34a) than that with the L filter (FIG. 33a). For the LCL-filter based system, the overall performance is even better (FIG. 35a).

However, for the LC-filter or LCL-filter based system, the conventional vector control method will lose stability without proper damping policies. After certain damping policies was used, the conventional vector control method still failed to provide good performance in the ac/dc/dc converter tests.

In general, the NN vector control showed very good performance for ac/dc/dc converter with all three different filtering schemes, demonstrating the great advantage of the neural network vector control over the conventional vector control.

The neural network controller implements the optimal control based on the dynamic programming principle. Both the simulation evaluation and hardware test results demonstrated that the neural network control technique has superior performance to the conventional vector control method such as faster response time, lower overshoot and less oscillation. Especially, for single-phase GCC with an LCL filter, the neural network vector control does not require any damping policy. Using the neural network vector control technique, the harmonics are significantly reduced, which would benefit the integration of small-scale single-phase renewable resources to the grid. Two different methods for creating the imaginary circuit are also described. Although the control performance of conventional vector control methods is more sensitive to how the imaginary circuit is created, the neural network vector control is not affected and performs very well in general.

Direct Current Vector Control

Also described herein are methods and systems for providing direct current control (DCC) vector control mechanisms for L-, LC- and LCL-filter GCCs without using any passive or active damping methods. For example, the techniques described herein include: 1) analysis of active and reactive power control characteristics of L-, LC- and LCL-filter GCCs in decoupled d-q vector control framework, 2) development of DCC vector control mechanisms for L-, LC- and LCL-filter GCCs, 3) implementation of the DCC control strategies in a nested-loop control structure, 4) development of a control strategy for L-, LC- and LCL-filter GCCs under GCC physical system constraints, 5) evaluation of the DCC for dc-link voltage control, power control and grid voltage support control, and 6) hardware test validation.

GCC Model in dq Reference Frame with L, LC and LCL Filters

L-filter based GCC

Figure 36:
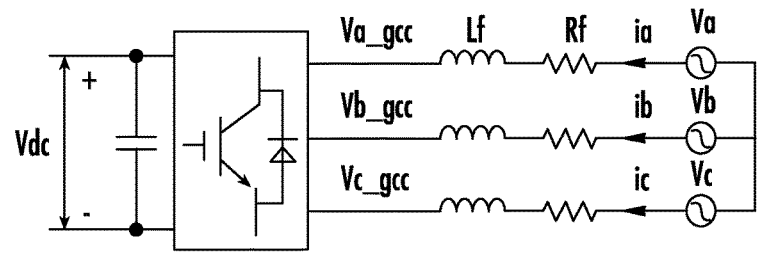
FIG. 36 is a schematic diagram of a three-phase L-GCC system.

FIG. 36 shows the schematic of a L-filter GCC system, in which a dc-link capacitor is on the left and a three-phase voltage source, representing the voltage at the Point of Common Coupling (PCC) with the ac system, is on the right. In FIG. 36, $L_f$ and $R_f$ are the inductance and resistance of the grid filter, $v_{a\_gcc}$, $v_{b\_gcc}$, $v_{c\_gcc}$ stands for the GCC output voltage in the three-phase ac system and the corresponding voltages in dq-reference frame are $v_{d\_gcc}$ and $v_{q\_gcc}$, $v_{a,b,c}$ is the three-phase PCC voltage and the corresponding voltage in dq-reference frame are $v_d$ and $v_q$, $i_{a,b,c}$ stands for the grid three-phase current and the corresponding current in dq-reference frame are $i_d$ and $i_q$.

Using the motor sign convention, the voltage balance across the grid-filter inductor in dq reference frame is:

$$\begin{bmatrix} v_d \\ v_q \end{bmatrix} = R_f \begin{bmatrix} i_d \\ i_q \end{bmatrix} + L_f \frac{d}{dt} \begin{bmatrix} i_d \\ i_q \end{bmatrix} + \omega_s L_f \begin{bmatrix} -i_q \\ i_d \end{bmatrix} + \begin{bmatrix} v_{d\_gcc} \\ v_{q\_gcc} \end{bmatrix} \quad (24)$$

where $\omega_s$ is the angular frequency of the grid voltage. Using space vectors, (24) is expressed by a complex equation (25) in which $v_{dq}$, $i_{dq}$, and $v_{dq\_gcc}$ are instantaneous space vectors of the PCC voltage, line current, and converter output voltage in dq reference frame.

$$v_{dq} = R_f \cdot i_{dq} + L_f \frac{d}{dt} i_{dq} + j\omega_s L_f \cdot i_{dq} + v_{dc\_gcc} \quad (25)$$

In the steady-state condition, (25) becomes (26), where $V_{dq}$, $I_{dq}$ and $V_{dq\_gcc}$ stand for the steady-state space vectors of PCC voltage, grid current, and converter output voltage in dq reference reframe.

$$V_{dq} = R_f I_{dq} + j\omega_s L_f I_{dq} + V_{dq\_gcc} \quad (26)$$

Using PCC voltage orientation frame, the PCC d-axis voltage is constant and q-axis voltage is zero. Thus, the instantaneous active and reactive powers transferred from the ac system to the GCC are proportional to d- and q-axis currents, respectively, as shown by (27) and (28).

$$p(t) = v_d i_d + v_q i_q = v_d i_d \quad (27)$$

$$q(t) = v_q i_d - v_d i_q = -V_d i_q \quad (28)$$

In terms of the steady state condition, $V_{dq} = V_d + j0$ if the d-axis of the reference frame is aligned along the PCC voltage position. Assuming $V_{dq\_gcc} = V_{dq\_gcc} + jV_{dq\_gcc}$ and neglecting resistor $R_f$, then, the current flowing between the ac system and the GCC according to (26) is:

$$I_{dq} = \frac{V_{dq} - V_{dq\_gcc}}{jX_L} = \frac{V_d - V_{d\_gcc}}{jX_L} - \frac{V_{q\_gcc}}{X_L} \quad (29)$$

where $X_L = j\omega_s L_f$ stands for the grid filter reactance.

Supposing that the passive sign convention is applied, i.e., power flowing toward the converter as positive, then, the power absorbed by the converter from the grid can be achieved from the complex power equation, $P_g + jQ_g = V_{dq} I^*_{dq} = V_d I^*_{dq}$. By solving this equation together with (29), (30) is obtained. According to (30), the ac system active and reactive powers, $P_{ac}$ and $Q_{ac}$, are controlled through q- and d-axis components, $V_{q\_gcc}$ and $V_{d\_gcc}$, of the voltage injected into the ac system by the GCC, respectively.

$$P_{ac} = -\frac{V_d V_{q\_gcc}}{X_L}, \quad Q_{ac} = \frac{V_d}{X_L}(V_d - V_{d\_gcc}) \quad (30)$$

LC-Filter Based GCC

Figure 37:
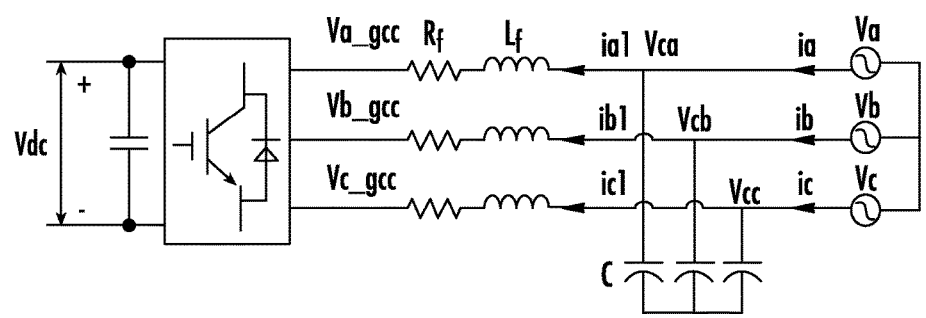
FIG. 37 is a schematic diagram of a three-phase LC-GCC system.

FIG. 37 shows the schematic of a LC-filter GCC system, in which C represents the LC-filter capacitor, $i_{a1,b1,c1}$ represents the three-phase current flowing through the LC-filter inductor and the corresponding current in dq-reference frame are $i_{d1}$ and $i_{q1}$, and other terms are the same as those defined above.

For the LC-filter GCC, the voltage balance equation over the LC-filter inductor is (31) while the current balance equation over the LC-filter capacitor is (32).

$$\begin{bmatrix} v_d \\ v_q \end{bmatrix} = R_f \begin{bmatrix} i_{d1} \\ i_{q1} \end{bmatrix} + L_f \frac{d}{dt} \begin{bmatrix} i_{d1} \\ i_{q1} \end{bmatrix} + \omega_s L_f \begin{bmatrix} -i_{q1} \\ i_{d1} \end{bmatrix} + \begin{bmatrix} v_{d\_gcc} \\ v_{q\_gcc} \end{bmatrix} \quad (31)$$

$$\begin{bmatrix} i_d \\ i_q \end{bmatrix} = \begin{bmatrix} i_{d1} \\ i_{q1} \end{bmatrix} + C \frac{d}{dt} \begin{bmatrix} v_d \\ v_q \end{bmatrix} + C\omega_s \begin{bmatrix} -v_q \\ v_d \end{bmatrix} \quad (32)$$

Using space vectors, (31) and (32) are expressed by complex equations (33) and (34) in which $i_{dq1}$ is the space vector of the instantaneous current through the LC-filter inductor in dq reference reframe.

$$v_{dq} = R_f \cdot i_{dq1} + L_f \frac{d}{dt} i_{dq1} + j\omega_s L_f \cdot i_{dq1} + v_{dq\_gcc} \quad (33)$$

$$i_{dq} = i_{dq1} + C \frac{d}{dt} v_{dq} + j\omega_s C \cdot v_{dq} \quad (34)$$

In the steady-state condition, (33) and (34) becomes (35) and (36), where $I_{dq1}$ stands for the steady-state space vector of the LC-filter inductor current in dq reference reframe.

$$V_{dq} = R_f I_{dq1} + j\omega_s L_f I_{dq1} + V_{dq\_gcc} \quad (35)$$

$$I_{dq} = I_{dq1} + j\omega_s C \cdot V_{dq} \quad (36)$$

In terms of PCC d- and q-axis currents, the instantaneous active and reactive powers transferred from the ac system to the GCC are consistent with (27) and (28). Neglecting resistor $R_f$, the steady state current flowing through the PCC according to (35) and (36) is:

$$I_{dq} = \frac{V_{dq} - V_{dc\_gcc}}{jX_L} + j\frac{V_{dq}}{X_C}$$

$$= -\frac{V_{q\_gcc}}{X_L} + j\left(\frac{V_d}{X_C} - \frac{V_d - V_{d\_gcc}}{X_L}\right) \quad (37)$$

where $X_c = j\omega_s C$. Then, based on the complex power equation:

$$P_{ac} = -\frac{V_d V_{q\_gcc}}{X_L}, \quad Q_{ac} = \frac{V_d(V_d - V_{d\_gcc})}{X_L} - \frac{V_d^2}{X_C} \quad (38)$$

which indicates that the PCC active and reactive powers are similar to those shown by (30) except that the PCC reactive power is a little bit more negative. Therefore, under the same d-axis control voltage, the PCC reactive power is more toward generating, which allows the GCC to be able to generate a little bit more reactive power under the PWM saturation constraint.

LCL-Filter Based GCC

Figure 38:
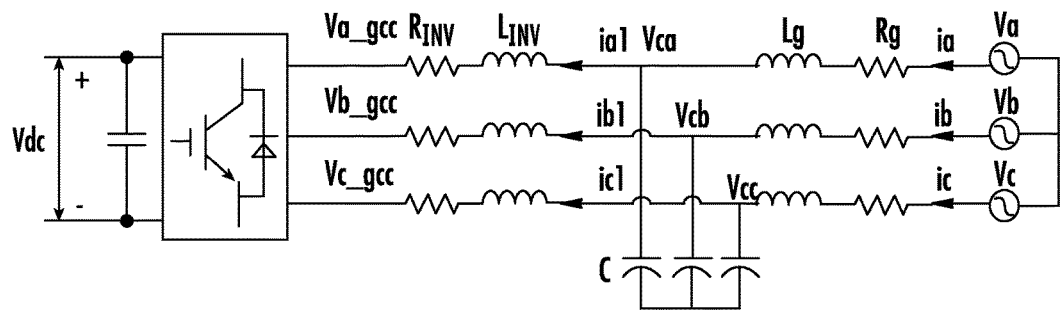
FIG. 38 is a schematic diagram of a three-phase LCL-GCC system.

FIG. 38 shows the schematic of a LCL-filter GCC system, in which $L_{inv}$ and $R_{inv}$ are the inductance and resistance of the inverter-side inductor, $L_g$ and $R_g$ are the inductance and resistance of the grid-side inductor, $v_{ca,cb,cc}$ is the three-phase capacitor voltage and the corresponding voltage in dq-reference frame are $v_{cd}$ and $v_{cq}$, and other terms are the same as those defined above.

For the LCL-filter GCC, the voltage balance across the grid-side inductor is:

$$\begin{bmatrix} v_d \\ v_q \end{bmatrix} = R_g \begin{bmatrix} i_d \\ i_q \end{bmatrix} + L_g \frac{d}{dt} \begin{bmatrix} i_d \\ i_q \end{bmatrix} + \omega_s L_g \begin{bmatrix} -i_q \\ i_d \end{bmatrix} + \begin{bmatrix} v_{cd} \\ v_{cq} \end{bmatrix}. \quad (39)$$

The voltage balance across the inverter-side inductor is:

$$\begin{bmatrix} v_{cd} \\ v_{cq} \end{bmatrix} = R_{inv}\begin{bmatrix} i_{d1} \\ i_{q1} \end{bmatrix} + L_{inv}\frac{d}{dt}\begin{bmatrix} i_{d1} \\ i_{q1} \end{bmatrix} + \omega_s L_{inv}\begin{bmatrix} -i_{q1} \\ i_{d1} \end{bmatrix} + \begin{bmatrix} v_{d\_gcc} \\ v_{q\_gcc} \end{bmatrix}. \quad (40)$$

The current balance across the LCL capacitor is:

$$\begin{bmatrix} i_d \\ i_q \end{bmatrix} = \begin{bmatrix} i_{d1} \\ i_{q1} \end{bmatrix} + C\frac{d}{dt}\begin{bmatrix} v_{cd} \\ v_{cq} \end{bmatrix} + C\omega_s \begin{bmatrix} -v_{cq} \\ v_{cd} \end{bmatrix}. \quad (41)$$

Using space vectors, (39)-(41) are expressed by complex equations (42)-(44), respectively, in which $v_{cdq}$ is the instantaneous space vector of the LCL-filter capacitor voltage in dq reference reframe.

$$v_{dq} = R_g \cdot i_{dq} + L_g \frac{d}{dt} i_{dq} + j\omega_s L_g \cdot i_{dq} + v_{cdq} \quad (42)$$

$$v_{cdq} = R_{inv} \cdot i_{dq1} + L_{inv} \frac{d}{dt} i_{dq1} + j\omega_s L_{inv} \cdot i_{dq1} + v_{dq\_gcc} \quad (43)$$

$$i_{dq} = i_{dq1} + C\frac{d}{dt} v_{cdq} + j\omega_s C \cdot v_{cdq} \quad (44)$$

In the steady-state condition, (42), (43) and (44) becomes (45), (46) and (47), where $V_{cdq}$ stands for the steady-state space vector of the LCL-filter capacitor voltage in dq reference reframe.

$$V_{dq} = R_g \cdot I_{dq} + j\omega_s L_g \cdot I_{dq} + V_{cdq} \quad (45)$$

$$V_{cdq} = R_{inv} \cdot I_{dq1} + j\omega_s L_{inv} \cdot I_{dq1} + V_{dq\_gcc} \quad (46)$$

$$I_{dq} = I_{dq1} + j\omega_s C \cdot V_{cdq} \quad (47)$$

Again, in terms of PCC d- and q-axis currents, the instantaneous active and reactive powers transferred from the ac system to the GCC are consistent with (27) and (28). Neglecting all the resistors, the steady state current flowing through the PCC according to (45) to (47) is:

$$I_{dq} = \frac{X_{inv}}{X_{inv} + X_g}\left(-\frac{V_{q\_gcc}}{X_{inv}} + j\left(\frac{V_d}{X_C} - \frac{V_d - V_{d\_gcc}}{X_{inv}}\right)\right) \quad (48)$$

where $X_{inv} = j\omega_s L_{inv}$ and $X_g = j\omega_s L_g$. Then, based on the complex power equation:

$$P_{ac} = -\frac{V_d V_{q\_gcc}}{X_{inv} + X_g}, \quad (49)$$

$$Q_{ac} = \frac{V_d(V_d - V_{d\_gcc})}{X_{inv} + X_g} - \frac{X_{inv}}{X_{inv} + X_g} \cdot \frac{V_d^2}{X_C}$$

which indicates that the PCC active and reactive powers, similar to L- and LC-filter GCCs, are also controlled by the converter q- and d-axis voltages, respectively.

Design and Analysis of L, LC and LCL Filters

For a nonlinear load, the harmonic analysis is usually focused on how the current harmonics from a nonlinear load can be attenuated through the filtering process. Normally, the input of the filter is the harmonic currents while the output of the filter is the current harmonics injected into the grid. However, for a GCC, the output of the voltage source converter is the voltage generated through the PWM scheme. This GCC output voltage contains the fundamental frequency component and high order harmonic components around $m \cdot f_s$, where $f_s$ is the converter switching frequency and m=1, 2, 3, etc.

To analyze and design a filter, the transfer function of the filter is generally required. Alternatively, a virtual simulation tool such as PSPICE of CADENCE DESIGN SYSTEMS, INC. of San Jose, Calif. can be used to assist the analysis and design of L, LC, and LCL filters for GCCs, which makes it much faster and more convenient to evaluate and compare different filter schemes. The first step for the filter evaluation and design using PSpice is to develop a single-line diagram consisting of the grid, the filter to be studied and a voltage source representing the voltage injected into the grid by the GCC. Assume the grid voltage is sinusoidal and does not contain any harmonics. Then, the grid can be modeled by an equivalent harmonic impedance. The GCC is modeled as a harmonic voltage source. A filter is placed between the grid and the GCC. The second step is to define the ac sweep simulation. The ac sweep simulation will provide a result about how different frequency components of the GCC output voltage are processed by the filter. The final step is to run the simulation and analyze results.

Figure 39:
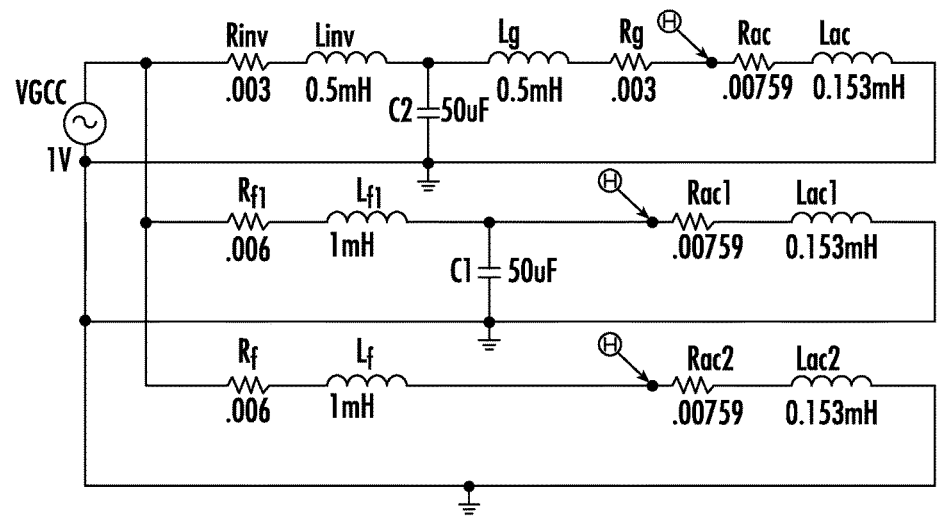
FIG. 39 is a schematic diagram of a GCC incorporating an L-, LC-, or LCL-filter in a PSpice model simulation.
Figure 40:
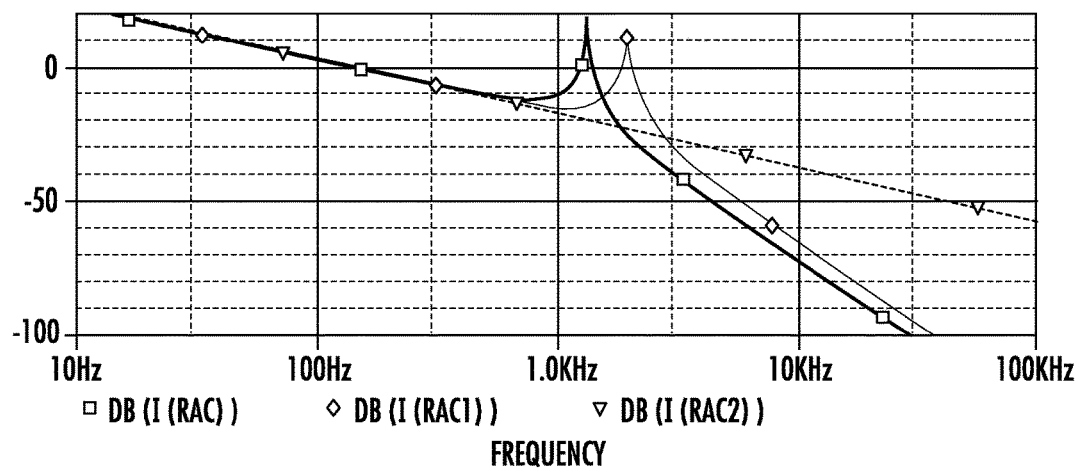
FIG. 40 is a graph illustrating the grid current frequency spectrum corresponding to GCC output voltage for each of the circuits shown in FIG. 39.

For purpose of comparison, all the three filters are drawn in parallel in one circuit schematic and then connected to the same GCC harmonic voltage source as shown by FIG. 39. The capacitors of the LC-filter and LCL-filter are the same. It is also assumed that the inductors of the L-filter and LC-filter are the same, and the inductance of the converter- and the grid-side inductors of the LCL-filter is the same and is one half of the inductance of the L- or LC-filter inductor. FIG. 40 demonstrates the grid current frequency spectrum corresponding to GCC output voltage at different frequencies. As it can be seen, LCL and LC filters are more effective to attenuate the currents going into the grid. For both the LCL and LC filters, however, a critical issue is a high peak value at the resonant frequency, which requires that the converter switching frequency must be selected to be much higher than the resonant frequency (FIG. 40).

The resonant frequency is an important factor in designing the LC- and LCL-filter based GCCs. It was found that the resonant frequency is mainly affected by the inductors and capacitors of LC and LCL filters. In general, under a constant grid-filter inductance, the larger the filter capacitance is, the lower the resonant frequency; under a constant grid-filter capacitance, the larger the filter inductance is, the lower the resonant frequency. Based on the simulation study as shown by FIGS. 39 and 40, an inductor of 1 mH can be chosen for the L and LC filters, a capacitor of 50 uF can be chosen for the LC and LCL filters, and a converter- and grid-side inductor of 0.5 mH can be chosen for the LCL filter. A switching frequency of 4200 Hz for GCCs can also be used.

Direct-Current Vector Control of Grid-Connected Converters

The standard vector control method for the GCC deploys a nested-loop structure consisting of a faster inner current loop and a slower outer loop and, in which the d-axis loop is used for active power or dc-link voltage control, and the q-axis loop is used for reactive power or grid voltage support control.

Direct-Current Vector Control for L-Filter GCCs

Figure 41:
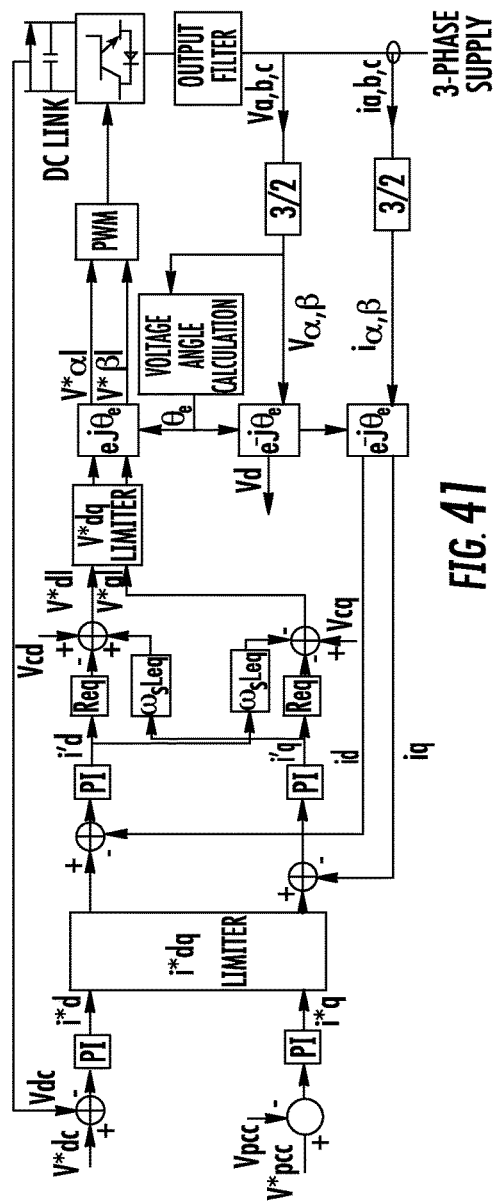
FIG. 41 is a block diagram of an example DCC vector control structure for use with L-, LC-, and LCL-GCCs.

The direct-current vector control (DCC) method for an L-filter GCC has been developed recently. The theoretical foundation is (27) and (28), i.e., the use of d- and q-axis currents directly for active and reactive power control of the GCC system. Unlike the conventional standard vector control approach, the DCC outputs a current signal by the d- or q-axis current-loop controller (FIG. 41). In other words, the output of the controller is a d- or q-axis tuning current I'$_d$ or i'$_q$, while the input error signal tells the controller how much the tuning current should be adjusted during the dynamic control process. The development of the tuning current control strategy has adopted typical intelligent control concepts, e.g., a control goal to minimize the absolute or root-mean-square (RMS) error between the desired and actual d- and q-axis currents through an adaptive tuning strategy. The d- and q-axis tuning current signals i$_d$' and i$_q$' generated by the current-loop controllers must be transferred to d- and q-axis voltage signals to control the GCC. This is due to the fact that a GCC has a voltage source converter structure. The conversion from the current to voltage control signals is obtained from (25) which is rearranged as:

$$v_{dq\_gcc} = v_{dq} - R_f \cdot i'_{dq} - L_f \frac{d}{dt} i'_{dq} - j\omega_s L_f \cdot i_{dq}. \qquad (50)$$

Applying a low-pass filtering to $v_{dq\_gcc}$ to remove the high frequency oscillation components of d- and q-axis voltages from being applied directly to the converter, the d- and q-axis control voltages are shown by:

$$v_{d\_gcc} = -R_f i'_d + \omega_s L_f i'_q + v_d \qquad (51)$$

$$v_{q\_gcc} = -R_f i'_q - \omega_s L_f i'_d \qquad (52)$$

FIG. 41 shows an example DCC vector control structure for uses. For the L-filter based GCC, $R_{eq}=R_f$, $L_{eq}=L_f$, $v_{cd}=v_d$, $v_{cq}=0$ according to (51) and (52). The example DCC vector control structure can include a GCC operably coupled between an electrical grid and an energy source, a n-order grid filter (e.g., where n is an integer greater than or equal to 2) operably coupled between the electrical grid and the GCC, and a nested-loop controller. The GCC can optionally be a PWM controller. The energy source can optionally be a solar cell or array, a battery, a fuel cell, a wind turbine generator, a micro-turbine generator, a STATCOM, or a high-voltage DC transmission system. Additionally, the electrical grid can optionally be a three-phase power system. The n-order grid filter can be a first-order (L-filter), second-order (LC-filter), or third-order (LCL-filter) filter. It should be understood that the n-order grid filter can be a filter of another order. The nested loop controller can have inner and outer control loops and can be operably coupled to the GCC. Optionally, the inner and outer control loops can include at least one proportional-integral ("PI") controller as shown in FIG. 41. A d-axis loop can control real power, and a q-axis loop can control reactive power. Additionally, the nested-loop controller can be configured to determine dq-current error signals, adjust dq-tuning currents (e.g., I'$_d$ and I'$_q$) based on the dq-current error signals, and convert the dq-tuning currents to dq-control voltages (e.g., V$_{cd}$, V$_{cq}$) for controlling the GCC. The dq-current error signals can be differences between d-axis and q-axis currents (i$_d$ and i$_q$) and d-axis and q-axis reference currents (i*$_d$ and i*$_q$), respectively. In addition, the conversion can account for resonant circuit dynamics of the n-order grid filter.

Optionally, converting the dq-tuning currents to the dq-control voltages can include balancing dq-currents and voltages across the n-order grid filter as described herein. Alternatively or additionally, the system does not include a passive or active damping control structure.

Direct-Current Vector Control for LC-Filter GCCs

The DCC for a LC-filter GCC is obtained based upon (27) and (28) too. Similar to the L-filter GCC, the output of the DCC controller is a d- or q-axis tuning current I'$_d$ or i'$_q$, while the input error signal tells the controller how much the tuning current should be adjusted during the dynamic control process. To convert the tuning current signals to voltage control signals, (33) and (34) can be rearranged in terms of the DCC tuning current i'$_{dq}$ as:

$$v_{dq\_gcc} = v_{dq} - R_f \cdot i_{dq1} - L_f \frac{d}{dt} i_{dq1} - j\omega_s L_f \cdot i_{dq1} \qquad (53)$$

$$i_{dq1} = i'_{dq} - C \frac{d}{dt} v_{dq} - j\omega_s C \cdot v_{dq}. \qquad (54)$$

Combining (53) and (54) and applying a low-pass filtering to $v_{dq\_gcc}$ to remove the high frequency oscillation components, the d- and q-axis control voltages are shown by:

$$V_{d\_gcc} = -R_f i'_d + \omega_s L_f i'_q + v_d(1-\omega_s^2 L_f C) \qquad (55)$$

$$v_{q\_gcc} = -R_f i'_q - \omega_s L_f i'_d + v_d \cdot R_f \omega_s C \qquad (56)$$

Thus, in terms of FIG. 41 for the LC-filter based GCC, $R_{eq}=R_f$, $L_{eq}=L_f$, $v_{cd}=v_d(1-\omega_s^2 L_f C)$, and $V_{cq}=v_d \cdot \omega_s C$ according to (55) and (56).

Direct-current vector control for LCL-filter GCCs

The DCC for a LCL-filter GCC is based on. (27) and (28). Similar to the L- and LC-filter GCCs, the DCC controller outputs a d- or q-axis tuning current i'$_d$ or i'$_q$. This tuning current is converted to voltage control signals based upon. (42) to (44). Rearranging (42) to (44) in terms of the DCC tuning current i'$_{dq}$:

$$v_{dq\_gcc} = v_{cdq} - R_{inv} \cdot i_{dq1} - L_{inv} \frac{d}{dt} i_{dq1} - j\omega_s L_{inv} \cdot i_{dq1} \qquad (57)$$

$$v_{cdq} = v_{dq} - R_g \cdot i'_{dq} - L_g \frac{d}{dt} i'_{dq} - j\omega_s L_g \cdot i'_{dq} \qquad (58)$$

$$i_{dq1} = i'_{dq} - C \frac{d}{dt} v_{cdq} - j\omega_s C \cdot v_{cdq}. \qquad (59)$$

Combining (53) and (54) and applying a low-pass filtering to $v_{dq\_gcc}$, the d- and q-axis control voltages are shown by:

$$V_{d\_gcc} = -R_{eq} i'_d + \omega_s L_{eq} i'_q + v_d(1-\omega_s^2 L_{inv} C) \qquad (60)$$

$$v_{q\_gcc} = -R_{eq} i'_q - \omega_s L_{eq} i'_d + v_d \cdot R_{inv} \omega_s C \qquad (61)$$

where $R_{eq}=R_g+R_{inv}-R_{inv}\omega_s^2 CL_g-R_g\omega_s^2 CL_{inv}$ and $L_{eq}=L_g+L_{inv}+R_{inv}R_g C-\omega_s^2 L_{inv} CL_g$. In terms of FIG. 41 for the LCL-filter based GCC, $R_{eq}$ and $L_{eq}$ are the same as defined above, $v_{cd}=V_d(1-\omega_s^2 L_{inv} C)$, and $v_{cq}=V_d \cdot R_f \omega_s C$ according to (60) and (61).

Control of GCC under physical constraints

Alternatively or additionally, adjusting the dq-tuning currents can optionally include minimizing a root-mean-square ("RMS") error of the dq-current error signals using an adaptive control strategy. In practice, a GCC cannot operate beyond the rated power and PWM saturation of the converter. To handle GCC operation under such conditions, the GCC can be controlled by maintaining the effectiveness of the active power control as the first priority while meeting the reactive power control demand as much as possible. For example, the adaptive control strategy can include prioritizing real power control while meeting reactive power demand as much as possible. This is expressed as:

Minimize $|Q_{ac} - Q_{ac}^*|$

Subject to: $\begin{cases} P_{ac} = P_{ac}^* \\ \sqrt{i_d^2 + i_q^2} \le I_{rated}, \quad \sqrt{\dfrac{v_{d1}^2 + v_{q1}^2}{3}} \le \dfrac{V_{dc}}{2\sqrt{2}} \end{cases}$.

The control requirement is implemented in the following way. To prevent the converter from exceeding the rated current, (62) is employed if the amplitude of the reference current generated by the outer control loop exceeds the rated current limit. According (27) and (28), this represents a strategy of keeping the d-axis current reference $i_d^*$ unchanged so as to maintain active power or dc-link voltage control effectiveness while modifying the q-axis current reference $i_q^*$ to satisfy the reactive power or ac system bus voltage control demand as much as possible. In other words, if an amplitude of either of the dq-reference currents exceeds a rated current of the GCC, the d-axis reference current is maintained and the q-axis reference current is adjusted. If $|v_{dq\_gcc}|$ generated by the current control loops exceeds the PWM saturation limit, $v^*_{d\_gcc}$ and $v^*_{q\_gcc}$ are modified by (63). According to (30), (38) and (49) for L, LC and LCL filter GCCs, respectively, this represents a strategy of keeping the q-axis voltage reference $v^*_{q\_gcc}$ unchanged so as to maintain the dc-link voltage or active power control effectiveness while modifying the d-axis voltage reference $V^*_{d\_gcc}$ to meet the reactive power control demand as much as possible. In other words, if an absolute value of either of the dq-control voltages exceeds a saturation limit of the GCC, a d-axis control voltage is adjusted and a q-axis control voltage is maintained.

$$i^*_{d\_new} = i^*_d \quad (62)$$
$$i^*_{q\_new} = \text{sign}(i^*_q) \cdot \sqrt{(i^*_{dq\_max})^2 - (i^*_d)^2}$$

$$v^*_{d\_gcc\_new} = \text{sign}(v^*_{d\_gcc}) \cdot \sqrt{(v^*_{dc\_gcc\_max})^2 - (v^*_{q\_gcc})^2} \quad (63)$$
$$v^*_{q\_gcc\_new} = v^*_{q\_gcc}$$

Performance Evaluation

Figure 42:
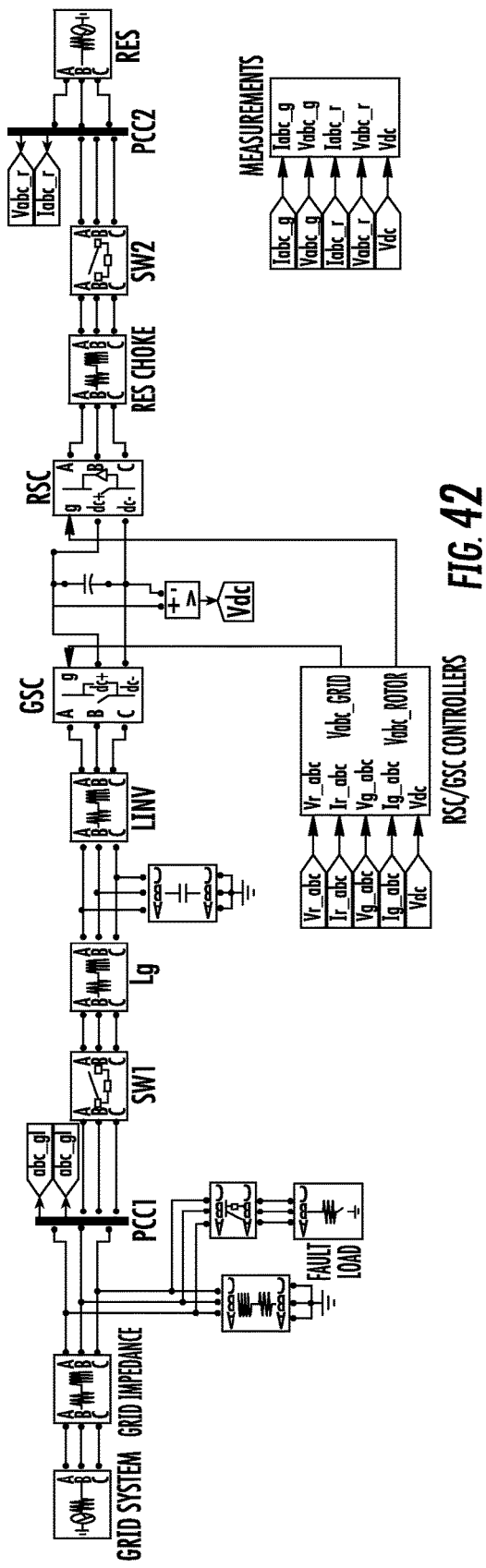
FIG. 42 is a schematic diagram of an example three-phase ac/dc/ac converter system with an LCL-filter between the GCC and the electrical grid.
Figure 43B:
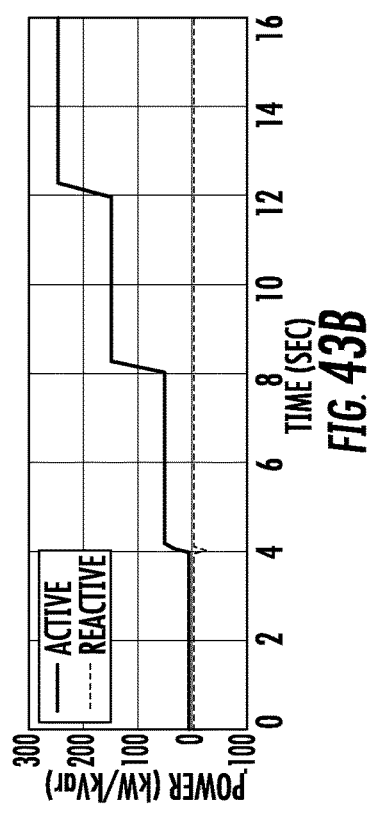
FIGS. 43(a)-43(d) are graphs illustrating DCC performance for the three-phase L-GCC system.
Figure 43D:
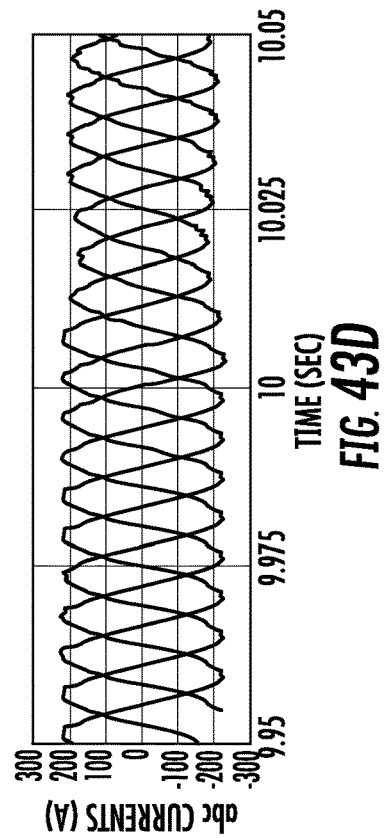
Figure 43A:
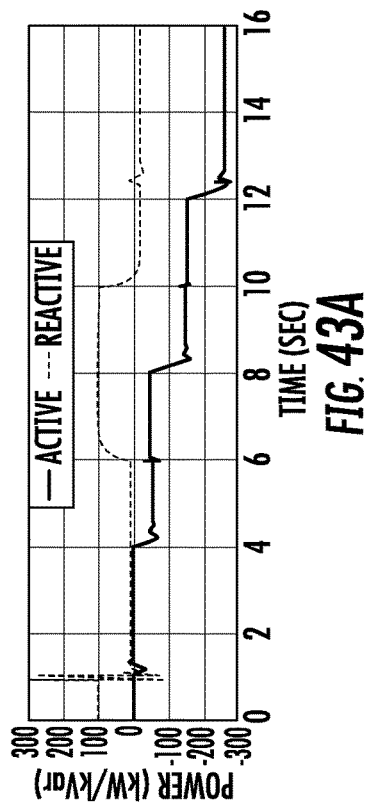
Figure 43C:
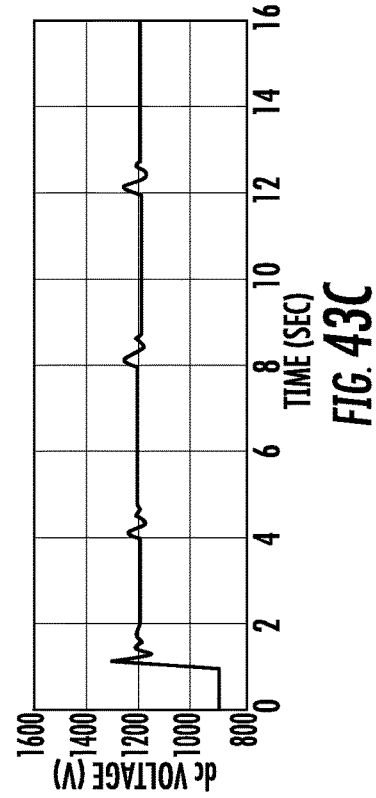
Figure 44A:
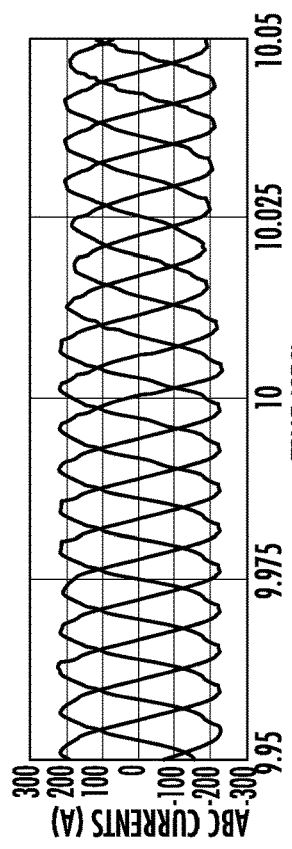
FIGS. 44(a)-44(d) are graphs illustrating DCC performance for the three-phase LC-GCC and LCL-GCC systems.
Figure 44B:
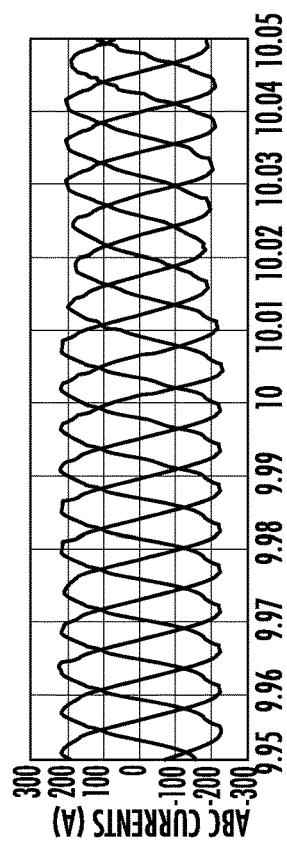
Figure 44C:
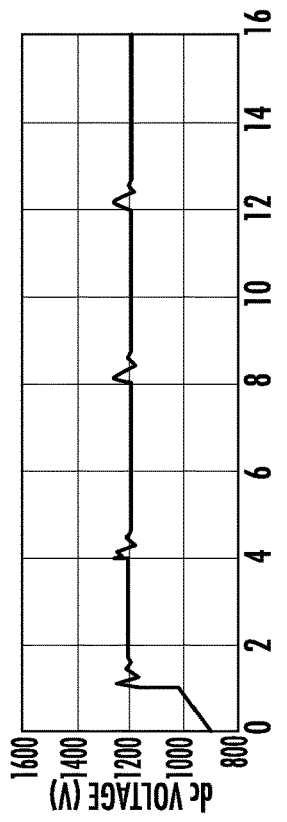
Figure 44D:
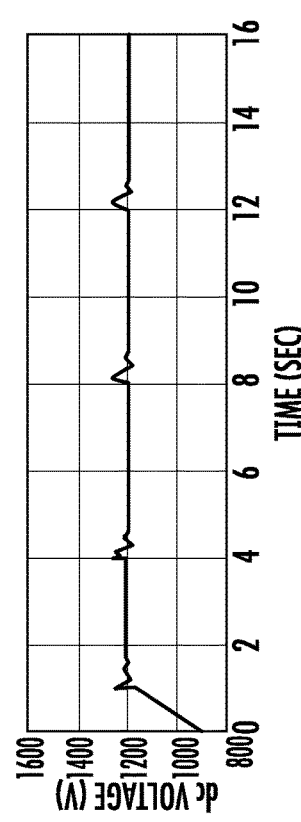

To assess and compare the performance of the direct-current vector control approach for GCCs with L, LC and LCL filters, current- and voltage-loop controllers are designed and evaluated for a three-phase ac/dc/ac converter that is normally used in DFIG and PMSG wind turbines. FIG. 42 shows the ac/dc/ac converter built by using the SIMPOWER SYSTEMS of MATLAB of MATHWORKS, INC. of Natick, Mass. and RT-Lab real-time simulation system. The ac/dc/ac converter system data include 1) a reference voltage of 1200V for the dc link, 2) a three-phase 60 Hz, 690V voltage source on the left signifying the grid, 3) a three-phase grid-side converter (GSC) (also referred to herein as a GCC), 4) an LCL filter with the filter parameters described below, 5) a three-phase ac voltage source on the right side representing a renewable energy source (RES), such as the PMSG stator or DFIG rotor circuit, and 6) a three-phase renewable-side converter (RSC) used to control the active and reactive power transferred between the RES and RSC. The switching frequency for both GCC and RSC is 4200 Hz. It should be understood that the system can optionally include an L- or LC-filter instead of an LCL-filter.

Active and Reactive Power Controls

FIG. 43 demonstrates the performance of the DCC when an L filter is used with the GCC. The initial dc-link voltage was 900V at the start of the simulation. After the SW1 was closed at t=1 sec, and the DCC controller quickly maintained the dc-link capacitor voltage at the reference value of 1200V. The PCC$_2$ reactive power reference was zero all the time. At t=4 sec, the SW2 was closed with an active power of 50 kW generated by the RES (FIG. 43b), which caused the dc-link voltage to increase. However, with the DCC, the dc-link voltage was rapidly adjusted around the reference value. The active power at PCC$_1$ was negative (FIG. 43a), indicating that the power transferred from the GCC to the ac system. The PCC$_1$ reactive power reference was zero. At t=6 sec when the PCC$_1$ reactive power reference changed from 0 kVar to absorbing 100 kVar, the controller adjusted the PCC$_1$ reactive power to the reference value (FIG. 43a) while the dc-link voltage was not affected by the reactive power variation. At t=8 sec, the active power of the RES changed from generating 50 kW to generating 150 kW, causing the dc-link voltage to increase. With the DCC, the dc-link voltage was rapidly adjusted around the reference value. The active power flowed from the RES to the RSC (positive in FIG. 43b) and flowed from the GCC to the ac system (negative in FIG. 43a), while the reactive power was maintained at the reference value. For any other condition changes at t=10 sec and t=12 sec, the dc-link voltage was maintained at 1200V and the active and reactive powers were adjusted to the reference values effectively. Typical current waveform at PCC$_1$ is shown by FIG. 43d.

FIG. 44 demonstrates the performance of the DCC when an LC or LCL filter is used with the GCC for the same conditions used in FIG. 43. Similar to FIG. 43, the DCC showed a good performance in meeting various control requirements for both LC- and LCL-filter based GCCs. Compared to FIG. 43d, however, the harmonic current distortion was significantly reduced, especially for the LCL-filter based GCC. The study demonstrates that the DCC control strategy can be successfully used to control LC and LCL GCCs to improve power quality of inverter interfaced distributed energy sources.

Performance Evaluation for Grid Voltage Support Control

The ac system voltage support control also was evaluated for the GCC with an L, LC or LCL filter using the DCC. The control objective is to maintain the PCC$_1$ voltage at the nominal value for any voltage fluctuation caused by a load change or for any voltage sag caused by a fault. The extent of the voltage drop depends on the location and type of the load or fault in the ac transmission system. For the voltage control application, the q-axis current reference, according to FIG. 41, is determined from the error signal between the desired and actual PCC voltage to be controlled. Therefore, the alteration of the current reference $i_q^*$ may cause more stability problems to the ac/dc/ac converter system.

FIG. 45 compares the DCC performance for the GCC with an L, LC or LCL filter under PCC voltage support control condition. The active power transferred from RES to the ac system is the same as that used in FIG. 43. A moderate voltage drop on the PCC$_1$ bus, caused by a fault, started at t=6 sec and ended at t=10 sec. As shown by FIG. 45, shortly after the start of the system, the DCC successfully maintained the PCC voltage at 1 per unit and at the same time fulfilled the active power control requirement for all the three filtering schemes. During the voltage drop period, the reactive power needed to support the PCC voltage exceeds the PWM saturation limit. Therefore, the DCC for L-, LC-, and LCL-filter GCCs operated by maintaining the active power control while minimizing the difference between the actual and desired PCC voltage as much as possible (FIGS. 45a, 45c, and 45e). When the output voltage of the controller reduced below the PWM saturation limit at t=10 s after the fault was cleared, the controller re-established its normal operation by regulating both the active power and PCC voltage to the target target values. From various aspects, the DCC control method described herein shows a great performance for L-, LC-, and LCL-filter GCCs.

Hardware Validation

A hardware laboratory test system of a STATCOM system is built to validate the DCC vector controller for three-phase L-, LC-, and LCL-filter GCCs. In particular, 1) An ac/dc converter (GCC) is connected to an adjustable LabVolt three-phase power supply signifying the grid. 2) A LCL filter is built by using six LabVolt smoothing inductors and a three-phase LabVolt capacitor. 3) The ac/dc converter is controlled by a dSPACE digital control system. 4) The control system collects the dc-link voltage and three-phase currents and voltages at the PCC, and sends out control signals to the converter according to various control demands.

Figure 46A:
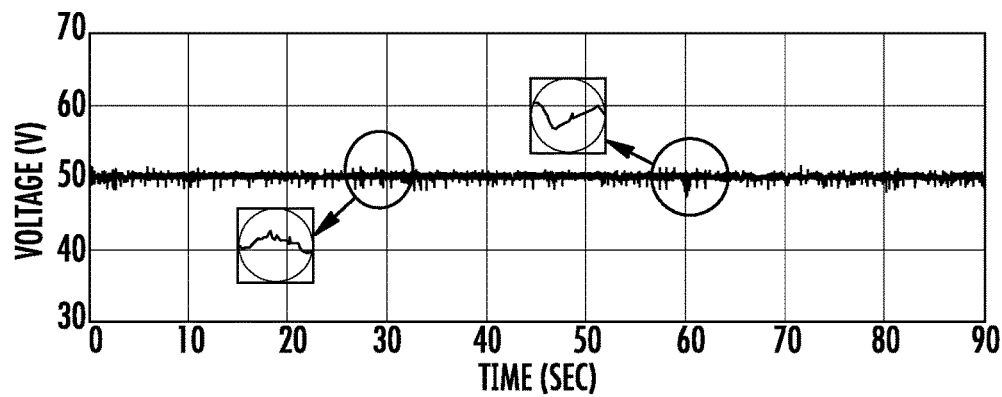
FIGS. 46(a)-46(c) are graphs illustrating results of the hardware testing with a three-phase LCL-GCC system, i.e., DC-link voltage (FIG. 46(a)), PCC d-axis current waveform (FIG. 46(b)), and PCC q-axis current waveform (FIG. 46(c)).
Figure 46B:
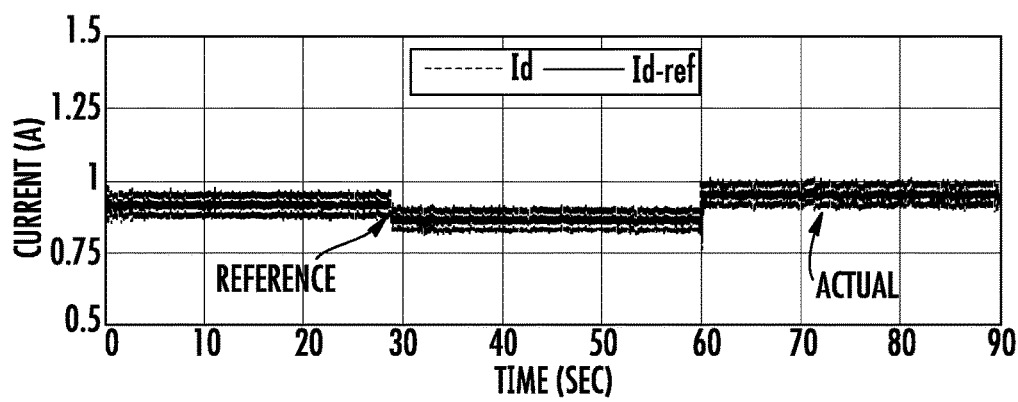
Figure 46C:
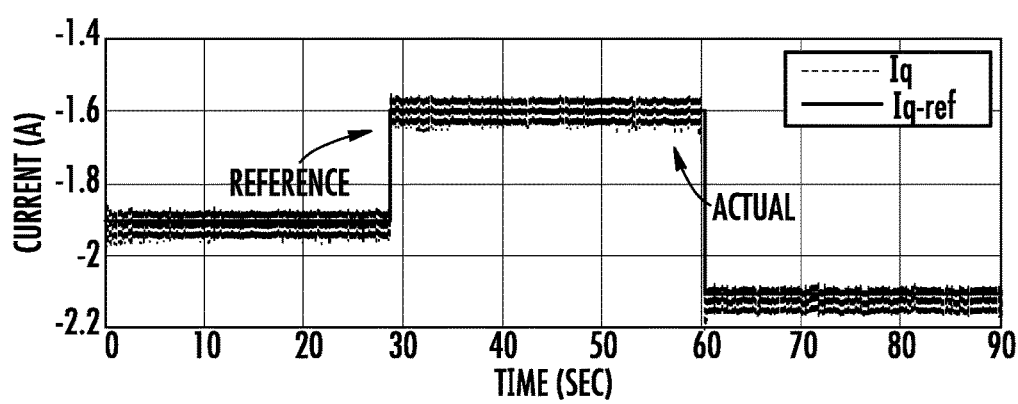

FIG. 46 illustrates partial result of the DCC vector control for a LCL-filter-based laboratory STATCOM. The control purpose of the STATCOM is to 1) maintain the dc capacitor voltage constant through the adjustment of d-axis current and 2) control the PCC reactive power by regulating q-axis current. The initial q-axis current reference is −1.9 A. Around 30 sec, the q-axis current reference changes from −1.9 A to −1.6 A, causing a reduction of the PCC current amplitude and a reduction of the loss of the LCL filter. Therefore, the dc capacitor voltage starts to increase. However, the DCC vector controller automatically reduces the d-axis current, causing the dc capacitor voltage returning to its reference value. Around 60 sec, the q-axis current reference changes from −1.6 A to −2.1 A, causing an increase of the PCC current amplitude and an increase of the loss of the LCL filter. Hence, the dc capacitor voltage drops. Again, the DCC vector controller increases the d-axis current and quickly regulates the dc capacitor voltage to its reference value. In general, the DCC vector control approach demonstrates a good performance for the laboratory STATCOM with the three different filtering schemes.

A three-phase grid-connected converter is normally used in renewable and electric power system applications. With the increased harmonic concerns, a GCC with a LC or LCL filter has drawn strong attention. As described herein, power control characteristics of a GCC with L, LC and LCL filtering schemes are explored. For all the three filtering schemes, it has been shown that in terms of current, the active and reactive powers are controlled by d- and q-axis currents, respectively, while in terms of voltage, the active and reactive powers are controlled by q- and d-axis voltage, respectively. Then, a direct current vector control method is developed for a GCC with an L, LC or LCL filter. The DCC control method has adopted typical intelligent control principles, i.e., a control goal of minimizing absolute or root-mean-square error between the desired and actual d- and q-axis currents through an adaptive tuning strategy. A control strategy is described, based on the direct-current vector control configuration, to handle the vector control under GCC rated power and PWM saturation constraints.

Both simulation and hardware tests were conducted to evaluate the performance of the DCC vector control method described herein. It has been shown that that for the control method described, if the controller output voltage is within the PWM saturation limit, the common GCC control requirements can be met effectively; if the controller output voltage exceeds the PWM saturation limit, the approach described herein operates the GCC properly in a way by assuring the dc-link voltage control as the first priority while providing reactive power or PCC voltage support control as much as possible. Under the system disturbance conditions, the described method is stable and reliable.

Single-Phase GCC Model in d-q Reference Frame with L, LC and LCL Filters

L-Filter Based Single-Phase GCC

Figure 47:
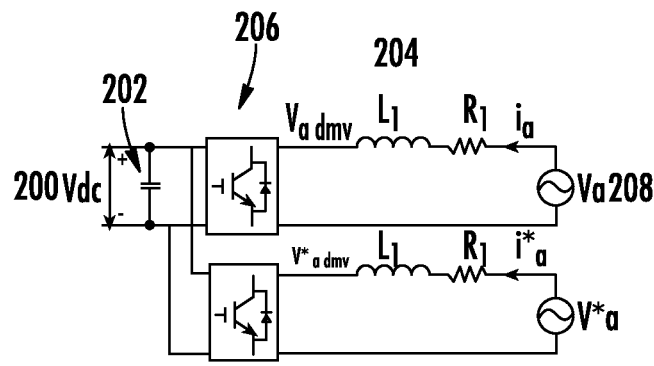
FIGS. 47-49 are diagrams of single-phase GCCs incorporating L-filer (FIG. 47), LC-filter (FIG. 48), and LCL-filter (FIG. 49), respectively.
Figure 48:
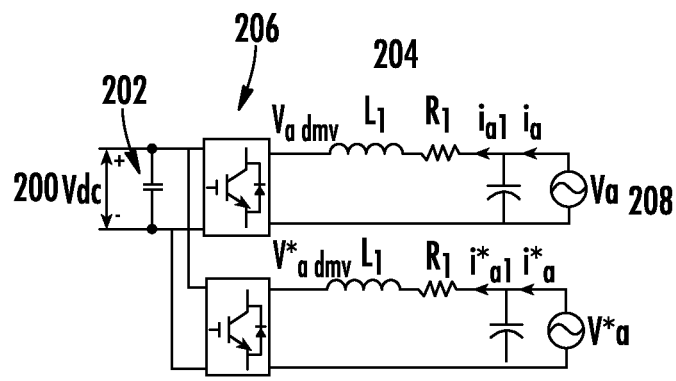
Figure 49:
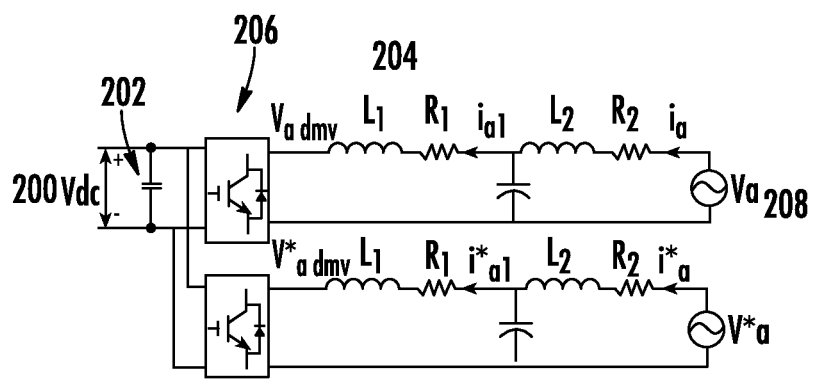

Referring now to FIGS. 47-49, diagrams of single-phase GCCs are described. The "real circuit" is shown in the top-half of the figures, and the "imaginary circuit" is shown in the bottom-half of the figures. In FIGS. 47-49, an energy source 200, a dc-link capacitor 202, an output filter 204 (e.g., n-order grid filter), GCC 206, and a single-phase voltage source 208 (e.g., energy grid), representing the voltage at the Point of Common Coupling (PCC) of the ac system, are shown. The output filter is used to reduce the harmonics to the utility grid. Three basic types of filters include: L filter (FIG. 47), LC filter (FIG. 48) and LCL filter (FIG. 49).

Imaginary Circuit

To implement d-q vector control, an imaginary orthogonal circuit is generated/created based on the real circuit of the GCC. The imaginary circuit can be generated/created using a differentiation technique (e.g., computing derivatives) or a delay technique. Using the delay technique, the ac voltage or current of the imaginary circuit should have exactly the same amplitude as that of the real circuit but −90° phase shift. The imaginary circuit can be generated/created using a computing device, for example.

In FIG. 47, $L_f$ and $R_f$ are the inductance and resistance of the grid filter, $v_{a\_inv}$ stands for the GCC output voltage in the single-phase ac system. To implement the d-q vector control, an imaginary orthogonal circuit (e.g., the lower half of FIG. 47) needs to be created based on the real circuit of the GCC. The imaginary circuit should have exactly the same amplitude as the real circuit but −90° phase shift. The real and imaginary circuits constitute the α-β frame of the single-phase GCC system, which can be transferred into the d-q frame through:

$$T_{\alpha\beta\_dq} = \begin{bmatrix} \cos(\omega t) & \sin(\omega t) \\ -\sin(\omega t) & \cos(\omega t) \end{bmatrix}. \tag{64}$$

Using the motor sign convention, the voltage balance across the L filter in the d-q reference frame is:

$$\begin{bmatrix} v_d \\ v_q \end{bmatrix} = R_f \begin{bmatrix} i_d \\ i_q \end{bmatrix} + L_f \frac{d}{dt}\begin{bmatrix} i_d \\ i_q \end{bmatrix} + \omega_s L_f \begin{bmatrix} -i_q \\ i_d \end{bmatrix} + \begin{bmatrix} v_{d\_inv} \\ v_{q\_inv} \end{bmatrix} \tag{65}$$

where $\omega_s$ is the angular frequency of the grid voltage. In terms of space vectors, (65) is expressed by a complex equation (66) in which $v_{dq}$, $i_{dq}$, and $v_{dq\_inv}$ are instantaneous space vectors of the single-phase PCC voltage, grid current, and inverter output voltage in d-q reference frame.

$$v_{dq} = R_f \cdot i_{dq} + L_f \frac{d}{dt} i_{dq} + j\omega_s L_f \cdot i_{dq} + v_{dq\_inv} \tag{66}$$

In the steady-state condition, (66) becomes (67), where $V_{dq}$, $I_{dq}$ and $V_{dq\_inv}$ stand for the steady-state space vectors of PCC voltage, grid current, and converter output voltage in d-q frame.

$$V_{dq} = R_f I_{dq} + j\omega L_f I_{dq} + V_{dq\_inv} \tag{67}$$

Using the PCC voltage orientation, the PCC d-axis voltage is constant and q-axis voltage is zero. Thus, the instantaneous active and reactive powers transferred from the ac system to the GCC are proportional to d- and q-axis currents, respectively, as shown by (68) and (69).

$$p(t) = (v_d i_d + v_q i_q)/2 = v_d i_d/2 \tag{68}$$

$$q(t) = (v_d i_q - v_q i_d)/2 = v_d i_q/2 \tag{69}$$

In terms of the steady state condition, $V_{dq} = V_d + j0$ since the d-axis of the reference frame is aligned along the PCC voltage position. Assuming $V_{dq\_inv} = V_{d\_inv} + jV_{q\_inv}$ and neglecting resistor $R_f$, then, the current flowing between the ac system and the GCC according to (67) is $$I_{dq} = \frac{V_{dq} - V_{dq\_inv}}{jX_f} = \frac{V_d - V_{d\_inv}}{jX_f} - \frac{V_{q\_inv}}{X_f} \tag{70}$$

where $X_f = j\omega_s L_f$ stands for the grid filter reactance.

Since the passive sign convention is applied, the power absorbed by the inverter from the grid can be achieved from the complex power equation, $P_{ac} + jQ_{ac} = V_{dq} I^*_{dq}/2 = V_d I^*_{dq}/2$. By solving this equation together with (70), (71) is obtained. According to (71), the ac system active and reactive powers, $P_{ac}$ and $Q_{ac}$, are controlled through q- and d-axis components, $V_{q\_inv}$ and $V_{d\_inv}$, of the voltage injected into the ac system by the GCC, respectively.

$$P_{ac} = -\frac{V_d V_{d\_inv}}{2X_f}, Q_{ac} = \frac{V_d(V_d - V_{d\_inv})}{2X_f} \tag{71}$$

LC-Filter Based Single-Phase GCC

FIG. 48 shows the real and imaginary circuits of a single-phase LC-filter GCC system, in which C represents the LC-filter capacitor, $i_{a1}$ represents the current flowing through the LC-filter inductor and the corresponding current in the d-q reference frame are $i_{d1}$ and $i_{q1}$, and other terms are the same as those defined above.

For the LC-filter GCC, the voltage balance equation over the LC-filter inductor is (72) while the current balance equation over the capacitor is (73).

$$\begin{bmatrix} v_d \\ v_q \end{bmatrix} = R_f \begin{bmatrix} i_{d1} \\ i_{q1} \end{bmatrix} + L_f \frac{d}{dt} \begin{bmatrix} i_{d1} \\ i_{q1} \end{bmatrix} + \omega_s L_f \begin{bmatrix} -i_{q1} \\ i_{d1} \end{bmatrix} + \begin{bmatrix} v_{d\_inv} \\ v_{q\_inv} \end{bmatrix} \tag{72}$$

$$\begin{bmatrix} i_d \\ i_q \end{bmatrix} = \begin{bmatrix} i_{d1} \\ i_{q1} \end{bmatrix} + C\frac{d}{dt}\begin{bmatrix} v_d \\ v_q \end{bmatrix} + C\omega_s \begin{bmatrix} -v_q \\ v_d \end{bmatrix} \tag{73}$$

Using space vectors, (72) and (73) are expressed by complex equations (74) and (75) in which $i_{dq1}$ is the instantaneous current through the LC-filter inductor in d-q reference frame.

$$v_{dq} = R_f \cdot i_{dq1} + L_f \frac{d}{dt} i_{dq1} + j\omega_s L_f \cdot i_{dq1} + v_{dq\_inv} \tag{74}$$

$$i_{dq} = i_{dq1} + C\frac{d}{dt} v_{dq} + j\omega_s C \cdot v_{dq} \tag{75}$$

In the steady-state condition, (74) and (75) becomes (76) and (77), where $I_{dq1}$ stands for the steady-state current of the LC-filter inductor in d-q reference frame.

$$V_{dq} = R_f I_{dq1} + j\omega_s L_f I_{dq1} + V_{dq\_inv} \tag{76}$$

$$I_{dq} = I_{dq1} + j\omega_s C \cdot V_{dq} \tag{77}$$

In terms of PCC d- and q-axis currents, the instantaneous active and reactive powers transferred from the ac system to the GCC are consistent with. (68) and (69). Neglecting resistor $R_f$, the steady state current flowing through the PCC according to (76) and (77) is:

$$I_{dq} = -\frac{V_{q\_inv}}{X_f} + j\left(\frac{V_d}{X_C} - \frac{V_d - V_{d\_inv}}{X_f}\right) \tag{78}$$

where $X_C = j\omega_s C$. Then, based on the complex power equation:

$$P_{ac} = -\frac{V_d V_{q\_inv}}{2X_f}, Q_{ac} = \frac{V_d(V_d - V_{d\_inv})}{2X_f} - \frac{V_d^2}{2X_C} \tag{79}$$

which indicates that the PCC active and reactive powers are similar to those shown by. (71) except that the PCC reactive power is a little bit more negative. In other words, under the same d-axis control voltage, the PCC reactive power is more toward generating.

LCL Filter Based Single-Phase GCC

FIG. 49 shows the real and imaginary circuits of a single-phase LCL-filter GCC system, in which $L_{inv}$ and $R_{inv}$ are the inductance and resistance of the inverter-side inductor, $L_g$ and $R_g$ are the inductance and resistance of the grid-side inductor, $v_{ca}$ is the capacitor voltage and the corresponding voltage in the d-q reference frame are $v_{cd}$ and $v_{cq}$, and other terms are the same as those described above.

For the LCL-filter GCC, the voltage balance across the grid-side inductor is:

$$\begin{bmatrix} v_d \\ v_q \end{bmatrix} = R_g \begin{bmatrix} i_d \\ i_q \end{bmatrix} + L_g \frac{d}{dt}\begin{bmatrix} i_d \\ i_q \end{bmatrix} + \omega_s L_g \begin{bmatrix} -i_q \\ i_d \end{bmatrix} + \begin{bmatrix} v_{cd} \\ v_{cq} \end{bmatrix}. \tag{80}$$

The voltage balance across the inverter-side inductor is:

$$\begin{bmatrix} v_{cd} \\ v_{cq} \end{bmatrix} = R_{inv} \begin{bmatrix} i_{d1} \\ i_{q1} \end{bmatrix} + L_{inv}\frac{d}{dt}\begin{bmatrix} i_{d1} \\ i_{q1} \end{bmatrix} + \omega_s L_{inv}\begin{bmatrix} -i_{q1} \\ i_{d1} \end{bmatrix} + \begin{bmatrix} v_{d\_inv} \\ v_{q\_inv} \end{bmatrix}. \tag{81}$$

The current balance across the LCL capacitor is:

$$\begin{bmatrix} i_d \\ i_q \end{bmatrix} = \begin{bmatrix} i_{d1} \\ i_{q1} \end{bmatrix} + C\frac{d}{dt}\begin{bmatrix} v_{cd} \\ v_{cq} \end{bmatrix} + C\omega_s \begin{bmatrix} -v_{cq} \\ v_{cd} \end{bmatrix}. \tag{82}$$

Using space vectors, (80)-(82) are expressed by complex equations (83)-(85), respectively, in which $v_{cdq}$ is the instantaneous LCL capacitor voltage.

$$v_{dq} = R_g \cdot i_{dq} + L_g \frac{d}{dt} i_{dq} + j\omega_s L_g \cdot i_{dq} + v_{cdq} \quad (83)$$

$$v_{cdq} = R_{inv} \cdot i_{dq1} + L_{inv} \frac{d}{dt} i_{dq1} + j\omega_s L_{inv} \cdot i_{dq1} + v_{dq\_inv} \quad (84)$$

$$i_{dq} = i_{dq1} + C \frac{d}{dt} v_{cdq} + j\omega_s C \cdot v_{cdq} \quad (85)$$

In the steady-state condition, (83)-(85), respectively, becomes (86)-(88), respectively, where $V_{cdq}$ stands for the steady-state LCL capacitor voltage in d-q reference frame.

$$V_{dq} = R_g \cdot I_{dq} + j\omega_s L_g \cdot I_{dq} + V_{cdq} \quad (86)$$

$$V_{cdq} = R_{inv} \cdot I_{dq1} + j\omega_s L_{inv} \cdot I_{dq1} + V_{dq\_inv} \quad (87)$$

$$I_{dq} = I_{dq1} + j\omega_s C \cdot V_{cdq} \quad (88)$$

Again, in terms of PCC d- and q-axis currents, the instantaneous active and reactive powers transferred from the ac system to the GCC are consistent with. (68) and (69). Neglecting all the resistors, the steady state current flowing through the PCC according to (86)-(88) is:

$$I_{dq} = \frac{X_{inv}}{X_{inv} + X_g} \left( -\frac{V_{q\_inv}}{X_{inv}} + j\left(\frac{V_d}{X_C} - \frac{V_d - V_{d\_inv}}{X_{inv}}\right)\right) \quad (89)$$

where $X_{inv} = j\omega L_{inv}$ and $X_g = j\omega_s L_g$. Then, based on the complex power equation, (90) is:

$$P_{ac} = -\frac{V_d V_{q\_inv}}{2(X_{inv} + X_g)}, \quad (90)$$

$$Q_{ac} = \frac{V_d(V_d - V_{d\_inv})}{2(X_{inv} + X_g)} - \frac{X_{inv}}{X_{inv} + X_g} \cdot \frac{V_d^2}{2X_C}$$

which indicates that the PCC active and reactive powers, similar to L- and LC-filter GCCs, are also controlled by the converter q- and d-axis voltages, respectively.

Direct-Current Vector Control of Single-Phase Grid-Connected Inverters

DCC for Single-Phase L-Filter GCCs

Figure 50:
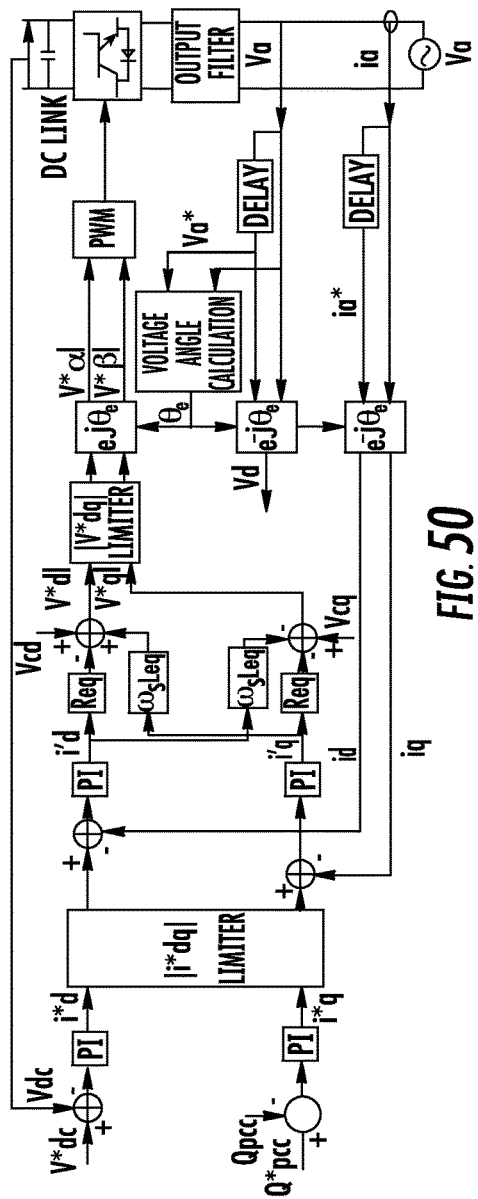
FIG. 50 is a diagram of an example DCC structure for controlling a signal-phase GCC with an L-, LC-, or LCL-filter.

The DCC for a three-phase L-filter GCC was developed recently. Similarly, the theoretical foundation of the DCC for a single-phase L-filter GCC is (68) and (69), i.e., using d- and q-axis currents directly for active and reactive power control of the GCC system. Unlike the conventional standard vector control approach, the DCC produces a current signal by the d- or q-axis current-loop controller (FIG. 50). In other words, the output of the controller is a d- or q-axis tuning current i'$_d$ or i'$_q$, while the input error signal tells the controller how much the tuning current should be adjusted during the dynamic control process. The development of the tuning current control strategy has adopted the concept of minimizing the absolute or root-mean-square (RMS) error between the desired and actual B- and q-axis currents through a PI-based tuning strategy. The d- and q-axis tuning current signals i'$_d$ and i$_q$' generated by the current-loop controllers must be transferred to d- and q-axis voltage signals to control the GCC. The conversion from the current to voltage control signals is obtained from (66) which is rearranged as:

$$v_{dq\_inv} = v_{dq} - R_f \cdot i'_{dq} - L_f \frac{d}{dt} i'_{dq} - j\omega_s L_f \cdot i_{dq}. \quad (91)$$

Applying a low-pass filter to $v_{dq\_inv}$ to prevent the high frequency oscillation components of d- and q-axis voltages from being applied directly to the converter, the d- and q-axis control voltages are shown by:

$$v_{d\_inv} = -R_f i'_d + \omega_s L_f i'_q + v_d \quad (92)$$

$$v_{q\_inv} = -R_f i'_q - \omega_s L_f i'_d \quad (93)$$

FIG. 50 shows a common DCC structure suitable to the single-phase L-, LC- and LCL-filter GCCs, in which i$_d$ and i$_q$ are d- and q-axis currents of the PCC current I$_a$ shown in FIGS. 47-49. In addition, moving average filtering is used in FIG. 50 to improve the controller performance. For the L-filter GCC, $R_{eq} = R_f$, $L_{eq} = L_f$, $v_{cd} = v_d$, $v_{cq} = 0$ according to (92) and (93).

DCC for Single-Phase LC-Filter GCCs

The DCC for a single-phase LC-filter GCC is obtained based upon (68) and (69) too. Similar to the L-filter GCC, the output of the DCC controller is a d- or q-axis tuning current i'$_d$ or i'$_q$. To convert the tuning current signals to voltage control signals, (74) and (75) are rearranged in terms of the DCC tuning current i'$_{dq}$ as:

$$v_{dq\_inv} = v_{dq} - R_f \cdot i_{dq1} - L_f \frac{d}{dt} i_{dq1} - j\omega_s L_f \cdot i_{dq1} \quad (94)$$

$$i_{dq1} = i'_{dq} - C \frac{d}{dt} v_{dq} - j\omega_s C \cdot v_{dq}. \quad (95)$$

Combining (94) and (95) and applying a low-pass filter to $V_{dq\_inv}$, the d- and q-axis control voltages are shown by:

$$v_{d\_inv} = -R_f i'_d + \omega_s L_f i'_q + v_d(1 - \omega_s^2 L_f C) \quad (96)$$

$$v_{q\_inv} = -R_f i'_q - \omega_s L_f i'_d + v_d R_f \omega_s C \quad (97)$$

Thus, in terms of FIG. 50, $R_{eq} = R_f$, $L_{eq} = L_f$, $v_{cd} = v_d(1 - \omega_s^2 L_f C)$, and $v_{cq} = v_d R_f \omega_s C$ according to (96) and (97).

DCC for single-phase LCL filter GCC

Similar to the L- and LC-filter GCCs, the DCC controller produces a d- or q-axis tuning current i'$_d$ or i'$_q$. This tuning current is converted to voltage control signals based upon (83) to (85). Rearranging (83) to (85) in terms of the DCC tuning current i'$_{dq}$:

$$v_{dq\_inv} = v_{cdq} - R_{inv} \cdot i_{dq1} - L_{inv} \frac{d}{dt} i_{dq1} - j\omega_s L_{inv} \cdot i_{dq1} \quad (98)$$

$$v_{cdq} = v_{dq} - R_g \cdot i'_{dq} - L_g \frac{d}{dt} i'_{dq} - j\omega_s L_g \cdot i'_{dq} \quad (99)$$

$$i_{dq1} = i'_{dq} - C \frac{d}{dt} v_{cdq} - j\omega_s C \cdot v_{cdq}. \quad (100)$$

Combining (98) to (100) and applying a low-pass filter to $V_{dq\_inv}$, the d- and q-axis control voltages are shown by:

$$v_{d\_inv} = -R_{eq} i'_d + \omega_s L_{eq} i'_q + v_d(1 - \omega_s^2 L_{inv} C) \quad (101)$$

$$v_{q\_inv} = -R_{eq} i'_q - \omega_s L_{eq} i'_d + v_d R_{inv} \omega_s C \quad (102)$$

where $R_{eq} = R_g + R_{inv} - R_{inv} \omega_s^2 C L_g - R_g \omega_s^2 C L_{inv}$ and $L_{eq} = L_g + L_{inv} + R_{inv} R_g C - \omega_s^2 L_{inv} C L_g$. In terms of FIG. 50, $R_{eq}$ and $L_{eq}$ are as defined above, and $v_{cd}=V_d(1-\omega_s^2 L_{inv}C)$, and $v_{cq}=V_d \cdot R_f \omega_s C$ according to (101) and (102).

Control of GCC Under Physical Constraints

In practice, a GCC cannot operate beyond the rated power and PWM saturation of the inverter. To handle GCC operation under such conditions, the GCC can be controlled by maintaining the effectiveness of the active power control as the first priority while meeting the reactive power control demand as much as possible. This is expressed as:

$$\text{Minimize } |Q_{ac} - Q_{ac}^*| \quad (103)$$

$$\text{Subject to: } \begin{cases} P_{ac} = P_{ac}^* \\ \sqrt{i_d^2 + i_q^2} \le I_{rated}, \quad \sqrt{v_{d1}^2 + v_{q1}^2} \le V_{dc} \end{cases} \quad (104)$$

This requirement is implemented in the following way. (i) To prevent the converter from exceeding the rated current, (105) is employed if the amplitude of the reference current generated by the outer-loop controller exceeds the rated current limit. In other words, if an amplitude of either of the dq-reference currents exceeds a rated current of the GCC, the d-axis reference current is maintained and the q-axis reference current is adjusted. (ii) If $|v_{qd\_inv}^*|$ generated by the current-loop controllers exceeds the PWM saturation limit, $v_{d\_inv}^*$ and $v_{q\_inv}^*$ are modified by (106) and (107). In other words, if an absolute value of either of the dq-control voltages exceeds a saturation limit of the GCC, a d-axis control voltage is adjusted and a q-axis control voltage is maintained.

$$i_{d\_new}^* = i_d^* \, i_{q\_new}^* = \text{sign}(i_q^*) \cdot \sqrt{(i_{dq\_max}^*)^2 - (i_d^*)^2} \quad (105)$$

$$v_{d\_inv\_new}^* = \text{sign}(v_{d\_inv}^*) \cdot \sqrt{(v_{dq\_inv\_max}^*)^2 - (v_{q\_inv}^*)^2} \quad (106)$$

$$v_{q\_inv\_new}^* = v_{q\_inv}^* \quad (107)$$

Performance Evaluation

Figure 51:
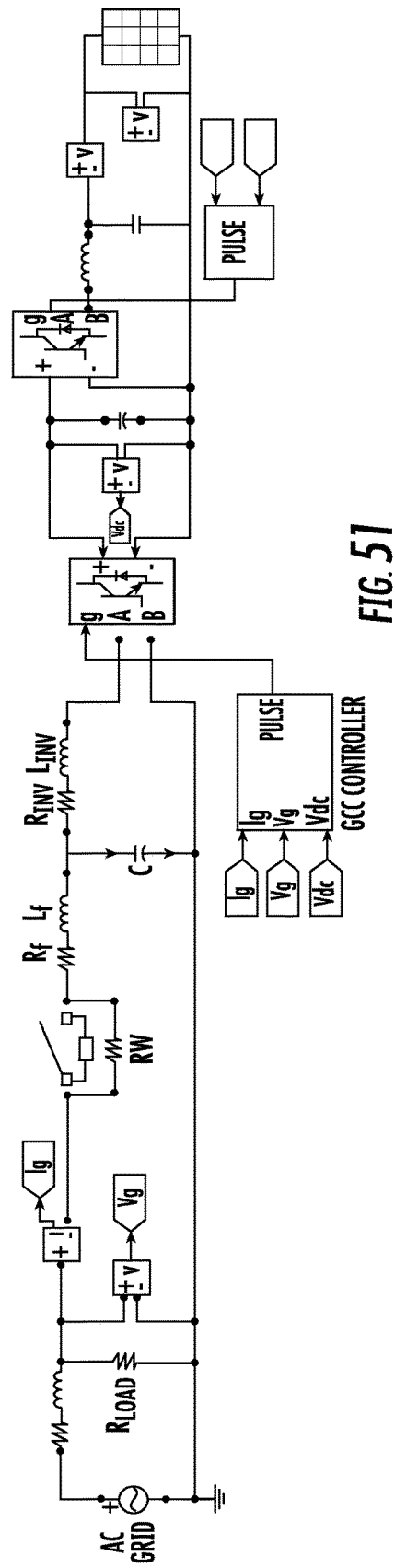
FIG. 51 is a schematic diagram of a model of a single-phase ac/dc/dc converter with a small-scale solar photovoltaic (PV) system.

FIG. 51 shows a single-phase ac/dc/dc converter with a small-scale solar photovoltaic (PV) system built in SIM-POWERSYSTEMS of MATLAB of MATH WORKS, INC. of Natick, Mass. for the performance evaluation. It includes 1) a reference voltage of 500V for the dc link, 2) a single-phase 60 Hz, 230V rms voltage source on the left signifying the grid, 3) a single-phase grid-connected converter (GCC), 4) an L, LC or LCL filter, 5) a PV array on the right, 6) a boost converter for maximum power point tracking control of the PV array, and 7) a load connected at PCC. The parameters of the L, LC and LCL filters are given in Table VIII. The filter parameters were selected based on the considerations of frequency spectral analysis, system size and cost, and reactive power compensation capability.

TABLE VIII

Parameters of L, LC and LCL filters (simulation)

| Filter type | Filter Parameter | Value | Unit |
|---|---|---|---|
| L | Resistor $R_f$ | 0.19 | Ω |
|  | Inductor $L_f$ | 2 | mH |
| LC | Resistor $R_f$ | 0.19 | Ω |
|  | Inductor $L_f$ | 2 | mH |
|  | Capacitor C | 50 | μF |

TABLE VIII-continued

Parameters of L, LC and LCL filters (simulation)

| Filter type | Filter Parameter | Value | Unit |
|---|---|---|---|
| LCL | Grid-side Resistor $R_f$ | 0.095 | Ω |
|  | Grid-side Inductor $L_f$ | 1 | mH |
|  | Inverter-side Resistor $R_{inv}$ | 0.095 | Ω |
|  | Inverter-side Inductor $L_{inv}$ | 1 | mH |
|  | Capacitor C | 50 | μF |

Figure 52:
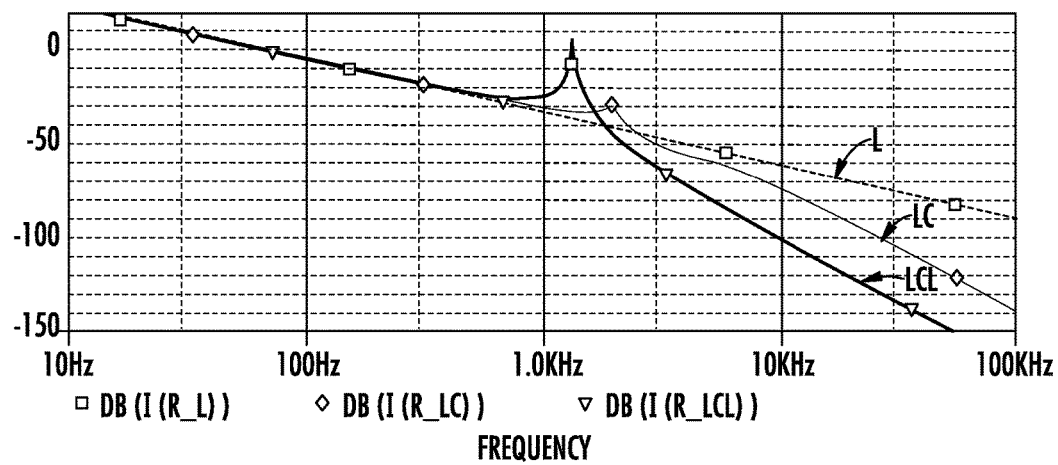
FIG. 52 is a graph illustrating the frequency response of L-, LC-, and LCL-filters in the model of FIG. 51.

PSPICE of CADENCE DESIGN SYSTEMS, INC. of San Jose, Calif. was used for the frequency response assessment, which made it easier to generate frequency response plot even for a complicated harmonic equivalent network of the grid. The frequency spectrums of the three filters corresponding to harmonic currents injected into the grid are shown by FIG. 52, in which the peaks stand for resonant frequencies. Depending on the grid configurations and parameters, the attenuation and/or resonant frequency for L, LC and LCL filters vary, especially the resonant frequency for the LC filter. For L and LCL filters, this impact is smaller. Based on FIG. 52, the switching frequency for the GCC is selected as 4200 Hz. In all the tests, the imaginary circuits were created by using the delay method. The controller parameters, given in Table IX, were tuned until satisfactory performance was achieved. The sampling time used in this paper is $T_s=0.1$ ms for all the tests.

TABLE IX

Controller parameters
($k_p$ - proportional gain, $k_i$ - integral gain)

| Controller | Gain ($k_p/k_i$) |
|---|---|
| Current loop | 0.00533/70 |
| dc-link voltage | 1.363/44.49 |
| PCC bus voltage | 0.545/17.796 |

Control of Dc-Link Voltage and Reactive Power

Under this condition, the control purpose is to maintain a constant dc-link voltage and control the grid reactive power according to reference commends. FIGS. 53(a)-53(d) demonstrates the performance of dc-link voltage and reactive power control for an L-filter GCC. At the beginning, switch SW was in open position and the dc-link capacitor was charged to 215V by the ac system through the resistor in parallel with switch SW and the inherent diodes in parallel with the GCC IGBT transistors. After SW was closed at t=1 sec, the DCC controller quickly maintained the dc-link capacitor voltage at the reference value of 500V (FIG. 53c). At t=4 sec, there is a step increase in the active power generated by the PV array (FIG. 53a), which caused the dc-link voltage to rise. However, the DCC controller quickly adjusted the dc-link voltage around the reference value. The active power at PCC was negative (FIG. 53b), indicating that the power transferred from the GCC to the ac system. At t=6 sec when the PCC reactive power reference changed from 0 kVar to absorbing 10 kVar, the controller adjusted the PCC reactive power to the reference value (FIG. 53b) while the dc-link voltage was not affected by the reactive power variation. At t=8 sec, the active power of the PV array changed to variable generating, which caused the dc-link voltage to fluctuate. However, the DCC controller properly maintained the dc-link voltage around the reference value. The active power flowed from the PV array to the GCC (positive in FIG. 53a) and flowed from the GCC to the ac system (negative in FIG. 53b), while the reactive power was maintained at the reference value. For any other condition changes, the dc-link voltage was kept at 500V and the active and reactive powers were controlled effectively. Typical current waveform at the PCC is shown by FIG. 53d.

For LC and LCL GCCs, the DCC also showed a great performance in meeting various control requirements. Moreover, compared to L-filter GCC (FIG. 53d), the harmonic current distortion was reduced (FIGS. 54(a)-54(b)).

Robustness Analysis

The robustness of a controller is important in a real application because the system parameters could deviate from its nominal values and the PCC voltage could be badly distorted. FIG. 55 shows how the described control method for the L-filter GCC is affected when there is a reduction of grid filter parameters by 50% and an increase of grid filter parameters by 50%, respectively. Other conditions are the same as those used in FIG. 53. FIG. 56 illustrates how the described control approach is affected by a distorted PCC voltage appeared from t=3s to t=12s (FIG. 56a). Overall, the study shows that the described approach is robust under variable grid filter parameter conditions. The result for LC- and LCL-filter GCCs is similar to and better than FIGS. 55 and 56, and the current harmonic distortion is smaller.

Control of Dc-Link Voltage and PCC Voltage

Figure 57C:
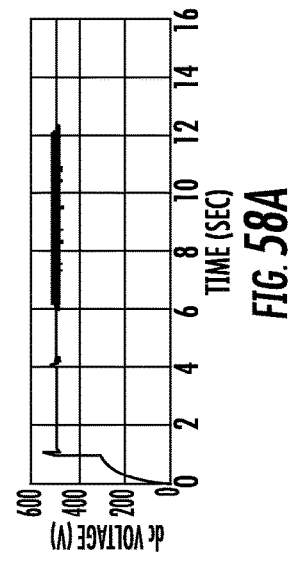
Figure 58A:
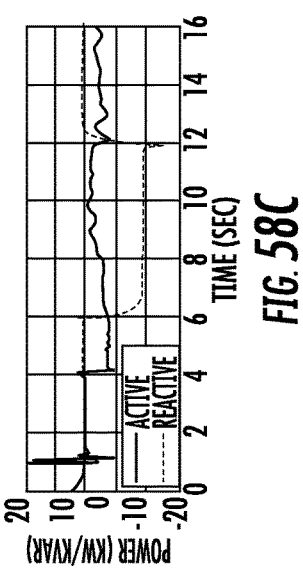
FIGS. 58(a)-58(c) are graphs illustrating performance of the single-phase LCL-filter GCC when a fault in the ac power supply system appeared between 6 sec and 12 sec.
Figure 58B:
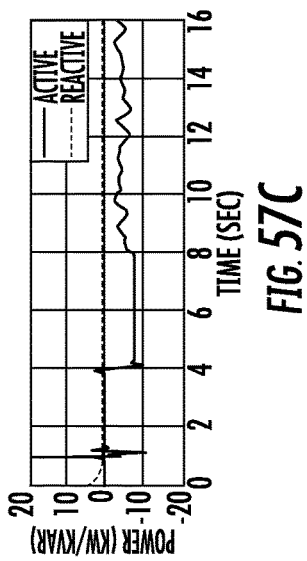
Figure 58C:
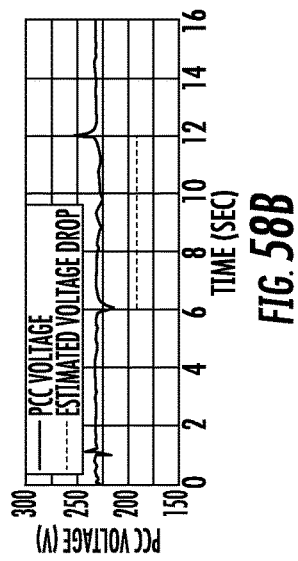

Under this condition, the d-axis loop is used for dc-link voltage control while the q-axis loop is used for PCC voltage control as shown by FIG. 50. The performance was evaluated for all the three filters. FIGS. 57(a)-57(c) demonstrate the performance under normal operating condition for the LCL-filter GCC; FIGS. 58(a)-58(c) show the performance of the LCL-filter GCC when a fault in the ac power supply system appeared between 6 sec and 12 sec. The other conditions are the same as those used in FIGS. 53 and 54.

Under the normal operating condition, the DCC can effectively maintain the dc-link voltage constant (FIG. 57a) and the PCC voltage at the rated value (FIG. 57b). In the PCC voltage control mode, the reactive power is determined by the PCC voltage controller. Since the power is sent from the PV array to the grid, the reactive power is absorbing as shown by FIG. 57c in order to maintain PCC voltage constant. Under the faulted condition, a high generating reactive power is needed to boost the PCC voltage, which may cause the converter exceed its physical constraints. However, the DCC can effectively meet the control needs as described above by maintaining the dc-link voltage constant as the top priority while meeting the PCC voltage control demand as much as possible (FIG. 58c).

Hardware Validation

Figure 59:
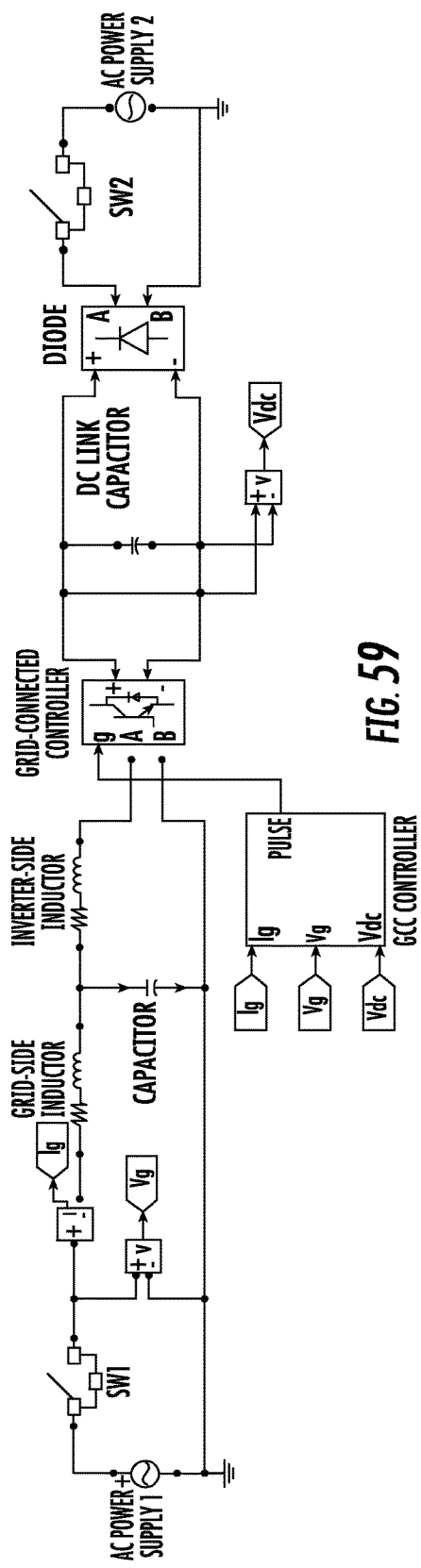
FIG. 59 is a schematic diagram of an example single-phase LCL-filter GCC hardware setup.

A hardware laboratory test system of a single-phase GCC system is built to validate the proposed direct current vector control for single-phase L-, LC-, and LCL-filter GCCs. FIG. 59 shows the schematic of the LCL-filter GCC test system. The parameters of the test system are shown in Table X and were selected based on available laboratory facilities we have. The testation setup includes the following. 1) A single-phase ac/dc converter (GCC) connected to an adjustable LabVolt power supply signifying the grid. 2) A LCL filter built by using two LabVolt smoothing inductors and a LabVolt capacitor. 3) A rectifier connected through switch SW2 to another LabVolt power supply signifying the "PV array". 4) The ac/dc converter is controlled by a dSPACE digital control system. 5) The control system collects the dc-link voltage and single-phase current and voltage at the PCC, and sends out control signals to the converter according to various control demands. Based on the frequency spectral analysis, the GCC switching frequency was selected as 3600 Hz.

TABLE X

Parameters of L, LC and LCL filters

| Filter type | Filter Parameter | Value | Unit |
|---|---|---|---|
| L | Resistor $R_f$ | 0.25 | Ω |
|  | Inductor $L_f$ | 25 | mH |
| LC | Resistor $R_f$ | 0.25 | Ω |
|  | Inductor $L_f$ | 25 | mH |
|  | Capacitor C | 2.2 | µF |
| LCL | Grid-side Resistor $R_f$ | 0.125 | Ω |
|  | Grid-side Inductor $L_f$ | 12.5 | mH |
|  | Inverter-side Resistor $R_{inv}$ | 0.125 | Ω |
|  | Inverter-side Inductor $L_{inv}$ | 12.5 | mH |
|  | Capacitor C | 2.2 | µF |

Results

The test sequence was scheduled as follows, with t=0sec serving as the starting point for data recording. Around t=50 sec, the active power transferred from the 'PV array' to the dc-link capacitor was decreased by turning off switch SW2. Around t=100 sec, the q-axis reference current changed from positive to negative. Around t=150 sec, the active power transferred from the 'PV array' to the dc-link capacitor was increased by turning on switch SW2. The system data were not only collected by the dSPACE system, but also monitored by oscilloscopes and/or meters. The reference dc-link voltage is 50V.

Figure 60A:
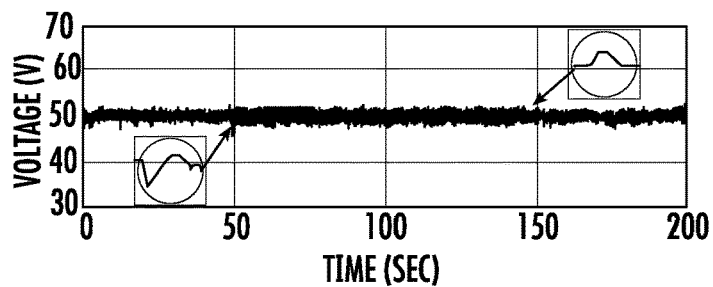
FIGS. 60(a)-60(d) are graphs illustrating the hardware test evaluation for a single-phase LCL-filter GCC.
Figure 60B:
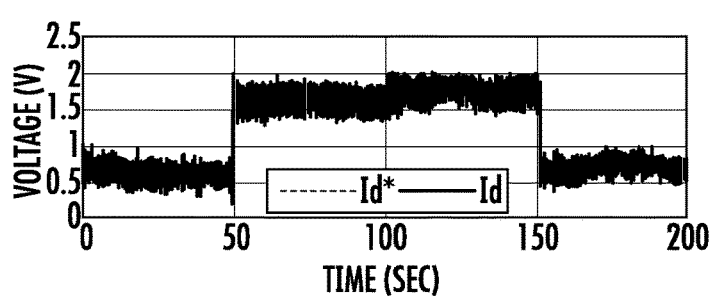
Figure 60C:
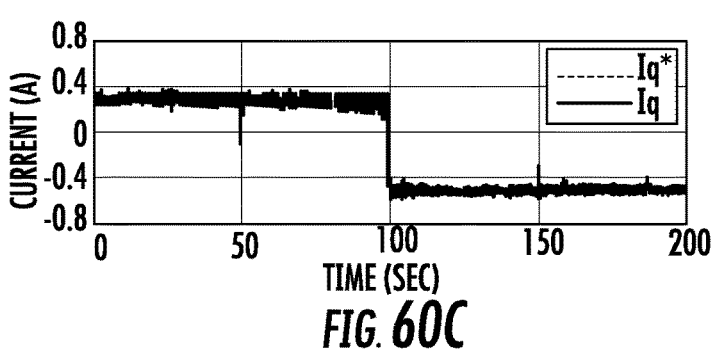
Figure 60D:
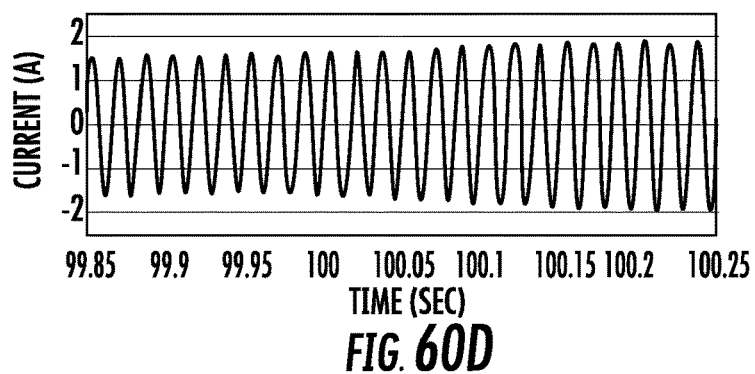

FIGS. 60(a)-60(c) show the hardware test results for the LCL-filter GCC. When the dc-link voltage dropped due to a reduction of the active power transferred from the 'PV array' to the dc-link capacitor at approximately t=50 sec, the controller quickly regulated the actual voltage to the reference value (FIG. 60a). As the reactive power demand changed around t=100 sec, the actual q-axis current was rapidly adjusted to the new q-axis current reference (FIG. 60c), and the oscillation of the dc-link voltage was very small. When the dc-link voltage increased due to a boost of active power transferred from the 'PV array' to the dc-link capacitor at approximately t=150 sec, the controller quickly stabilized the dc-link capacitor voltage to the reference value (FIG. 60a). The DCC demonstrated great performance under all other conditions and the harmonic distortion of the grid current is low for the LCL GCC (FIG. 60d).

For LC- and L-filter GCCs, the performance of the DCC (FIGS. 61(a)-61(c) and FIGS. 62(a)-62(c)) is similar to that of the LCL-filter GCC (FIGS. 60(a)-60(d)). However, the harmonic distortion is worse than that of the LCL-filter GCC, especially for the single-phase L-filter GCC. In all the three tests, there is no any damping technique employed. Even so, the DCC exhibits excellent performance to control the single-phase inverter for all the three different filtering schemes.

Described herein is a direct current vector control method to control a single-phase inverter under three different filtering schemes. Example advantages of the described control method include: 1) a vector control strategy that overcomes the competing control deficiency of the conventional standard vector control, 2) a control method that does not require damping, 3) a robust control technique that has adequate performance even under variable system parameter, distorted grid voltage, and grid voltage drop conditions, and 4) a control approach that can determine the best control action when the GCC physical constraints are reached. Both simulation and hardware tests demonstrate that the proposed control approach, even without using any damping strategies, has great performance in controlling the single-phase inverters with different filtering schemes.

Computing Device

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 63:
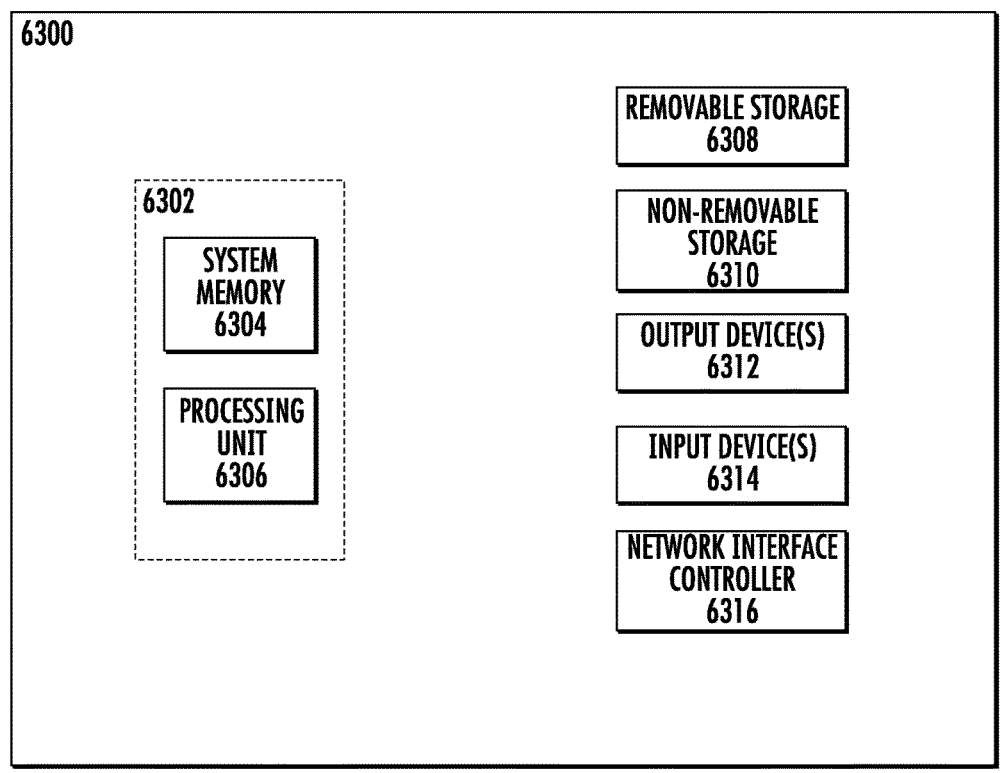
FIG. 63 is an example computing device.

When the logical operations described herein are implemented in software, the process may execute on any type of computing architecture or platform. For example, referring to FIG. 63, an example computing device upon which embodiments of the invention may be implemented is illustrated. For example, the neural networks, controllers (e.g., PI or PID controllers), etc. as described herein can be implemented using one or more computing devices. The computing device 6300 may include a bus or other communication mechanism for communicating information among various components of the computing device 6300. In its most basic configuration, computing device 6300 typically includes at least one processing unit 6306 and system memory 6304. Depending on the exact configuration and type of computing device, system memory 6304 may be volatile (such as random access memory (RAM)), non-volatile (such as read-only memory (ROM), flash memory, etc.), or some combination of the two. This most basic configuration is illustrated in FIG. 63 by dashed line 6302. The processing unit 6306 may be a standard programmable processor that performs arithmetic and logic operations necessary for operation of the computing device 6300.

Computing device 6300 may have additional features/functionality. For example, computing device 6300 may include additional storage such as removable storage 6308 and non-removable storage 6310 including, but not limited to, magnetic or optical disks or tapes. Computing device 6300 may also contain network connection(s) 6316 that allow the device to communicate with other devices. Computing device 6300 may also have input device(s) 6314 such as a keyboard, mouse, touch screen, etc. Output device(s) 6312 such as a display, speakers, printer, etc. may also be included. The additional devices may be connected to the bus in order to facilitate communication of data among the components of the computing device 6300. All these devices are well known in the art and need not be discussed at length here.

The processing unit 6306 may be configured to execute program code encoded in tangible, computer-readable media. Computer-readable media refers to any media that is capable of providing data that causes the computing device 6300 (i.e., a machine) to operate in a particular fashion. Various computer-readable media may be utilized to provide instructions to the processing unit 6306 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 6306 may execute program code stored in the system memory 6304. For example, the bus may carry data to the system memory 6304, from which the processing unit 6306 receives and executes instructions. The data received by the system memory 6304 may optionally be stored on the removable storage 6308 or the non-removable storage 6310 before or after execution by the processing unit 6306.

Computing device 6300 typically includes a variety of computer-readable media. Computer-readable media can be any available media that can be accessed by device 6300 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 6304, removable storage 6308, and non-removable storage 6310 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 6300. Any such computer storage media may be part of computing device 6300.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for controlling a grid-connected energy source, comprising:
 a grid-connected converter ("GCC") operably coupled between an electrical grid and an energy source;
 a n-order grid filter operably coupled between the electrical grid and the GCC, wherein n is an integer greater than or equal to 2; and
 a nested-loop controller having inner and outer control loops, the nested-loop controller being operably coupled to the GCC, wherein a d-axis loop controls real power and a q-axis loop controls reactive power, wherein the inner control loop comprises a neural network that is configured to optimize dq-control voltages for controlling the GCC, wherein the neural network accounts for circuit dynamics of the n-order grid filter while optimizing the dq-control voltages, and wherein the neural network is trained using a forward accumulation through time ("FATT") algorithm in conjunction with a Levenberg-Marquardt ("LM") algorithm.

2. The system of claim 1, wherein the neural network is configured to implement a dynamic programming ("DP") algorithm.

3. The system of claim 2, wherein the DP algorithm includes a cost function associated with a discrete-time system model, the discrete-time system model including parameters for one or more inductors and capacitors of the n-order grid filter.

4. The system of claim 3, wherein the neural network is configured to determine an optimal trajectory of the dq-control voltages that minimizes the cost function associated with the discrete-time system model.

5. The system of claim 1, wherein the neural network comprises a preprocessing stage configured to regulate input signals to the neural network within a predetermined range.

6. The system of claim 1, wherein the neural network comprises a multi-layer perceptron including a plurality of input nodes, a plurality of hidden layer nodes and a plurality of output nodes.

7. The system of claim 6, wherein the neural network comprises a multi-layer feed forward neural network having one or more hidden layers, each of the hidden layers comprising m nodes, wherein m is an integer.

8. The system of claim 6, wherein each respective node of the neural network is configured to implement a sigmode function.

9. The system of claim 1, wherein the neural network is further configured to receive a plurality of input signals comprising:
 dq-current error signals, wherein the dq-current error signals comprise differences between d-axis and q-axis currents and d-axis and q-axis reference currents, respectively, and
 respective integrals of the dq-current error signals, wherein the neural network is configured to optimize the dq-control voltages based on the input signals.

10. The system of claim 1, wherein the n-order grid filter is a $2^{nd}$ or $3^{rd}$ order grid filter.

11. The system of claim 1, wherein the system does not include a passive or active damping control structure.

12. The system of claim 1, wherein the outer control loop comprises at least one proportional-integral ("PI") controller.

13. The system of claim 1, wherein the GCC is a three-phase GCC.

14. The system of claim 1, wherein the GCC is a single-phase GCC, wherein an imaginary orthogonal circuit is generated based on a real circuit, the real circuit comprising the single-phase GCC, the n-order grid filter, the energy grid and the energy source.

15. The system of claim 14, wherein the imaginary orthogonal circuit incorporates a $\pi/2$ phase shift relative to the real circuit.

16. The system of claim 14, wherein an amplitude of the imaginary orthogonal circuit is approximately equal to an amplitude of the real circuit.

17. The system of claim 1, wherein the GCC is a pulse-width modulated ("PWM") converter.

18. The system of claim 1, wherein the energy source is at least one of a solar cell or array, a battery, a fuel cell, a wind turbine generator, a micro-turbine generator, a static synchronous compensator ("STATCOM"), or a high-voltage DC transmission system.

* * * * *